(12) United States Patent
Chou et al.

(10) Patent No.: US 12,007,315 B2
(45) Date of Patent: Jun. 11, 2024

(54) SAMPLE COLLECTION AND HANDLING FOR DELAYED ANALYSIS

(71) Applicant: Essenlix Corporation, Monmouth Junction, NJ (US)

(72) Inventors: Stephen Y. Chou, Princeton, NJ (US); Wei Ding, East Windsor, NJ (US); Yufan Zhang, Monmouth Junction, NJ (US); Ji Qi, Hillsborough, NJ (US)

(73) Assignee: Essenlix Corporation, Monmouth Junction, NJ (US)

( * ) Notice: Subject to any disclaimer, the term of this patent is extended or adjusted under 35 U.S.C. 154(b) by 0 days.

(21) Appl. No.: 17/060,020

(22) Filed: Sep. 30, 2020

(65) Prior Publication Data

US 2021/0018407 A1    Jan. 21, 2021

Related U.S. Application Data

(63) Continuation of application No. 16/484,105, filed as application No. PCT/US2018/017502 on Feb. 8, 2018, now Pat. No. 10,823,645.

(60) Provisional application No. 62/539,691, filed on Aug. 1, 2017, provisional application No. 62/460,047, filed on Feb. 16, 2017, provisional application No. 62/460,062, filed on Feb. 16, 2017, provisional application No. 62/457,133, filed on Feb. 9, 2017, provisional application No. 62/456,504, filed on Feb. 8, 2017, provisional application No. 62/456,638, filed on Feb. 8, 2017.

(51) Int. Cl.
*G01N 1/28* (2006.01)

(52) U.S. Cl.
CPC .......... *G01N 1/2813* (2013.01); *G01N 1/286* (2013.01)

(58) Field of Classification Search
CPC ...... G01N 1/2813; G01N 1/286; G01N 33/48; G01N 1/28
See application file for complete search history.

(56) References Cited

U.S. PATENT DOCUMENTS

| | | |
|---|---|---|
| 3,368,872 A | 2/1968 | Natelson |
| 3,447,863 A | 6/1969 | Patterson |
| 3,895,661 A | 7/1975 | Praglin et al. |
| 3,925,166 A | 12/1975 | Blume |
| 3,992,158 A | 11/1976 | Przybylowicz et al. |
| 4,022,521 A | 5/1977 | Hall et al. |
| 4,066,412 A | 1/1978 | Johnson et al. |
| 4,088,448 A | 5/1978 | Lilja et al. |
| 4,171,866 A | 10/1979 | Tolles |
| 4,233,029 A | 11/1980 | Columbus |
| 4,255,384 A | 3/1981 | Kitajima et al. |
| 4,258,001 A | 3/1981 | Pierce et al. |
| 4,329,054 A | 5/1982 | Bachalo |
| 4,402,614 A | 9/1983 | Porath |
| 4,427,294 A | 1/1984 | Pietro |
| 4,430,436 A | 2/1984 | Koyama et al. |

(Continued)

FOREIGN PATENT DOCUMENTS

| | | |
|---|---|---|
| AU | 198813789 | 9/1988 |
| AU | 619459 | 1/1992 |

(Continued)

*Primary Examiner* — Brian J. Sines

(57) ABSTRACT

The present invention provides, among other things, devices, methods and applications of collecting, preserving, transporting, and analyzing tiny body fluids which have targeted biomarkers.

38 Claims, 8 Drawing Sheets

(56) References Cited

U.S. PATENT DOCUMENTS

| | | | |
|---|---|---|---|
| 4,596,695 A | 6/1986 | Cottingham | |
| 4,745,075 A | 5/1988 | Hadfield et al. | |
| 4,806,311 A | 2/1989 | Greenquist | |
| 4,883,642 A | 11/1989 | Bisconte | |
| 4,906,439 A | 3/1990 | Grenner | |
| 4,911,782 A | 3/1990 | Brown | |
| 4,950,455 A | 8/1990 | Smith | |
| 5,002,736 A | 3/1991 | Babbitt et al. | |
| 5,039,487 A * | 8/1991 | Smith | G01N 1/28 436/520 |
| 5,096,836 A | 3/1992 | Macho et al. | |
| 5,122,284 A | 6/1992 | Braynin et al. | |
| 5,132,097 A | 7/1992 | Van Deusen et al. | |
| 5,169,601 A | 12/1992 | Ohta et al. | |
| 5,188,968 A | 2/1993 | Kano et al. | |
| 5,223,219 A | 6/1993 | Subramanian et al. | |
| 5,281,540 A | 1/1994 | Merkh et al. | |
| 5,306,467 A | 4/1994 | Douglas-Hamilton et al. | |
| 5,321,975 A | 6/1994 | Wardlaw | |
| 5,362,648 A | 11/1994 | Koreyasu et al. | |
| 5,413,732 A | 5/1995 | Buhl et al. | |
| 5,427,959 A | 6/1995 | Nishimura et al. | |
| 5,431,880 A | 7/1995 | Kramer | |
| 5,591,403 A | 1/1997 | Gavin et al. | |
| 5,623,415 A | 4/1997 | O'Bryan et al. | |
| 5,753,456 A | 5/1998 | Naqui et al. | |
| 5,768,407 A | 6/1998 | Shen et al. | |
| 5,858,648 A | 1/1999 | Steel et al. | |
| 5,879,628 A | 3/1999 | Ridgeway et al. | |
| 5,888,834 A | 3/1999 | Ishikawa et al. | |
| 5,939,326 A | 8/1999 | Chupp et al. | |
| 5,948,686 A | 9/1999 | Wardlaw | |
| 6,004,821 A | 12/1999 | Evine et al. | |
| 6,016,367 A | 1/2000 | Benedetti et al. | |
| 6,017,767 A | 1/2000 | Chandler | |
| 6,022,734 A | 2/2000 | Wardlaw | |
| 6,106,778 A | 8/2000 | Oku et al. | |
| 6,180,314 B1 | 1/2001 | Berndt | |
| 6,235,536 B1 | 5/2001 | Wardlaw | |
| 6,350,613 B1 | 2/2002 | Wardlaw et al. | |
| 6,358,475 B1 | 3/2002 | Berndt | |
| 6,429,027 B1 | 8/2002 | Chee et al. | |
| 6,503,760 B2 | 1/2003 | Malmqvist et al. | |
| 6,551,554 B1 | 4/2003 | Vermeiden et al. | |
| 6,623,701 B1 | 9/2003 | Eichele et al. | |
| 6,632,652 B1 | 10/2003 | Austin et al. | |
| 6,714,287 B2 | 3/2004 | Berndt | |
| 6,723,290 B1 | 4/2004 | Wardlaw | |
| 6,844,201 B2 | 1/2005 | Malmqvist et al. | |
| 6,866,823 B2 | 3/2005 | Wardlaw | |
| 6,869,570 B2 | 3/2005 | Wardlaw | |
| 6,893,850 B2 | 5/2005 | Ostuni et al. | |
| 6,921,514 B1 | 7/2005 | Vetter et al. | |
| 6,929,953 B1 | 8/2005 | Wardlaw | |
| 6,939,032 B2 | 9/2005 | Cosby et al. | |
| 7,101,341 B2 | 9/2006 | Tsukashima et al. | |
| 7,179,423 B2 | 2/2007 | Bohm et al. | |
| 7,282,367 B2 | 10/2007 | Kawamura | |
| 7,393,658 B2 | 7/2008 | Carbonell et al. | |
| 7,410,617 B2 | 8/2008 | Sakamoto | |
| 7,410,807 B2 | 8/2008 | D'Aurora | |
| 7,468,160 B2 | 12/2008 | Thompson et al. | |
| 7,510,841 B2 | 3/2009 | Stuelpnagel et al. | |
| 7,510,848 B2 | 3/2009 | Hammond et al. | |
| 7,547,424 B2 | 6/2009 | Haab et al. | |
| 7,731,901 B2 | 6/2010 | Wardlaw | |
| 7,738,094 B2 | 6/2010 | Goldberg | |
| 7,850,916 B2 | 12/2010 | Wardlaw | |
| 7,862,773 B2 | 1/2011 | Ibrahim | |
| 7,863,411 B2 | 1/2011 | Hammond et al. | |
| 7,897,376 B2 | 3/2011 | Porter et al. | |
| 7,901,897 B2 | 3/2011 | Stuelpnagel et al. | |
| 7,903,241 B2 | 3/2011 | Wardlaw et al. | |
| 7,929,121 B2 | 4/2011 | Wardlaw et al. | |
| 7,929,122 B2 | 4/2011 | Wardlaw et al. | |
| 7,943,093 B2 | 5/2011 | Adrien et al. | |
| 7,951,599 B2 | 5/2011 | Levine et al. | |
| 7,995,194 B2 | 8/2011 | Wardlaw et al. | |
| 8,045,165 B2 | 10/2011 | Wardlaw et al. | |
| 8,058,073 B2 | 11/2011 | Chiapperi et al. | |
| 8,077,296 B2 | 12/2011 | Wardlaw et al. | |
| 8,081,303 B2 | 12/2011 | Levine et al. | |
| 8,133,738 B2 | 3/2012 | Levine et al. | |
| 8,158,434 B2 | 4/2012 | Wardlaw | |
| 8,221,985 B2 | 7/2012 | Wardlaw et al. | |
| 8,241,572 B2 | 8/2012 | Wardlaw | |
| 8,269,954 B2 | 9/2012 | Levine et al. | |
| 8,284,384 B2 | 10/2012 | Levine et al. | |
| 8,287,820 B2 | 10/2012 | Williams et al. | |
| 8,310,658 B2 | 11/2012 | Wardlaw et al. | |
| 8,310,659 B2 | 11/2012 | Wardlaw et al. | |
| 8,319,954 B2 | 11/2012 | Wardlaw et al. | |
| 8,326,008 B2 | 12/2012 | Lalpuria et al. | |
| 8,338,579 B2 | 12/2012 | Adams et al. | |
| 8,361,799 B2 | 1/2013 | Levine et al. | |
| 8,367,012 B2 | 2/2013 | Wardlaw | |
| 8,462,332 B2 | 6/2013 | Pugia et al. | |
| 8,467,063 B2 | 6/2013 | Wardlaw et al. | |
| 8,472,693 B2 | 6/2013 | Davis et al. | |
| 8,481,282 B2 | 7/2013 | Levine et al. | |
| 8,502,963 B2 | 8/2013 | Levine et al. | |
| 8,513,032 B2 | 8/2013 | Jablonski et al. | |
| 8,569,076 B2 | 10/2013 | Wardlaw et al. | |
| 8,594,768 B2 | 11/2013 | Phillips et al. | |
| 8,604,161 B2 | 12/2013 | Hammond et al. | |
| 8,628,952 B2 | 1/2014 | Stuelpnagel et al. | |
| 8,633,013 B2 | 1/2014 | Kaiser et al. | |
| 8,638,427 B2 | 1/2014 | Wardlaw et al. | |
| 8,717,673 B2 | 5/2014 | Selvin et al. | |
| 8,741,630 B2 | 6/2014 | Dickinson et al. | |
| 8,750,966 B2 | 6/2014 | Phillips et al. | |
| 8,778,687 B2 | 7/2014 | Levine et al. | |
| 8,781,203 B2 | 7/2014 | Davis et al. | |
| 8,796,186 B2 | 8/2014 | Shirazi | |
| 8,797,527 B2 | 8/2014 | Hukari et al. | |
| 8,835,186 B2 | 9/2014 | Jablonski et al. | |
| 8,837,803 B2 | 9/2014 | Wang et al. | |
| 8,842,264 B2 | 9/2014 | Wardlaw et al. | |
| 8,885,154 B2 | 11/2014 | Wardlaw et al. | |
| 8,906,700 B2 | 12/2014 | Lim et al. | |
| 8,911,815 B2 | 12/2014 | Kram et al. | |
| 8,974,732 B2 | 3/2015 | Lalpuria et al. | |
| 8,994,930 B2 | 3/2015 | Levine et al. | |
| 9,023,641 B2 | 5/2015 | Rodriguez et al. | |
| 9,044,268 B2 | 6/2015 | Phillips et al. | |
| 9,046,473 B2 | 6/2015 | Evine et al. | |
| 9,084,995 B2 | 7/2015 | Wardlaw | |
| 9,086,408 B2 | 7/2015 | Egan et al. | |
| 9,097,640 B2 | 8/2015 | Goldberg et al. | |
| 9,199,233 B2 | 12/2015 | Wardlaw | |
| 9,274,094 B2 | 3/2016 | Wardlaw et al. | |
| 9,291,617 B2 | 3/2016 | Levine et al. | |
| 9,322,835 B2 | 4/2016 | Wardlaw | |
| 9,347,962 B2 | 5/2016 | Salsman | |
| 9,354,159 B2 | 5/2016 | Vaartstra | |
| 9,395,365 B2 | 7/2016 | Levine et al. | |
| 9,469,871 B2 | 10/2016 | Bearinger et al. | |
| 9,523,670 B2 | 12/2016 | Mueller et al. | |
| 9,696,252 B2 | 7/2017 | Wardlaw | |
| 2001/0055882 A1 | 12/2001 | Ostuni | |
| 2002/0164820 A1 | 11/2002 | Brown | |
| 2003/0068614 A1 | 4/2003 | Cima et al. | |
| 2003/0107946 A1 | 6/2003 | Cosby et al. | |
| 2003/0109059 A1 | 6/2003 | Adrien et al. | |
| 2004/0131345 A1 | 7/2004 | Kylberg et al. | |
| 2004/0156755 A1 | 8/2004 | Levine | |
| 2004/0214310 A1 | 10/2004 | Parker et al. | |
| 2004/0259162 A1 | 12/2004 | Kappel et al. | |
| 2005/0026161 A1 | 2/2005 | Jablonski et al. | |
| 2005/0032138 A1 | 2/2005 | Lathrop et al. | |
| 2005/0158880 A1 | 7/2005 | Ostuni et al. | |
| 2005/0254995 A1 | 11/2005 | Sostek et al. | |
| 2006/0015157 A1 | 1/2006 | Leong | |
| 2006/0051253 A1 | 3/2006 | Gousepohl | |

(56) References Cited

U.S. PATENT DOCUMENTS

| | | |
|---|---|---|
| 2006/0062440 A1 | 3/2006 | Hollars et al. |
| 2006/0062695 A1 | 3/2006 | Haab et al. |
| 2006/0090658 A1 | 5/2006 | Phillips |
| 2006/0160134 A1 | 7/2006 | Melker et al. |
| 2007/0087442 A1 | 4/2007 | Wardlaw |
| 2007/0243117 A1 | 10/2007 | Wardlaw |
| 2008/0028962 A1 | 2/2008 | Phillips et al. |
| 2008/0214947 A1 | 9/2008 | Hunt et al. |
| 2008/0274564 A1 | 11/2008 | D'Aurora |
| 2008/0286152 A1 | 11/2008 | Schmidt et al. |
| 2009/0211344 A1 | 8/2009 | Wang |
| 2009/0227472 A1 | 9/2009 | Stuelpnagel et al. |
| 2009/0233329 A1 | 9/2009 | Rodriguez et al. |
| 2009/0246781 A1 | 10/2009 | Klem et al. |
| 2009/0258371 A1 | 10/2009 | Wardlaw et al. |
| 2009/0298716 A1 | 12/2009 | Stuelpnagel et al. |
| 2010/0081583 A1 | 4/2010 | Shirazi |
| 2010/0085067 A1 | 4/2010 | Gabriel et al. |
| 2010/0151593 A1 | 6/2010 | D'Aurora |
| 2010/0216248 A1 | 8/2010 | Wardlaw |
| 2010/0255605 A1 | 10/2010 | Wardlaw |
| 2010/0272345 A1 | 10/2010 | Wardlaw |
| 2010/0273244 A1 | 10/2010 | Wardlaw |
| 2010/0291562 A1 | 11/2010 | Adler |
| 2011/0009297 A1 | 1/2011 | Jones et al. |
| 2011/0206557 A1 | 8/2011 | Phan et al. |
| 2011/0212462 A1 | 9/2011 | Duffy et al. |
| 2011/0294198 A1 | 12/2011 | Wardlaw |
| 2012/0034647 A1 | 2/2012 | Herzog et al. |
| 2012/0107799 A1 | 5/2012 | Daum |
| 2012/0108787 A1 | 5/2012 | Lue |
| 2012/0157332 A1 | 6/2012 | Kumar et al. |
| 2012/0183956 A1* | 7/2012 | Ross ............... B01L 3/502715 435/306.1 |
| 2012/0300293 A1 | 11/2012 | Selvin et al. |
| 2012/0321518 A1 | 12/2012 | Ermantraut et al. |
| 2013/0065788 A1 | 3/2013 | Glezer et al. |
| 2013/0102018 A1 | 4/2013 | Schentag et al. |
| 2013/0157288 A1 | 6/2013 | Kilfeather et al. |
| 2013/0209332 A1 | 8/2013 | Wardlaw |
| 2013/0265054 A1 | 10/2013 | Lowery et al. |
| 2013/0309679 A1 | 11/2013 | Smagilov et al. |
| 2014/0315242 A1 | 10/2014 | Rodriguez et al. |
| 2014/0368631 A1 | 12/2014 | Wardlaw et al. |
| 2014/0378320 A1 | 12/2014 | Hoffmann et al. |
| 2015/0036131 A1 | 2/2015 | Salsman |
| 2015/0253321 A1 | 9/2015 | Chou et al. |
| 2015/0317506 A1 | 11/2015 | Xie et al. |
| 2015/0323519 A1 | 11/2015 | Wardlaw |
| 2016/0025637 A1 | 1/2016 | Halverson et al. |
| 2016/0033496 A1 | 2/2016 | Chou et al. |
| 2016/0245797 A1 | 8/2016 | Ahmad et al. |
| 2016/0266091 A1 | 9/2016 | Levine et al. |
| 2017/0021356 A1 | 1/2017 | Dority et al. |
| 2017/0038401 A1 | 2/2017 | Holmes et al. |
| 2017/0045504 A1 | 2/2017 | Bloom |

FOREIGN PATENT DOCUMENTS

| | | |
|---|---|---|
| CN | 1299466 | 6/2001 |
| CN | 1302229 | 7/2001 |
| CN | 1166950 | 9/2004 |
| CN | 1188217 | 2/2005 |
| CN | 102027369 | 4/2011 |
| EP | 261667 | 3/1988 |
| EP | 291153 | 11/1988 |
| EP | 261667 | 5/1989 |
| EP | 291153 | 6/1992 |
| EP | 261667 | 2/1993 |
| EP | 0961110 | 12/1999 |
| EP | 1949310 | 7/2008 |
| EP | 2290100 | 3/2011 |
| EP | 1949310 | 11/2011 |
| EP | 2439515 | 4/2012 |
| EP | 2554987 | 2/2013 |
| EP | 3026433 | 6/2016 |
| EP | 1949310 | 2/2019 |
| WO | 1991020009 | 12/1991 |
| WO | 1999044743 | 9/1999 |
| WO | 1999045385 | 9/1999 |
| WO | 2003062920 | 7/2003 |
| WO | 2005114145 | 12/2005 |
| WO | 2005100539 | 1/2006 |
| WO | 2007112332 | 10/2007 |
| WO | 2009117652 | 9/2009 |
| WO | 2009117664 | 9/2009 |
| WO | 2009117678 | 9/2009 |
| WO | 2009117682 | 9/2009 |
| WO | 2009124186 | 10/2009 |
| WO | 2009124190 | 10/2009 |
| WO | 2009126800 | 10/2009 |
| WO | 2010115026 | 10/2010 |
| WO | 2013159117 A1 | 10/2013 |
| WO | 2014055559 | 4/2014 |
| WO | 2014089468 | 6/2014 |
| WO | 2014183049 | 11/2014 |
| WO | 2014205576 | 12/2014 |
| WO | 2017048871 | 3/2017 |

* cited by examiner

| No. | 1 | 2 | 3 | 4 | 5 |
|---|---|---|---|---|---|
| QMAX gap size | 2 um | 2 um | 30 um | 30 um | 30 um |
| Liquid type | Blood | Blood | Blood | Blood | Plasma |
| Liquid Volume | 0.08 uL | 0.4 uL | 1 uL | 5 uL | 5 uL |
| a Photo of Initial Liquid in QMAX card | (1-a) | (2-a) | (3-a) | (4-a) | (5-a) |
| Initial Area | 40 mm² | 200 mm² | 33 mm² | 165 mm² | 165 mm² |
| b Photo Fully Dry in QMAX card | (1-b) | (2-b) | (3-b) | (4-b) | (5-b) |
| Fully Dry Area | 40 mm² | 200 mm² | 33 mm² | 165 mm² | 165 mm² |

A

B

SAMPLE COLLECTION AND HANDLING FOR DELAYED ANALYSIS

CROSS-REFERENCE TO RELATED APPLICATIONS

This application is a Continuation of U.S. patent application Ser. No. 16/484,105, filed on Aug. 6, 2019, which is a § 371 national stage application of PCT/US2018/017502, filed on Feb. 8, 2018, which claims the benefit of priority to U.S. Provisional Patent Application No. 62/456,638, filed on Feb. 8, 2017, U.S. Provisional Patent Application No. 62/456,504, filed on Feb. 8, 2017, U.S. Provisional Patent Application No. 62/457,133, filed on Feb. 9, 2017, U.S. Provisional Patent Application No. 62/460,047, filed on Feb. 16, 2017, U.S. Provisional Patent Application No. 62/460,062, filed on Feb. 16, 2017, and U.S. Provisional Patent Application No. 62/539,691, filed on Aug. 1, 2017, the contents of which are relied upon and incorporated herein by reference in their entirety. The entire disclosure of any publication or patent document mentioned herein is entirely incorporated by reference.

FIELD

Among other things, the present invention is related to the field of bio/chemical sample collection, preservation, assays, and other applications.

BACKGROUND

In biological and chemical assays (e.g., diagnostic testing), it is sometimes necessary to preserve the bio/chemical samples over a long time until being assayed, in other cases, it is also necessary to collect the bio/chemical samples from a subject, preserve these samples, and transport the preserved samples to a remote location for further assaying/analytics. Conventional sample collection, preservation devices and methods are often hard to be adapted to miniaturized assays for point of care or personal use, and are usually time and material-consuming and expensive. They are also hard to implement at the point of use and require professional handling. The present invention provides, among many other things, a solution to tackle these problems.

SUMMARY OF INVENTION

The following brief summary is not intended to include all features and aspects of the present invention. The present invention provides, among other things, devices, methods and applications of collecting, preserving, transporting, and analyzing tiny body fluids which have targeted biomarkers.

Easy and Accurate Collection of a Small Amount of Sample

One aspect of the invention is the means that collects and preserves a bio/chemical liquid sample uses a pair of plates that are movable to each other to manipulate and preserve a small volume of the sample. The manipulation includes, but limited to, reshaping a sample, forcing a sample flow, making a contact between the sample and reagent, measuring sample volume, etc.—all of them have beneficial effects to the preservation.

One aspect of the invention is the means that make at least a portion of a small droplet of a liquid sample deposited on a plate to become a thin film with a thickness that is controlled, predetermined, and uniform over large area. The uniform thickness can be as thin as less than 1 µm. Furthermore, the invention allows the same uniform thickness be maintained for a long time period.

Accurate Measurement of the Relevant Volume

Another aspect of the invention is the means that utilizes the predetermined uniform thin sample thickness formed by the invention to determine the volume of a portion or entire of the sample without using any pipette or alike.

Another aspect of the invention is the means that maintains the lateral contour of the sample thin film for a long time period, even when the sample is dried due to evaporation, thereby making the volume readily deducible by measuring the lateral area of the sample.

Accurate Collection and Preservation Exhaled Breath Condensation (EBC) in a Few Seconds Another aspect of the invention is to provide a simple means to collect and preserve exhaled breath condensation (EBC) in a few seconds. What a subject needs to do is to breathe on the card for a few seconds and close the card.

A Versatile Way for Efficient Storage and Reliable Maintenance of a Sample

Another aspect of the invention is to provide easy and rapid methods to collect and preserve sample using the devices disclosed herein, which contain suitable preservatives to be easily added to the sample, thus components therein can be targeted for specific maintenance.

Another aspect of the invention is to provide easy and rapid methods to collect and preserve sample using the devices disclosed herein, which contain suitable chemicals to be easily added to the sample for certain pre-treatment of the sample.

Another aspect of the invention is to provide easy and rapid methods to collect and preserve sample using the devices disclosed herein, which comprise micro- or nano-structures, elements, and/or features to pre-treat the sample for storage and/or the following assay/sensing/reaction.

Another aspect of the invention is to provide easy and rapid methods to recover the sample collected by the devices disclosed herein, by cutting out a certain area of the device and taking out the sample collected in between the cut-out plates. The volume of the recovered sample is readily deducible by measuring or knowing the areas of the cut-out plates.

BRIEF DESCRIPTION OF THE DRAWINGS

The skilled artisan will understand that the drawings, described below, are for illustration purposes only. The drawings are not intended to limit the scope of the present teachings in any way. The drawings are not entirely in scale. In the figures that present experimental data points, the lines that connect the data points are for guiding a viewing of the data only and have no other means.

FIG. 5 shows experimental results according to one embodiment of the present invention. Specifically, it shows the photos of liquid blood sample stored in a QMAX card after pressing as well as after being dried overnight.

DETAILED DESCRIPTION OF EXEMPLARY EMBODIMENTS

Figure 1:
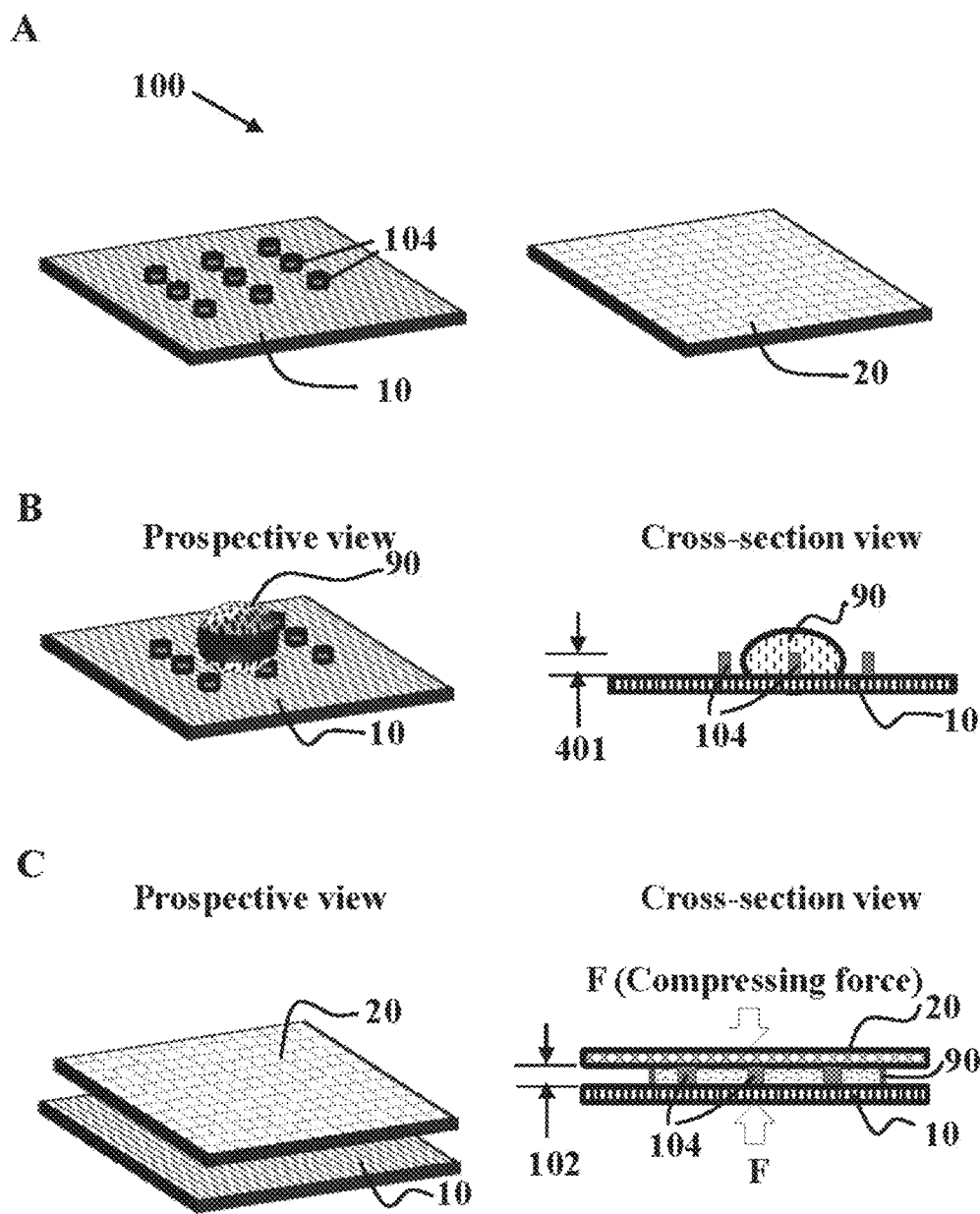
FIG. 1 shows an embodiment of a generic device for sample collection and preservation. Panel (A) shows the perspective view of a first plate and a second plate wherein the first plate has spacers. Panel (B) shows the perspective view and a sectional view of depositing a sample on the first plate at an open configuration. Panel (C) illustrates using the first plate and second plate to spread the sample and using the spacers and the plate to regulate the sample thickness at the closed configuration of the device.

The following detailed description illustrates some embodiments of the invention by way of example and not by way of limitation. The section headings and any subtitles used herein are for organizational purposes only and are not to be construed as limiting the subject matter described in any way. The contents under a section heading and/or subtitle are not limited to the section heading and/or subtitle, but apply to the entire description of the present invention.

The citation of any publication is for its disclosure prior to the filing date and should not be construed as an admission that the present claims are not entitled to antedate such publication by virtue of prior invention. Further, the dates of publication provided can be different from the actual publication dates which need to be independently confirmed.

Definitions

The terms used in describing the devices, systems, and methods herein disclosed are defined in the current application, or in PCT Application (designating U.S.) Nos. PCT/US2016/045437 and PCT/US0216/051775, which were respectively filed on Aug. 10, 2016 and Sep. 14, 2016, U.S. Provisional Application No. 62/456,065, which was filed on Feb. 7, 2017, U.S. Provisional Application No. 62/426,065, which was filed on Feb. 8, 2017, U.S. Provisional Application No. 62/456,504, which was filed on Feb. 8, 2017, all of which applications are incorporated herein in their entireties for all purposes.

The terms "CROF Card (or card)", "COF Card", "QMAX-Card", "Q-Card", "CROF device", "COF device", "QMAX-device", "CROF plates", "COF plates", and "QMAX-plates" are interchangeable, except that in some embodiments, the COF card does not comprise spacers; and the terms refer to a device that comprises a first plate and a second plate that are movable relative to each other into different configurations (including an open configuration and a closed configuration), and that comprises spacers (except some embodiments of the COF card) that regulate the spacing between the plates. The term "X-plate" refers to one of the two plates in a CROF card, wherein the spacers are fixed to this plate. More descriptions of the COF Card, CROF Card, and X-plate are given in the provisional application Ser. Nos. 62/456,065, filed on Feb. 7, 2017, which is incorporated herein in its entirety for all purposes.

The term "preservation" or "preserve" as used herein refers to the process or action that prevents or slows the decomposition or undesirable chemical change of at least one component of a sample. The term "preservative" as used herein refers to substance that is capable of, when added to a bio/chemical sample, preventing or slowing the decomposition or undesirable chemical change of at least one component of the sample.

Examples of Devices and Methods for Sample Collection and Preservation

1 Device for Sample Collection and Preservation

One aspect of the present invention provides a device for collection and preservation of a liquid sample.

1.1 QMAX Cards for Sample Collection and Preservation

FIG. 1 shows an embodiment of a device for sample collection and preservation. The generic comprises a first plate 10, a second plate 20, and spacers 40. In particular, panel (A) shows the perspective view of a first plate 10 and a second plate 20 wherein the first plate has spacers. It should be noted, however, that the spacers also are fixed on the second plate 20 (not shown) or on both first plate 10 and second plate 20 (not shown). Panel (B) shows the perspective view and a sectional view of depositing a sample 90 on the first plate 10 at an open configuration.

It should be noted, however, that the sample 90 also is deposited on the second plate 20 (not shown), or on both first plate 10 and the second plate 20 (not shown). Panel (C) illustrates (i) using the first plate 10 and second plate 20 to spread the sample 90 (the sample flow between the inner surfaces of the plates) and reduce the sample thickness, and (ii) using the spacers and the plate to regulate the sample thickness at the closed configuration of the device.

In some embodiments, the spacers 40 have a predetermined uniform height and a predetermined uniform inter-spacer distance. In the closed configuration, as shown in panel (C) of FIG. 1, the spacing between the plates and thus the thickness of the sample 90 is regulated by the spacers 40. In some embodiments, the uniform thickness of the sample 90 is substantially similar to the uniform height of the spacers 40. It should be noted that although FIG. 1 shows the spacers 40 to be fixed on one of the plates, in some embodiments the spacers are not fixed. For example, in certain embodiments the spacers are mixed with the sample so that when the sample is compressed into a thin layer, the spacers, which are rigid beads or particles that have a uniform size, regulate the thickness of the sample layer.

The devices disclosed in the present invention are also known as "QMAX" device. In some embodiments, the device is also useful for bio/chemical sensing, assays and/or reactions, and it provides advantages in many aspects. In the term "QMAX", Q denotes quantification; M magnifying; A adding reagents; and X acceleration. It is also known as compressed regulated open flow (CROF) device.

Figure 2:
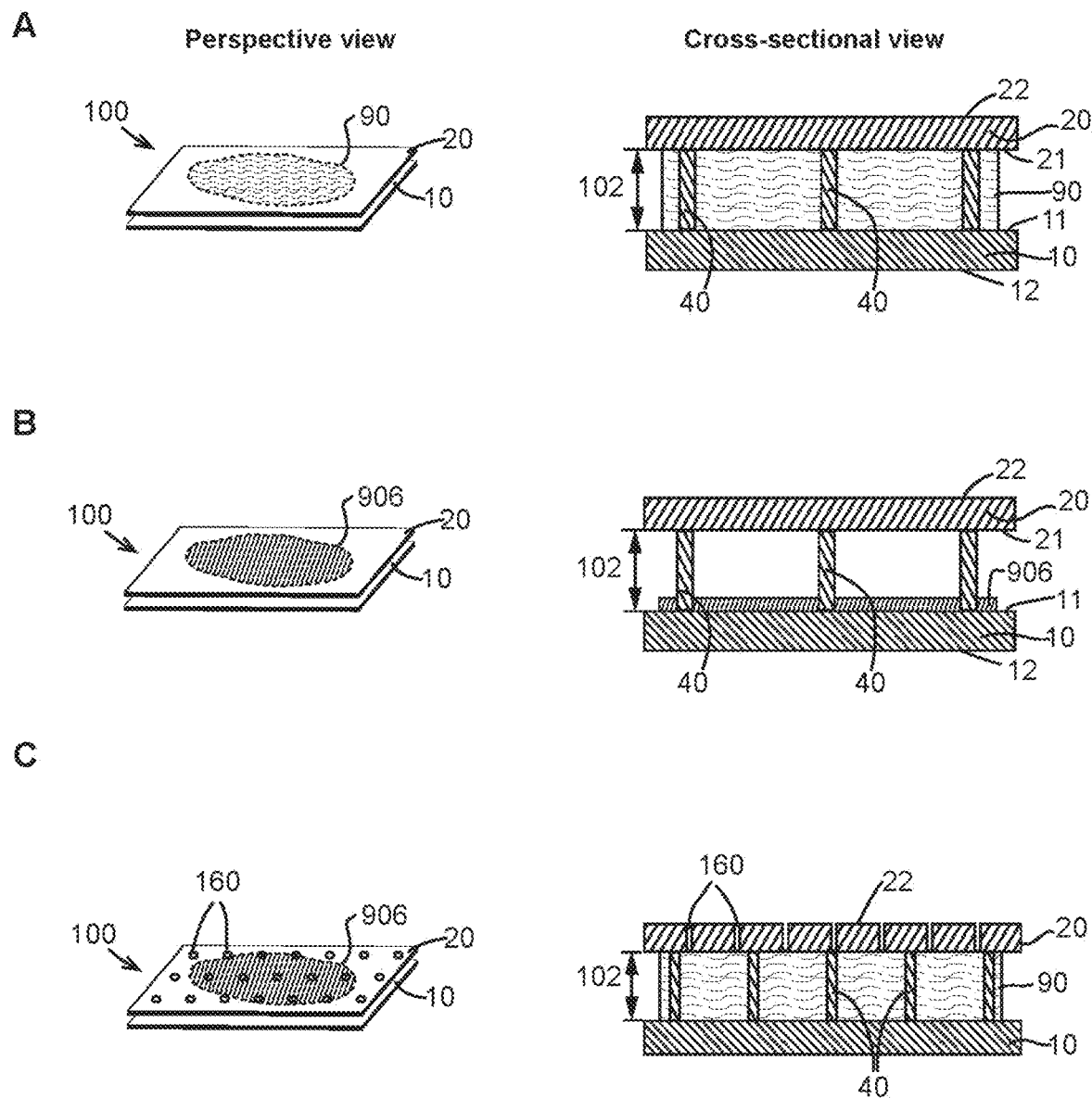
FIG. 2 illustrates exemplary embodiments of devices and methods for sample collection and preservation according to the present invention. Panel (A) shows both the perspective and cross-sectional views of the first plate, the second plate, and spacers, illustrating that a sample is initially deposited on one or both of the plates at the open configuration, and in the closed configuration, at least part of the sample is compressed into a layer of uniform thickness, the uniform thickness of which is regulated by the plates and the spacers. Panel (B) shows that the sample contains vaporizable component, and is allowed to vaporize over time in between the two plates at the closed configuration and convert into a dried layer. Panel (C) illustrates another exemplary embodiment of the device, which further comprises vents to facilitate the vaporization of the sample.

FIG. 2 schematically shows some exemplary embodiments of the devices and methods for sample collection and preservation according to the present invention, wherein the device 100 comprises a first plate 10, a second plate 20, and spacers 40. In particular, panel (A) shows both the perspective and cross-sectional views of the first plate 10, the second plate 20, and spacers. Each of the plates respectively comprises an inner surface (11 and 21, not shown in the perspective view) and an outer surface (12 and 22). Each of the first plate respectively comprises a sample contact area (not indicated) on its inner surface. The sample contact areas are for contacting a sample to be collected and preserved by the device. Further, as illustrated, the first plate 10 comprises a plurality of spacers 40 (not shown in the perspective view) that are fixed to its inner surface 11. It should be noted, however, in some embodiments, the second plate 20 or both the first plate 10 and second plate 20 comprise the spacers fixed to the respective inner surface. It should also be noted that in some embodiments, the spacers 40 are not fixed. Herein the term "fixed" means that the spacers are attached to a plate and the attachment is maintained during one or more uses of the plate.

FIG. 2 panel (A) further illustrates a liquid sample 90 being compressed between the first plate 10 and the second plate 20. As discussed above in the section of generic device, the sample 90 is initially deposited on one or both of the plates at the open configuration, in which the two plates are at least partially separated apart, and the spacing between the two plates are not regulated by the spacers. After the sample deposition, the two plates are brought together and compressed to enter the closed configuration, as illustrated in the figure. In the closed configuration, at least part of the sample 90 is compressed into a layer of uniform thickness that is confined by the inner surfaces 11 and 21 of the two plates, and the uniform thickness of the layer is regulated by the plates and the spacers. As shown in the figure, in some embodiments, the uniform thickness is equal to the spacing between the two plates 102, which in turns is equal to or at least around the uniform height of the spacers 40.

Referring to FIG. 2 panel (B), in some embodiments of the present invention, the sample 90 contains vaporizable component, and is allowed to vaporize over time in between the two plates at the closed configuration and convert into a dried layer 906. The dried layer 906 preserves the components of the sample 90 that do not vaporize in the layer of uniform thickness. Furthermore, as shown in the cross-sectional view, the dried layer 906 is attached to the first plate inner surface 11. In other embodiments, however, it is also possible that the dried layer 906 is attached to the second plate inner surface 21 or on the inner surfaces 11 and 21 of both plates. It should also be noted that, in some embodiments, the sample is substantially not vaporizable or does not vaporize in between the two plates at the closed configuration.

It is one aspect of the present invention that the sample in the closed plates is not substantially lost, except for vaporization in some embodiments, due to liquid flow. In some embodiments, the layer of uniform thickness remains stagnant relative to the plates, therefore its volume is largely maintained, except for vaporization. In some embodiments, even at the presence of vaporization, the layer of uniform thickness maintains largely its lateral contour, meaning that the lateral contour of the dried layer is substantially the same as the lateral contour of the layer of uniform thickness. The term "substantially the same" as used herein refers to similarity between two objects with deviation of less than 50%, less than 40%, less than 30%, less than 20%, less than 10%, less than 5%, less than 1%, less than 0.5%, less than 0.1%, less than 0.01%, or in a range between any two of these values.

FIG. 2 panel (C) illustrates another exemplary embodiment of the device, which further comprises vents to facilitate the vaporization of the sample. Specifically, the device 100 comprises, in addition to the first plate 10, the second plate 20, and the spacers 40, a plurality of vents 160 in the second plate 20 connecting the sample 90 in between the two plates and the second plate outer surface 22. It is of course possible that there is only one vent, or in some cases, the vent(s) is/are part of the first plate 10 or both of the plates. In some embodiments, the major function of the vents is to facilitate the vaporization of the sample collected in the device. In some embodiments, the vents are hydrophilic. In some embodiments, the vents are sized so that they do not provide an escape channel for the liquid sample to flow outside the plates, but still offer uncongested conduit for the evaporation of the sample. In some embodiments, the vents can have any suitable cross-sectional geometry. In some embodiments, the vents are vertical, angled, curved, stepped, or any combination thereof.

1.2 Onsite Camera Imaging

In collecting the sample for transport and later analysis, in some embodiments, the present invention comprises a further step of taking an image of the sample right after the sample collection. The imaging images of the sample in the sample holder to record any defects (e.g., air bubble, dust, etc.). Such images will be sent to the analysis lab together with the sample. The image allows an accurate calculation of the sample volume before the sample dry.

The imaging taking can use a camera on smartphone with or without an adaptor, wherein the adaptor can have optical elements (e.g., lens or filter) and/or lighting to facilitate the imaging.

2 Sample Volume Quantification

It is another aspect of the present invention that it is easy to quantify the volume of the sample collected and preserved using the devices and methods of the present invention. In some embodiments, as discussed above, the lateral contour and therefore the lateral area of the layer of uniform thickness remains constant after the plates are brought into the closed configuration. The uniform thickness of the layer determines that the volume of any part of the layer of uniform thickness is readily calculated by timing the uniform thickness by the lateral area of the given part. In some embodiments, the sample converts into a dried layer in the device, while also preserving the lateral contour. The lateral area of the dried layer therefore can also be used to determine the quantity of the sample collected in the device and/or subject to the follow-up analysis.

Figure 3:
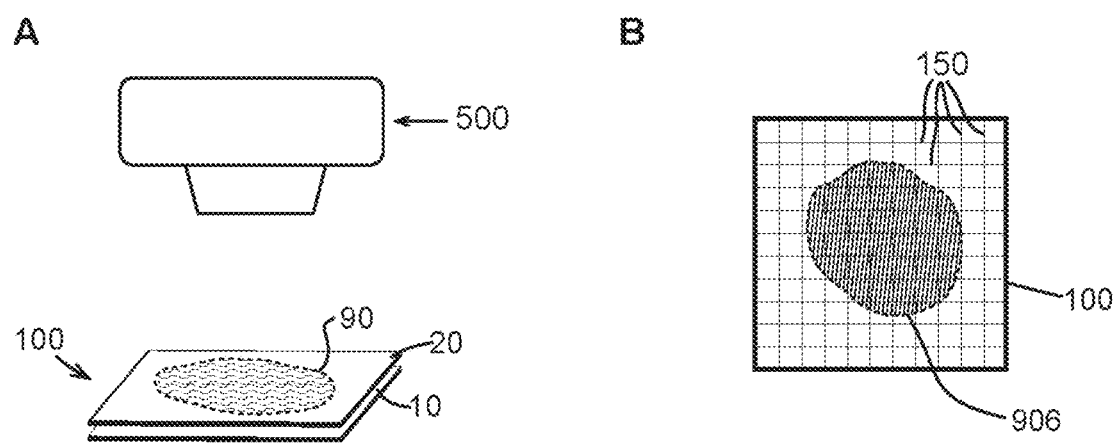
FIG. 3 shows exemplary embodiments of devices and methods for quantifying volume of the collected sample according to the present invention. Panel (A) depicts one exemplary embodiment of the present invention, wherein imaging and image analysis are used to quantify the volume of the sample collected in the device. Panel (B) depicts another exemplary embodiment of the present invention, wherein visual marks are used to aid the volume quantification of the sample collected in the device.

FIG. 3 panel (A) depicts one exemplary embodiment of the present invention, wherein imaging and image analysis are used to quantify the volume of the sample collected in the device. Specifically, in these embodiments, one or both of the plates are transparent, and a camera 500 is used to capture an image of the layer of uniform thickness 90 in between the first plate 10 and the second plate 20 at the closed configuration. Such an image can be further analyzed to determine the lateral area of the layer of uniform thickness 90, thereby to determine the sample volume collected by the device 100. In some embodiments, the image analysis is performed manually, in other embodiments, it is conducted using an image processing software.

FIG. 3 panel (B) depicts another exemplary embodiment of the present invention, wherein visual marks are used to aid the volume quantification of the sample collected in the device. As shown in the figure, the visual marks 150 on one or both of the plates are over the sample contact area of the plates (not indicated), and therefore over the dried layer 906 in between the plates.

Furthermore, the visual marks are indicative of the lateral area covered thereby. For instance, in the figure, the grid visual marks are distributed uniformly across the lateral area of the plates with a predetermined interval. Therefore, each minimal square has a predetermine area. These visual marks are therefore capable of aiding the volume quantification. It should be noted, however, that the visual marks are not necessarily part of the device (e.g., embossed or printed on one or both of the plates). For instance, in some embodiments, the visual marks are optical projections or drawn on the plate(s) from an external source.

2.1 Detection and/or Quantification of Volume and/or Concentration (Q)

Quantification and/or control of a relevant volume of a sample is useful for quantification and/or control of the concentration of chemical compounds (including analytes, entity, reagents, etc.) in the sample.

Common methods for a sample volume quantification include a use of a metered pipette (e.g., Eppendorf's "Research plus pipette, adjustable, 0.5-10 μl", SKU #3120000020), or a geometry. For PoC (point of care) or home uses, such metering devices are inconvenient to use and/or expensive. There are needs for simpler and cheaper methods and devices for the quantification and/or control of the sample volume and/or the concentration.

One aspect of the present invention is related to the methods, devices, and systems that quantify and/or control a relevant volume of a sample that is deposited on a plate, without using a metered pipette and/or a fixed microfluidic channel. The relevant volume, which can be a portion or the entire volume of the sample, is relevant to the quantification and/or control of the concentration of target analyte and/or entity in the sample. The methods, devices and systems in the present invention are easy to use and low cost.

2.1-1 A Method for Quantifying a Relevant Volume of a Sample

Q1. A method for quantifying a relevant volume of a sample, comprising:
(a) obtaining a sample, wherein a relevant volume of the sample is to be quantified;
(b) obtaining two plates that are movable relative to each other into different configurations, wherein one or both of the plates comprise spacers and the spacers have a predetermined inter-spacer distance and height, and each of the spacers is fixed with its respective plate;
(c) depositing, when the plates are configured in an open configuration, the sample on one or both of the plates; wherein the open configuration is a configuration in which the two plates are either partially or completely separated apart and the spacing between the plates is not regulated by the spacers;
(d) after (c), spread the sample by bringing the plates into a closed configuration, wherein, in the closed configuration: the plates are facing each other, the spacers and the relevant volume of the sample are between the plates, the thickness of the relevant volume of the sample is regulated by the plates and the spacers and is thinner than the maximum thickness of the sample when the plates are in the open configuration, and at least one of the spacers is inside the sample;
(e) quantifying the relevant volume of the sample while the plates are in the closed configuration;
wherein the relevant volume is at least a portion of an entire volume of the sample.

Q2. In some embodiments, a method for quantifying a relevant volume in a sample, comprises:
(a) obtaining a first plate and a second plate;
(b) making a sample to quantified between the two plates;
(c) deforming the shape of the sample by compressing the two plate that reduces the sample thickness and spreading the sample between the plates laterally; and
(d) quantifying the relevant volume of the sample while the plates are in the closed configuration;
wherein the relevant volume is at least a portion of an entire volume of the sample.

2.1-2 A Plate for Use in Quantifying a Relevant Volume in a Sample

Q3. A plate for use in quantifying a relevant volume in a sample, comprising: a plate that comprises, on its surface, (i) spacers that have a predetermined inter-spacer distance and height and are fixed on the surface, and (ii) a sample contact area for contacting a sample with a relevant volume to be quantified, wherein at least one of the spacers is inside the sample contact area.

2.1-3 A Device for Use in Quantifying a Relevant Volume in a Sample

Q4. A device for quantifying a relevant volume in a sample, comprising:
a first plate and a second plate that (a) are movable relative to each other into different configurations and (b) each has a sample contact area for contacting a sample with a relevant volume to be quantified,
wherein one or both of the plates comprise, on its surface(s), spacers that have a predetermined inter-spacer distance and height, and the spacers are fixed with respective plates;

wherein one of the configurations is an open configuration, in which: the two plates are separated apart, the spacing between the plates is not regulated by the spacers, and the sample is deposited on one or both of the plates, wherein another of the configuration is a closed configuration, which is configured after the sample deposition in the open configuration; and in the closed configuration: the plates are facing each other, the spacers and the relevant volume of the sample are between the plates, the thickness of the relevant volume of the sample is regulated by the plates and the spacers and is thinner than that when the plates are in the open configuration, and at least one of the spacers is inside the sample; and wherein the relevant volume of the sample is quantified in the closed configuration, and the relevant volume is at least a portion of an entire volume of the sample.

2.1-4 Measuring a Relevant Volume of a Sample

MS1. In the present invention, the quantifying of a relevant volume of the sample while the plates are at a closed configuration includes, but not limited to, each of the following five embodiments:

(a) measuring the relevant volume of the sample by a method of mechanical, optical, electrical, or any combination thereof;

(b) measuring one or several parameter(s) related to the relevant volume of the sample independently using a method selected from a method that is mechanical, optical, electrical, or any combination thereof;

(c) using predetermined one or several parameter(s) related to the relevant volume of the sample (i.e., the parameter(s) of the sample determined prior to the plates are at the closed configuration);

(d) determining the relevant volume of the sample by (i) measuring one or several parameters related to the revel vent volume when the plates are at a closed configuration and (ii) predetermining other parameters related to the relevant volume before the plates are at the closed configuration;

(e) determining none-sample volume (f) any combinations of the above (i.e. a, b and c).

In the method of paragraph MS1, the mechanical methods include, but not limited to, a use of the spacers (i.e. the mechanical device that regulate the spacing between the inner surfaces of the substrate and the cover-plate to a predetermined value), mechanical probe or rulers, sound waves (e.g., reflection and/or interference of ultrasound wave to measure the spacing), or any combination thereof.

In the method of paragraph MS1, the optical methods include, but not limited to, a use of light interference, or optical imaging (e.g., taking a 2D (two-dimensional)/3D (three-dimensional) image of the sample, optical imaging of multiple times (with different viewing angles, different wavelength, different phase, and/or different polarization), image processing, or any combination thereof.

The electrical methods include, but not limited to, capacitive, or resistive or impedance measurements, or any combination thereof.

In the method of paragraph MS1, in some embodiments, the measurement of the sample thickness is to measure the spacing between the inner surfaces of the two plates.

In the method of paragraph MS1, in some embodiments, the use of predetermined one or several parameter(s) related to the relevant volume of the sample, wherein the predetermined parameter is the predetermined sample thickness that is regulated by the spacers when the plates are in a closed configuration.

In the method of paragraph MS1, in some embodiments, the use of predetermined one or several parameter(s) related to the relevant volume of the sample, wherein the predetermined parameter is the predetermined spacer height.

In the method of paragraph of MS1, in some embodiments, the parameters related to the relevant volume of the sample are the parameters at a closed configuration, that include, but not limited to, (i) the spacing between the inner surfaces of the first plate and the second plate (in CROF), (ii) the sample thickness, (iii) the entire or a relevant portion of the sample area, (iv) the entire or a relevant portion of the sample volume, or (v) any combination thereof.

In the method of paragraph MS1, in some embodiments, the quantification of the sample volume or a relevant sample volume, comprising steps of (i) multiplying the sample thickness by the entire sample area to get the entire sample volume, (ii) multiplying the sample thickness by the relevant sample area to get the relevant sample volume, or (iii) multiplying the relevant sample thickness by the entire or relevant sample area to get the relevant sample volume.

In the method of paragraph MS1, in some embodiments, the measurement is to take 3D (three-dimensional) image of the relevant volume.

In the method of paragraph MS1, in some embodiments, the quantification of the relevant volume of the sample by measuring the lateral area of the relevant volume of the sample, then using it with the thickness of the relevant volume to determine the volume of the relevant volume of the sample, wherein the thickness of the relevant volume is determined from the information of the spacer, and the information of the spacer include the spacer height;

In the method of paragraph MS1, in some embodiments, the quantification of the relevant volume of the sample by measuring the lateral area of the relevant volume of the sample and the spacer together, then using it with the thickness of the relevant volume and the volume of the spacers to determine the volume of the relevant volume of the sample, wherein the thickness of the relevant volume is determined from the inform of the spacer;

In the method of paragraph MS1, in some embodiments, the quantification of the relevant volume of the sample by measuring the lateral area and the thickness of the relevant volume of the sample.

In the method of paragraph MS1, in some embodiments, the quantification of the relevant volume of the sample by measuring the volume of the relevant volume of the sample optically. In the method of paragraph MS1, in some embodiments, scale marks are used to assist the quantification of a relevant volume of the sample while the plates are at a closed configuration.

In the method of paragraph MS1, in some embodiments, the quantification of the relevant volume of the sample comprises a step of subtracting the none-sample volume, wherein the none-sample volume is determined, in some embodiments, by the embodiments described in in the disclosures.

2.1-5 A Method for Quantifying Analytes Concentration in a Relevant Volume of a Sample Q5. A method for quantifying analytes in a relevant volume of a sample, comprising:

(a) perform the steps in the method of paragraph Q1; and (b) measuring, after step (a), a signal related to the analytes from the relevant volume, wherein the relevant volume is at least a portion of an entire volume of the sample.

Q6. A method for quantifying analytes in a relevant volume of a sample, comprising:
  (a) perform the steps in the method of paragraph Q2; and
  (b) measuring, after step (a), a signal related to the analytes from the relevant volume, wherein the relevant volume is at least a portion of an entire volume of the sample.

In the method of any of paragraphs Q5-6, in some embodiments, it further comprises a step of calculating the analytes concentration by dividing the signal related to the analytes from the relevant volume of the sample by the volume of the relevant volume.

In the method of any of paragraphs Q5-6, one or both plates further comprise a binding site, a storage site, or both.

In the method of any of paragraphs Q5-6, in some embodiments, the signal related to the analyte is a signal directly from the analytes or a label attached to the analyte.

Q7. A method for quantifying analytes in a relevant volume of a sample, comprising:
  (a) perform the steps in the method of paragraph Q1, wherein one or both plates further comprise a binding site; and
  (b) measuring, after step (a), a signal related to the analytes from the relevant volume, wherein the relevant volume is at least a portion of an entire volume of the sample.

Q8. A method for quantifying analytes in a relevant volume of a sample, comprising:
  (a) perform the steps in the method of paragraph Q2, wherein one or both plates further comprise a binding site; and
  (b) measuring, after step (a), a signal related to the analytes from the relevant volume, wherein the relevant volume is at least a portion of an entire volume of the sample.

In the method of any of paragraphs Q7-8, in some embodiments, the signal related to the analyte is a signal directly from the analytes that binds to the binding site or a label attached to the analyte that binds to the binding site.

2.1-6 A Plate for Use in Quantifying Analyte Concentration in a Relevant Volume in a Sample Q9. A plate for use in quantifying analyte concentration in a relevant volume in a sample, comprising:
  a plate that comprises, on its surface, (i) spacers that have a predetermined inter-spacer distance and height, and (ii) a sample contact area for contacting a sample with analyte concentration in a relevant volume to be quantified, wherein at least one of the spacers is inside the sample contact area.

2.1-7 A Device for Use in Quantifying Analyte Concentration in a Relevant Volume in a Sample The concentration of target analytes and/or entity in a sample can be quantified or controlled, if the number of target analytes and/or entity in the sample are quantified, as well as the relevant volume of the sample is quantified.

Q10. A device for quantifying analyte concentration in a relevant volume in a sample, comprising:
  a first plate and a second plate that (a) are movable relative to each other into different configurations and (b) each has a sample contact area for contacting a sample with analyte concentration in a relevant volume to be quantified, wherein one or both of the plates comprise, on its surface(s), spacers that have a predetermined inter-spacer distance and height, and each of the spacers are fixed with respective plates;
  wherein one of the configurations is an open configuration, in which: the two plates are separated apart, the spacing between the plates is not regulated by the spacers, and the sample is deposited on one or both of the plates, wherein another of the configuration is a closed configuration, which is configured after the sample deposition in the open configuration; and in the closed configuration: the plates are facing each other, the spacers and the relevant volume of the sample are between the plates, the thickness of the relevant volume of the sample is regulated by the plates and the spacers and is thinner than that when the plates are in the open configuration, and at least one of the spacers is inside the sample; and
  wherein analyte concentration in the relevant volume of the sample is quantified in the closed configuration, and the relevant volume is at least a portion of an entire volume of the sample.

In the device of any of paragraphs Q9 and Q10, the plate further comprises a binding site, or a storage site, or both. One embodiment of the binding site is a binding site that binds the analytes in the sample.

In the method or the device of any of paragraphs of Q1-10, in some embodiments, the measuring device includes at least one of an imager and a camera.

In the method or the device of any of paragraphs of Q1-10, in some embodiments, the measuring device is configured to image the lateral area of the relevant volume of the sample.

In the method or the device of any of paragraphs of Q1-10, in some embodiments, the measuring device includes a light source to illuminate the lateral area of the relevant volume of the sample.

In the method or the device of any of paragraphs of Q1-10, in some embodiments, the step of calculating the concentration is to divide the total target analytes or the entity by the relevant sample volume.

In the method or the device of any of paragraphs of Q1-10, in some embodiments, measuring signal is to use an optical imager to count the number of target analytes or entity.

For example, the measurement can be a use of optical microscope to measure blood cells (red cell, white cells, platelets) in a blood sample.

In the method or the device of any of paragraphs of Q1-10, in some embodiments, measuring the number of target analytes or entity in a sample can be an embodiment of surface-immobilization assay that catches the target analytes or the entity on the surface.

In some embodiments, an apparatus for quantifying a volume of a sample or detecting/quantifying an analyte in a sample comprises any of the devices in paragraphs Q1-10, plus (1) optical imagers, and/or (2) a light source and optical imagers, etc. The optical imager includes a photosensor, optical lenses, filters, polarizers, waveplates, beam splitters, mechanical mounts, or any combination thereof.

In some embodiments, the measuring of the relevant sample area or volume comprises (i) having a marker on the first plate, the cover plate, between them, or any combination thereof, (ii) taking optical imaging (e.g., taking a 2D (two-dimensional)/3D (three-dimensional) image of the sample and the image taking can be multiple times with different viewing angles, different wavelength, different phase, and/or different polarization) and (iii) image processing based on the maker and the sample images. The relevant means to be related to the determination of target analyte concentration.

Scanning. In some embodiments, the reading of a signal from a sample uses a scanning method, where a reader (e.g., photodetectors or camera) reads a portion of the sample (or plate) and then moves to another portion of the sample (or plate), and such process continues until certain pre-specified port of the sample (or plate) being read. The scan reading of a sample covers all parts of the sample (or the plate) or a fraction of the sample (or the plate). In some embodiments, the scan reading is assisted by the location markers that indicate a location of the sample (or the plate). One example of the location markers is the periodic spacers, which has a fixed period and location, or the markers for the relevant area, which also has predetermined location and size for indicating a location of the sample or plate.

2.2 Quantification by Correcting Effects Generated by None-Sample Volume

In a CROF process, often a sample is mixed with a non-sample-volume(s) which is due to objects that are not the sample, that include, but not limited to, spacers, air bubbles, dusts, or any combinations of thereof. The air bubbles or dust can be introduced using the sample deposition or other process in the CROF process. These non-sample objects occupy volume and inside the sample, which should be corrected in determine a relevant volume (a volume of interest) of a sample. One aspect of the present invention is to correct the effects generated by the non-sample volume inside a relevant volume of the sample between two plates, where the thickness of the relevant volume is regulated by spacers.

A method for correcting the effects generated by a none-sample material in determining a relevant volume of a sample between two plates, comprising:
  (a) obtaining a sample, wherein a relevant volume of the sample is to be quantified;
  (b) obtaining two plates that are movable relative to each other into different configurations, wherein one or both of the plates comprise spacers and the spacers have a predetermined inter-spacer distance and height, and each of the spacers is fixed with its respective plate;
  (c) depositing, when the plates are configured in an open configuration, the sample on one or both of the plates; wherein the open configuration is a configuration in which the two plates are partially or completely separated apart and the spacing between the plates is not regulated by the spacers;
  (d) after (c), bringing the plates into a closed configuration, wherein, in the closed configuration: the plates are facing each other, the spacers and the relevant volume of the sample are between the plates, the thickness of the relevant volume of the sample is regulated by the plates and the spacers and is thinner than the maximum thickness of the sample when the plates are in the open configuration, and the relevant volume may contain a volume of a none-sample material;
  (e) measuring, while the plates are in the closed configuration, (i) the lateral area of the relevant volume of the sample and (ii) the volume of the none-sample material; and
  (f) calculating the relevant volume of the sample by using the thickness of the relevant volume regulated by the spacers and correcting the effects of a none-sample material; wherein the relevant volume is at least a portion of an entire volume of the sample, and the none-sample materials are the materials that are not from the sample.
  the measuring of the non-sample volume is by imaging of the sample between the two plates.

3. Preservatives

It is yet another aspect of the present invention that sample is collected and preserved by preservative(s) using a single device with no need of additional apparatus or procedures.

In some embodiments, the device further comprises preservative on its sample contact area(s), which is used to prevent or slow the decomposition or undesirable chemical change of at least one component of the collected sample. The term "preservative" as used herein refers to substance that is capable of, when added to a bio/chemical sample, preventing or slowing the decomposition or undesirable chemical change of at least one component of the sample. The term "decomposition" as used herein refers to the process in which structure of biological units (such as tissues, cells, viruses, etc.) break down into smaller and/or simpler matter, for instance, cells become lysed when cell enclosure is broken down and cell contents released.

Figure 4:
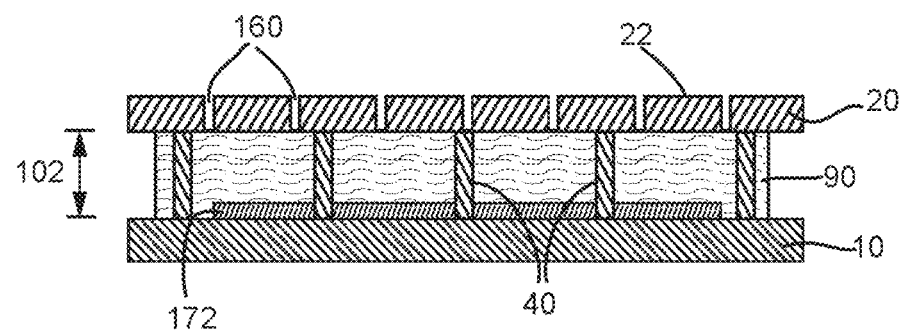
FIG. 4 illustrates exemplary embodiments of devices comprising preservatives according to the present invention. Panel (A) shows that the preservative is coated on the sample contact area of the first plate. Panel (B) illustrates a device that comprises trenches in the sample contact area of its first plate 10. The trenches are designed to contain the preservative.
Figure 4:
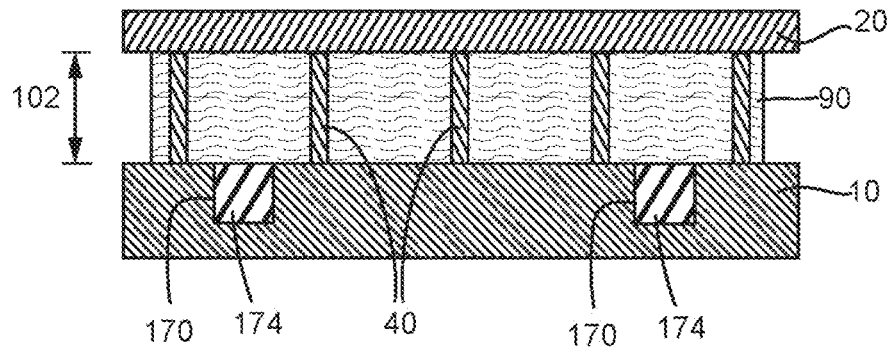

FIG. 4 schematically illustrates some exemplary embodiments of the device in which the device further comprises preservative inside its sample contact area. Specifically, as shown in panel (A), the preservative 172 is coated on the sample contact area (not indicated) of the first plate 10. Upon contacting the sample 90, the preservative 172 works to prevent or slow the decomposition or undesirable chemical change of at least one component of the sample. For instance, the preservative 172 may works to slow down microbial growth, which decomposes cells and biomolecules to absorb nutrition it needs. In other cases, the preservative 172 may comprise proteases inhibitor which inhibits the degradation of protein catalyzed by protease existing in the sample.

Panel (B) illustrates a device that comprises trenches 170 in the sample contact area (not indicated) of its first plate 10. The trenches are designed to contain the preservative 174 which serves to preserve at least one component of the sample 90.

In some embodiments, the design of the trenches 170 allows the capacity of containing liquid preservative in the plate, such as formalin solution or paraformaldehyde solution. There can be any reasonable number of trenches in the device, such as 1, 2, 3, 4, 5, 10, 20, 100, 500, or any number between any two of these values. The trenches can also have any suitable cross-sectional geometry. In some embodiments, the trenches are vertical, angled, curved, stepped, or any combination thereof.

3.1 Preservatives—Inhibiting Microbial Growth

In some embodiments, the preservative comprises a reagent preventing microbial growth, such as, but not limited to, Acetic Acid, Ascorbic Acid, Calcium Ascorbate, Erythorbic Acid, Iso-Ascorbic Acid, Potassium Nitrate, Potassium Nitrite, Sodium Ascorbate, Sodium Erythorbate, Sodium iso-Ascorbate, Sodium Nitrate, Sodium Nitrite, Wood Smoke, Benzoic Acid, Calcium Sorbate, *Carnobacterium divergens* M35, *Carnobacterium maltaromaticum* CB1, Ethyl lauroyl arginate, 4-Hexylresorcinol, *Leuconostoc, carnosum* 4010, Methyl-p-hydroxy Benzoate, Methyl Paraben, Potassium Acetate, Potassium Benzoate, Potassium Bisulphite, Potassium Diacetate, Potassium Lactate, Potassium Metabisulphite, Potassium Sorbate, Propyl-p-hydroxy Benzoate, Propyl Paraben, Sodium Acetate, Sodium Benzoate, Sodium Bisulphite, Sodium Diacetate, Sodium Lactate, Sodium Metabisulphite, Sodium Salt of Methyl-p-hydroxy Benzoic Acid, Sodium Salt of Propyl-p-hydroxy Benzoic Acid, Sodium Sorbate, Sodium Sulphite, Sodium Dithionite, Sorbic Acid, Sulphurous Acid, Calcium Propionate, Calcium Sorbate, Dimethyl dicarbonate, Natamycin, Propionic Acid, Sodium Diacetate, Sodium Propionate, Ascorbic Acid, Ascorbyl Palmitate, Ascorbyl Stearate, Butylated Hydro-xyanisole (a mixture of 2-tertiarybutyl-4-hydroxyanisole and 3-tertiarybutyl-4-hydroxyanisole), Butylated Hydroxytoluene (3,5-ditertiary-butyl-4-hydroxytoluene), Citric Acid, Citric Acid Esters of Mono- and Diglycerides, L-Cysteine, L-Cysteine Hydrochloride, Gum Guaiacum, Lecithin, Lecithin Citrate, Monoglyceride Citrate, Monoisopropyl Citrate, Propyl Gallate, Sodium metabisulphite, Tartaric Acid, Tertiary Butyl Hydroquinone, Tocopherols (alpha-tocopherol; tocopherols concentrate, mixed), Butylated hydroxyanisole (BHA), Caprylic Acid, Dilauryl thiodipropionate, Methylparaben, Potassium bisulfite, Potassium metabisulfite, Propyl gallatepy, Propylparaben, Sodium bisulfite, Sodium metabisulfite, Sodium sulfite, Stannous Chloride, Sulfur dioxide, Thiodipropionic acid, Tochopherols, sodium chloride, dextrose, and sucrose.

3.2 Preservatives—Stabilize Proteins

In some embodiments, the sample contains a biological sample including proteins, the preservative comprises a protease inhibitor selected from the group consisting of aspartic protease inhibitors, cysteine protease inhibitors, metalloprotease inhibitors, serine protease inhibitors, threonine protease inhibitors, trypsin inhibitors, or a combination thereof. The preservative may also comprise a protease inhibitor cocktail optimized to maintain and preserve protein functionality following cell lysis. In some embodiments, the preservative comprises a compound inhibiting proteases, such as, but not limited to, Aprotinin, Bestatin, Calpain inhibitor I and II, Chymostatin, E-64, Leupeptin (N-acetyl-L-leucyl-L-leucyl-L-argininal), alpha-2-Macroglobulin, Pefabloc SC, Pepstatin, PMSF (phenylmethanesulfonyl fluoride), serpin, or a combination thereof.

3.3 Preservatives—Stabilizing Nucleic Acids

In some embodiments, the sample contains a biological sample including nucleic acids and the preservative thus stabilizes nucleic acids, particularly RNA, in the sample stored in the layer of uniform thickness.

In some embodiments, the preservative can maintain RNA in high quality. RNA quality can be quantified as an RIN (RNA integrity number) number, wherein the RIN can be calculated by an algorithmic assessment of the amounts of various RNAs present within the extracted RNA. High-quality cellular RNA can exhibit a RIN value approaching 10. In one or more embodiments, the RNA extracted from the sample stored in the layer of uniform thickness has a RIN value of at least 4. In some embodiments, the preservative therein provides for ambient extraction and stabilization of a bio-sample and produces intact, high-quality RNA with a RIN value in a range from about 4 to about 10, or in some embodiments, the RIN value is in a range from about 5 to about 8. The preservative can be a dry material configured to provide a pH between about 2 and about 7 upon hydration for extracting RNA. The preservative can stabilize the extracted RNA with an RNA Integrity Number (RIN) of at least 4.

In some embodiments, the preservative stabilizing nucleic acids can comprise a protein denaturant, a reducing agent, buffer, a free-radical trap, a chaotropic agent, a detergent, an RNase inhibitor, or a combination thereof in the solid matrix in a dried format. The composition of the preservative stabilizing nucleic acids can be found, e.g., in PCT Application No. PCT/US2016/051157.

The protein denaturants can be a chaotropic agent or a chaotropic salt. A chaotropic agent can be butanol, ethanol, guanidine chloride, guanidine hydrochloride, guanidine isothiocyanate, lithium perchlorate, lithium acetate, magnesium chloride, phenol, propanol, sodium iodide, sodium thiocyanate, thiourea, urea, or any combination thereof. The concentration of the chaotropic agent in a buffer can be about 0.1 mM, 1 mM, 10 mM, 100 mM, 1 M, 6 M, or 8 M. The concentration of the chaotropic agent in a buffer can be at least 0.1 mM, 1 mM, 10 mM, 100 mM, 1 M, 6 M, or 8 M. The concentration of the chaotropic agent in a buffer can be less than 0.1 mM, 1 mM, 10 mM, 100 mM, 1 M, 6 M, or 8 M.

The reducing agents can be, e.g., beta-mercaptoethanol (BME), 2-aminoethanethiol (2MEA-HCl (cysteamine-HCl)), dithiothreitol (DTT), glutathione (GSH), tris(2-carboxyethyl)phosphine (TECP), or any combination thereof. The concentration of the one or more reducing agents can be about 0.1 mM, 0.5 mM, 1 mM, 10 mM, 50 mM, 100 mM, 250 mM, or 500 mM. The concentration of the one or more reducing agents can be less than 0.5 mM, 1 mM, 10 mM, 50 mM, 100 mM, 250 mM, or 500 mM. For example, the concentration of DTT can be from about 0.05 mM to about 100 mM, from about 0.5 mM to about 50 mM, or from about 5 mM to about 10 mM. The concentration of TCEP can be from about 0.05 mM to about 50 mM, from about 0.5 mM to about 50 mM, or from about 0.5 mM to about 5 mM. The concentration of BME can be from about 0.05% to about 10%, from about 0.5% to about 5%, or from about 1% to about 10%. The concentration of GSH can be from about 0.05 mM to about 25 mM, from about 0.5 mM to about 10 mM, or from about 5 mM to about 10 mM, The concentration of the one or more reducing agents can be about 1 mM, 10 mM, 50 mM, 100 mM, 250 mM, or 500 mM.

The buffer can be, e.g., saline, citrate, phosphate, phosphate buffered saline (PBS), acetate, glycine, tris(hydroxymethyl)aminomethane (tris) hydrochloride, tris buffered saline (TBS), 3-[[1,3-dihydroxy-2-(hydroxymethyl)propan-2-yl]amino]propane-1-sulfonic acid (TAPS), bicine, tricine, 3-[[1,3-dihydroxy-2-(hydroxymethyl)propan-2-yl]amino]-2-hydroxypropane-1-sulfonic acid (TAPSO), 4-(2-hydroxyethyl)-1-piperazineethanesulfonic acid (HEPES), piperazine-N,N'-bis(2-ethanesulfonic acid) (PIPES), 3-(N-morpholino)propanesulfonic acid (MOPS), 2-(N-morpholino)ethanesulfonic acid (MES), 2-[[1,3-dihydroxy-2-(hydroxymethyl)propan-2-yl]amino]ethanesulfonic acid (TES), cacodylate, glycine, carbonate, or any combination thereof. The buffering agent can be present at a concentration of from about 0.1 mM to about 500, from about 0.1 mM to about 400 mM, from about 0.1 mM to about 300 mM, from about 0.1 mM to about 200 mM, from about 0.1 mM to about 100 mM, from about 0.1 mM to about 50 mM, from about 0.1 mM to about 25 mM, from about 0.1 mM to about 20 mM, from about 0.1 mM to about 15 mM, from about 0.1 mM to about 10 mM, from about 0.1 mM to about 5 mM, from about 0.1 mM to about 4 mM, from about 0.1 mM to about 3 mM, from about 0.1 mM to about 2 mM, from about 0.1 mM to about 1 mM, from about 0.1 mM to about 0.9 mM, from about 0.1 mM to about 0.8 mM, from about 0.1 mM to about 0.7 mM, from about 0.1 mM to about 0.6 mM, from about 0.1 mM to about 0.5 mM, from about 0.1 mM to about 0.4 mM, from about 0.1 mM to about 0.3 mM, or from about 0.1 mM to about 0.2 mM. The buffering agent can be present at a concentration of less than 500 mM, less than 400 mM, less than 300 mM, less than 200 mM, less than 100 mM, less than 50 mM, less than 25 mM, less than 20 mM, less than 15 mM, less than 10 mM, less than 5 mM, less than 4 mM, less than 3 mM, less than 2 mM, less than 1 mM, less than 0.9 mM, less than 0.8 mM, less than 0.7 mM, less than 0.6 mM, less than 0.5 mM, less than 0.4 mM, less than 0.3 mM, less than 0.2 mM, or less than 0.1 mM. The buffering agent can be present at about 0.1 mM, 1 mM, 10 mM, 25 mM, or 50 mM. The buffering agent can be present at at least 0.1 mM, 1 mM, 10 mM, 25 mM, or 50 mM.

The RNase inhibitor can comprise a triphosphate salt, pyrophosphate salt an acid, or an acid-titrated buffer reagent.

3.4 Other Preservatives

In some embodiments, the preservative comprises an inhibitor of a biological enzyme, such as, but not limited to, RNases, DNases, oxidoreductases, transferases, hydrolases, lyases, isomerases, and ligases.

In some embodiments, the preservative comprises any suitable chemical substances that are capable of preserving the desirable component of the sample. It is another aspect of the present invention that sample is collected and chemically pre-treated using a single device with no need of additional apparatus or procedures before sent for further a assay/sampling/reaction.

4 Other Reagents and Sample Treatment

In some embodiments, the device further comprises chemicals on its sample contact area(s), which is used to treat the sample for certain purposes, for instance, cell lysis, staining, biomaterial extraction (e.g., DNA and/or RNA extraction, protein precipitation), dehydration, protease inhibition, RNase inhibition, phosphatase inhibition, etc. The chemicals include, but not limited to, dyes, desiccants, enzyme inhibitors, chemical lysis reagents, and any combination thereof.

In some embodiments, the chemicals are coated (dried) on the respective sample contact area. In some embodiments, the chemicals are stored in the trenches or other surface patterns as described above.

Other Treatments of the Sample

It is another aspect of the present invention that sample is collected and pre-treated using a single device with no need of additional apparatus or procedures before sent for further assay/sampling/reaction.

In some embodiments, the QMAX device further comprises micro- or nanostructures, elements or features configured for selective mechanical lysing of the cells contained in the sample. In some embodiments, the QMAX device further comprises micro- or nanostructures, elements or features configured for biomaterial extraction (e.g., DNA and/or RNA extraction, protein precipitation). In some embodiments, the QMAX device further comprises micro- or nanostructures, elements or features configured for controlled temperature manipulation of the sample. In some embodiments, the QMAX device further comprises micro- or nanostructures, elements or features configured for selectively separating components from the sample ("filtering"). In some embodiments, the QMAX device further comprises elements or features configured for other treatments of the sample. These various embodiments of the device and method include, but not limited to, the embodiments as disclosed, as disclosed, described, and/or referred to in the following applications: PCT Application No. PCT/US2016/045437, which was filed on Aug. 10, 2016, PCT Application No. PCT/US2016/051775, which was filed on Sep. 14, 2016, PCT Application No. PCT/US2016/051794, which was filed on Sep. 14, 2016, U.S. Provisional Application No. 62/369,181, which was filed on Jul. 31, 2016, No. 62/412,006, which was filed on Oct. 24, 2016, No. 62/437,339, which was filed on Dec. 21, 2016, No. 62/431,639, which was filed on Dec. 9, 2016, No. 62/456,065, which was filed on Feb. 7, 2017, No. 62/456,287, which was filed on Feb. 8, 2017, No. 62/456,488, which was filed on Feb. 8, 2017, No. 62/456,528, which was filed on Feb. 8, 2017, No. 62/456,537, which was filed on Feb. 8, 2017, No. 62/456,612, which was filed on Feb. 8, 2017, No. 62/456,631, which was filed on Feb. 8, 2017, No. 62/456,590, which was filed on Feb. 8, 2017, No. 62/456,638, which was filed on Feb. 8, 2017, No. 62/456,598, which was filed on Feb. 8, 2017, No. 62/456,552, which was filed on Feb. 8, 2017, No. 62/456,603, which was filed on Feb. 8, 2017, No. 62/456,585, which was filed on Feb. 8, 2017, No. 62/456,628, which was filed on Feb. 8, 2017, No. 62/456,504, which was filed on Feb. 8, 2017, No. 62/456,988, which was filed on Feb. 9, 2017, No. 62/457,084, which was filed on Feb. 9, 2017, No. 62/457,031, which was filed on Feb. 9, 2017, No. 62/456,904, which was filed on Feb. 9, 2017, No. 62/457,075, which was filed on Feb. 9, 2017, No. 62/457,009, which was filed on Feb. 9, 2017, No. 62/457,133, which was filed on Feb. 9, 2017, No. 62/457,103, which was filed on Feb. 9, 2017, No. 62/459,267, which was filed on Feb. 15, 2017, No. 62/459,303, which was filed on Feb. 15, 2017, No. 62/459,337, which was filed on Feb. 15, 2017, No. 62/459,232, which was filed on Feb. 15, 2017, No. 62/459,160, which was filed on Feb. 15, 2017, No. 62/459,496, which was filed on Feb. 15, 2017, No. 62/459,554, which was filed on Feb. 15, 2017, No. 62/459,577, which was filed on Feb. 15, 2017, No. 62/459,598, which was filed on Feb. 15, 2017, No. 62/459,602, which was filed on Feb. 15, 2017, which are all hereby incorporated in reference by their entireties.

The embodiments in these applications herein incorporated can be regarded in combination with one another or as a single invention, rather than as discrete and independent filings.

5 Methods of Sample Collection, Preservation, Transportation, and Recovery

It is yet another aspect of the present invention to provide methods of sample collection, preservation, transportation, and recovery.

In some embodiments, the method comprises the steps of:
(a) obtaining a liquid sample;
(b) obtaining a first plate, a second plate, and spacers, wherein:
  i. the plates are movable relative to each other into different configurations;
  ii. one or both plates are flexible;
  iii. each of the plates has, on its respective inner surface, a sample contact area for contacting a liquid sample to be preserved;
  iv. one or both of the plates comprise the spacers that are fixed with a respective plate;
  v. the spacers have a predetermined substantially uniform height and a predetermined inter-spacer-distance; and
  vi. at least one of the spacers is inside the sample contact area;
(c) depositing the sample on one or both of the plates when the plates are in an open configuration,
  wherein in the open configuration the two plates are partially or entirely
  separated apart and the spacing between the plates is not regulated by the spacers; and (d) after (c), using the two plates to compress at least part of the sample into a layer of substantially uniform thickness that is confined by the sample contact surfaces of the plates, wherein the uniform thickness of the layer is regulated by the spacers and the plates, wherein the compressing comprises:

bringing the two plates together; and conformable pressing, either in parallel or sequentially, an area of at least one of the plates to press the plates together to a closed configuration, wherein the conformable pressing generates a substantially uniform pressure on the plates over the at least part of the sample, and the pressing spreads the at least part of the sample laterally between the sample contact surfaces of the plates, and wherein the closed configuration is a configuration in which the spacing between the plates in the layer of uniform thickness region is regulated by the spacers;

wherein a conformable pressing is a method that makes the pressure applied over an area is substantially constant regardless the shape variation of the outer surfaces of the plates; and wherein the parallel pressing applies the pressures on the intended area at the same time, and a sequential pressing applies the pressure on a part of the intended area and gradually moves to other area.

In some embodiments, the method requires no other apparatus or procedures for the sample collection. For instance, in some embodiments, the sample is prickled blood sample, and the collection of the blood sample is accomplished by simply: 1) directly contacting the prickled finger with one or both of the plates; 2) bringing the two plates together and compressing the plates into the closed configuration.

In some embodiments, the collected sample needs to be transported to a remote location for follow-up analysis/processing. The devices and methods of the present invention provide an easy-to-handle setup for the sample transportation.

In some embodiments, the method further comprises after compressing, keeping the sample in the closed plates at a predetermined temperature. In some embodiments, the temperature is lower than 100° C., lower than 80° C., lower than 60° C., lower than 40° C., lower than 20° C., lower than 10° C., lower than 0° C., lower than −10° C., lower than −20° C., lower than −30° C., lower than −40° C., lower than −50° C., lower than −60° C., lower than −70° C., lower than −80° C., lower than −90° C., lower than −100° C., or in the range of any two of these values, and the materials and structural design of the device are set to tolerate such storage temperature.

In some embodiments, the method further comprises after compressing, keeping the sample in the closed plates at a predetermined temperature, at which the layer of uniform thickness vaporizes and converts into a dried layer, wherein the dried layer is attached to one or both of the plates and preserves the components of the sample that do not vaporize in the layer of uniform thickness.

In some embodiments, such predetermined temperature is around 37° C. In some embodiments, such predetermined temperature is higher than −20° C., higher than 0° C., higher than 10° C., higher than 20° C., higher than 30° C., higher than 40° C., higher than 50° C., higher than 60° C., higher than 70° C., higher than 80° C., higher than 90° C., higher than 100° C., or in the range of any of these two values, and the materials and structural design of the device are set to tolerate such predetermined temperature.

It is yet another aspect of the present invention that it is easy to quantify the volume of the sample recovered from the device for any follow-up analysis and/or processing using the devices and methods of the present invention.

In some embodiments, the collected sample needs to be recovered for analysis/processing.

In some embodiments, the entirety of the sample collected in the device is used for the follow-up analysis and/or processing, and the volume can be determined using the aforementioned methods. Recovering the sample can be realized by either separating the two plates or immersing the two plates in certain liquid solution, in which the collected sample is dissolved and/or diffuses freely to the outside of the closed plates.

In some embodiments, only a part of the total volume of the sample collected in the device is recovered for the follow-up analysis and/or processing. In some embodiments, said part of sample is obtained by cutting out a part of the closed plates and recovering the sample in between the cut plates. Because the lateral area of said part of the closed plates can be easily determined, the volume of said part of the sample is also readily quantifiable. In some embodiments, the cutting out is conducted with the aid of visual marks over the sample contact area and indicative of the lateral area covered thereby. In some embodiments, the cutting out is followed by measuring the lateral area of the cut plates. In some embodiments, the measuring is conducted by imaging and image analysis as aforementioned. In some embodiments, the cutting out is performed by a cutting tool having cut-out area predetermined, for instance, a puncher having a fixed punching area may be used to punch out a part of the plates for sample recovery. In some embodiments, the cutting out is performed by anyone at any location receiving the device with sample collected therein. In some embodiments, the cutting out is performed without ties to volume determination.

5.1 Example—1

Referring now to FIG. 5, we experimentally tested an exemplary device to collect and preserve blood sample. QMAX cards were the device tested and comprised one planar PMMA plate (2S mm×2S mm×17S μm) and one X-plate (made in PMMA, 2S mm×2S mm×17S μm) with spacers (lateral size: 30×40 μm, height specified as "gap" later for each condition).

FIG. 5 shows the photos of liquid blood sample stored in a QMAX card (a) after pressing and (b) after being dried overnight. More specifically: (1-a) Photo of 0.08 μl blood stored in QMAX card with 2 μm gap after pressing; and (1-b) after being dried. (2-a) Photo of 0.4 μl blood stored in QMAX card with 2 μm gap after pressing; and (2-b) after being dried. (3-a) Photo of 1 μl blood stored in QMAX card with 30 μm gap after pressing; and (3-b) after being dried. (4-a) Photo of 5 μl blood stored in QMAX card with 30 μm gap after pressing; and (4-b) after being dried. (S-a) Photo of Sul plasma stored in QMAX card with 30 μm gap after pressing; and (S-b) after being dried. By measuring the area sizes in the QMAX cards, the initial area after pressing and final area after being dried are the same in all above cases.

6 Device and Method for Sample Collection

One aspect of the present invention also provides a device for collection of a liquid sample from a surface.

In some embodiments, the device comprises a first plate and a plurality of spacers that are fixed to the first plate. In some embodiments, the first plate has a sample contact area for contacting a sample to be collected. In some embodiments, the spacers have a predetermined substantially uniform height and a predetermined inter-spacer-distance.

In some embodiments, the spacers and the plate surface that the spacers are fixed on are configured to provide a capillary force that, when the plate with the spacers contacts the sample, attracts at least part of the sample to be deposited on the first plate.

In some embodiments, the device comprises a first plate, a second plate, and spacers.

In some embodiments, one or both of the plates are flexible. In some embodiments, each of the plates has, on its respective inner surface, a sample contact area for contacting a sample to be collected. In some embodiments, one or both of the plates comprise the spacers that are fixed with a respective plate. In some embodiments, the spacers have a predetermined substantially uniform height and a predetermined inter-spacer-distance. In some embodiments, at least one of the spacers is inside the sample contact area.

In some embodiments, the plates are movable relative to each other into different configurations. In some embodiments, one of the configurations is an open configuration, in which: the two plates are separated apart, the spacing between the plates is not regulated by the spacers. In some embodiments, another of the configurations is a closed configuration which is configured after the sample deposition in the open configuration, and in the closed configuration: at least part of the deposited sample is compressed by the two plates into a layer of uniform thickness, wherein the uniform thickness of the layer is confined by the inner surfaces of the two plates and is regulated by the plates and the spacers.

In some embodiments, the spacers and the plate surface that the spacers are fixed on are configured to provide a capillary force that, when the plate with the spacers contacts the sample at the open configuration, attracts at least part of the sample to be deposited on the plate.

Another aspect of the present invention provides a method for sample collection and in some embodiments, the method comprises the steps of:
  (a) obtaining a first plate and spacers that are fixed to the first plate, wherein the first plate has a sample contact area for contacting a sample to be collected, and wherein the spacers have a predetermined substantially uniform height and a predetermined inter spacer-distance, and
  (b) contacting a thin layer of liquid sample on a subject surface with the first plate and the spacers, wherein the spacers and the plate surface that the spacers are fixed on are configured to provide a capillary force that attracts at least part of the sample to be deposited on the first plate.

In some embodiments, the method comprises the steps of:
  (a) obtaining a first plate, a second plate, and spacers, wherein:
    i. the plates are movable relative to each other into different configurations,
    ii. one or both plates are flexible,
    iii. each of the plates has, on its respective inner surface, a sample contact area for contacting a liquid sample to be collected,
    iv. one or both of the plates comprise the spacers that are fixed with a respective plate,
    v. the spacers have a predetermined substantially uniform height and a predetermined inter-Spacer-distance, and
    vi. at least one of the spacers is inside the sample contact area;
  (b) contacting a thin layer of liquid sample on a subject surface with the plate that has the spacers fixed thereto when the plates are in an open configuration, wherein in the open configuration the two plates are partially or entirely separated apart and the spacing between the plates is not regulated by the Spacers, and wherein in the spacers and the plate surface that the spacers are fixed on are configured to provide a capillary force that, when the plate with the spacers contacts the sample at the open configuration, attracts at least part of the sample to be deposited on the plate, and
  (c) after (b), using the two plates to compress at least part of the deposited sample into a layer of substantially uniform thickness that is confined by the sample contact surfaces of the plates, wherein the uniform thickness of the layer is regulated by the spacers and the plates.

Figure 6:
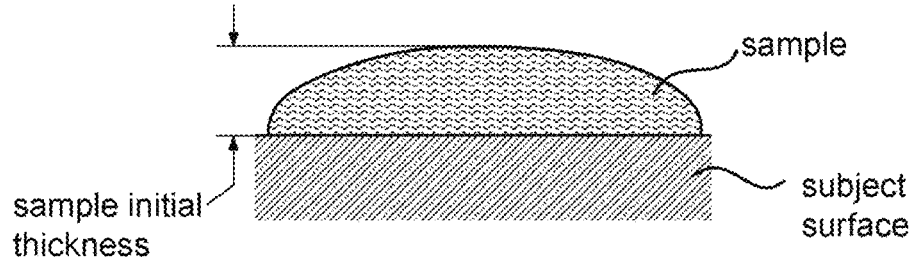
FIG. 6 shows an embodiment of device and method provided by the present invention for sample collection and analysis. Panel (A) shows a layer of liquid sample to be collected that is positioned on a subject surface and has an initial thickness. Panel (B) shows that the first plate and the spacers are applied against the subject surface and brought into contact with the liquid sample at an open configuration of the two plates. Panel (C) illustrates that a portion of the sample is retained on the first plate inner surface in the space between at least a portion of the spacers. Panel (D) shows the closed configuration of the two plates, where at least part of the deposited sample is compressed by the two plates into a layer of uniform thickness.
Figure 6:
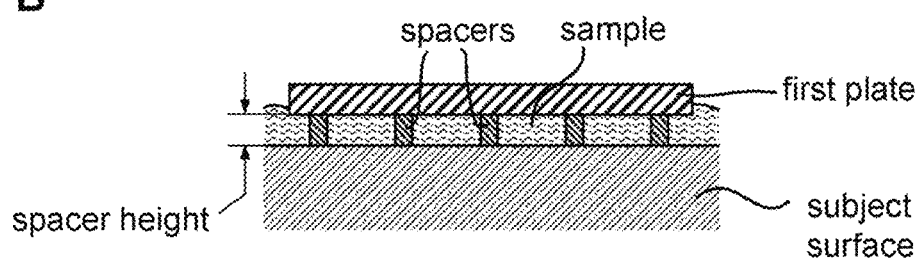
Figure 6:
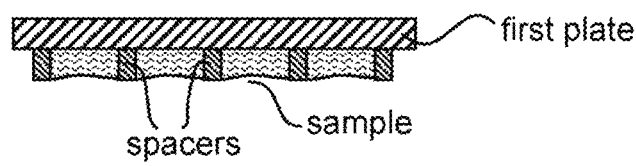
Figure 6:
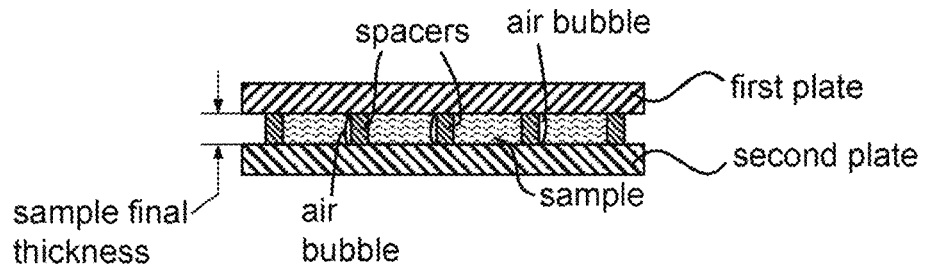

FIG. 6 shows an embodiment of device and method provided by the present invention for sample collection and sensing. As discussed above, the device comprises a first plate, a second plate, and spacers. As shown in the figure, the first plate has a plurality of spacers fixed thereon.

However, it should be noted that, in some embodiments, the spacers are fixed on the second plate or both the first and second plates. Panel (A) shows a layer of liquid sample that is positioned on a subject surface and has an initial thickness. The sample is to be collected and applied to a device for bio/chemical sensing/assay. Panel (B) shows that the first plate and the spacers are applied against the subject surface and brought into contact with the liquid sample at an open configuration of the two plates. At the open configuration, the two plates are separated apart, and the spacing between the two plates is not regulated by the spacers. Next, for the sample collection, the first plate is separated from the subject surface, as discussed above, the first plate inner surface and the spacers are configured to provide a capillary force that attracts at least part of the sample to be deposited on the first plate. Thus, as shown in panel (C), a portion of the sample is retained on the first plate inner surface in the space between at least a portion of the spacers. After the sample is collected on the first plate, the second plate is brought together with the first plate, and the two plates are compressed against each other to enter a closed configuration. Panel (D) shows the closed configuration of the two plates, where at least part of the deposited sample is compressed by the two plates into a layer of uniform thickness, and the uniform thickness of the layer (or the sample final thickness) is confined by the inner surfaces of the two plates and is regulated by the plates and the spacers.

In some embodiments, the initial thickness of the sample on the subject surface is 0.1 µm or less, 0.2 µm or less, 0.5 µm or less, 1 µm or less, 2 µm or less, 5 µm or less, 10 µm or less, 20 µm or less, 50 µm or less, 100 µm or less, 200 µm or less, 500 µm or less, 1 mm or less, 2 mm or less, 5 mm or less, 10 mm less, or any value in a range between any two of these values.

In some preferred embodiments, the initial thickness of the sample on the subject surface is 0.5 µm or less, 1 µm or less, 2 µm or less, 5 µm or less, 10 µm or less, 20 µm or less, 50 µm or less, 100 µm or less, 200 µm or less, 500 µm or less, 1 mm or less, 2 mm or less, or any value in a range between any two of these values.

In some embodiments, the subject surface is a skin surface of a subject, such as, but not limited to, a human subject, an animal subject, a plant subject, and any other inanimate subject.

In some embodiments, the subject surface is a surface of a device that is used in a laboratory setting, clinical setting, and/or any other appropriate settings. In some embodiments, the subject surface is a surface of a device for sample collection, transportation, processing, assay, and/or any other purposes.

In some embodiments, the sample comprises a bodily fluid such as, but not by way of limitation, amniotic fluid, aqueous humour, vitreous humour, blood (e.g., whole blood, fractionated blood, plasma or serum), breast milk, cerebrospinal fluid (CSF), cerumen (earwax), chyle, chime, endolymph, perilymph, feces, breath, gastric acid, gastric juice, lymph, mucus (including nasal drainage and phlegm), pericardial fluid, peritoneal fluid, pleural fluid, pus, rheum, saliva, exhaled breath condensates, sebum, semen, sputum, sweat, synovial fluid, tears, vomit, urine, and any combination thereof. In some embodiments, the subject surface is human skin, and the sample comprises Sweat, blood, mucous, and/or semen.

In some embodiments, the contacting of the sample on the surface by the plate with the spacers fixed thereon is a simple direct face-to-face collision between the plate inner surface and the surface that holds the sample thereon. In some embodiments, the contacting comprises a lateral movement along the surface.

In some embodiments, as illustrated in FIG. 6 panel (C), the sample collected on the plate has a surface that is concave between the spacers. It should be noted, however, in some embodiments, the sample collected on the plate has a surface that is either convex in between the spacers, or flat between the spacers, depending on the different surface tension of the sample and the surface wetting properties of the plate inner surface and the spacers.

In some embodiments, as illustrated in FIG. 6 panel (D), there are air bubbles trapped in the sample between the two plates, as a result of the concave surface of the sample shown in FIG. 6 panel (C). It should be noted, however, in some embodiments, there are no air bubbles trapped in the sample between the two plates, for reasons such as, but not limited to, that the sample collected by the plate with spacers has a convex surface or a flat surface.

In some embodiments, the spacers have a uniform height, as indicated in FIG. 6 panel (B), and, as mentioned above, the sample final thickness is regulated by the spacers. In some embodiments, the sample final thickness (or the uniform thickness of the layer) is equal to or approximately the spacer height.

7 Capillary Force for Sample Collection

Figure 7:
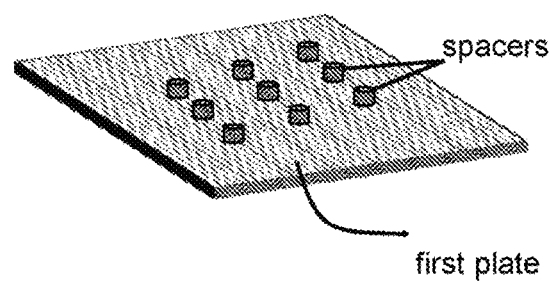
FIG. 7 illustrates an exemplary embodiment of a device for sample collection and sensing according to the present invention. Panel (A) shows a perspective view of the first plate and spacers. Panel (B) illustrates a side view of the first plate and spacers.
Figure 7:
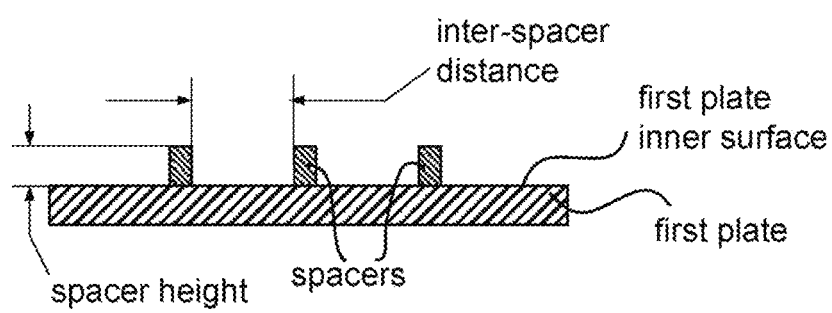

FIG. 7 illustrates an exemplary embodiment of a device for sample collection and sensing according to the present invention. The device comprises a first plate, a second plate, and spacers. In this exemplary embodiment, the spacers are fixed to the first plate. Panel (A) shows a perspective view of the first plate and spacers, while panel (B) shows a side view of the same.

As shown in the figure, the spacers are aligned in a periodic array with a constant inter-spacer distance. In some embodiments, however, the spacers are aligned in an aperiodic array, and the inter-spacer distance is not constant across the array. In other embodiments, the spacer array is periodic in some locations of the plate while non-periodic in other locations.

In some embodiments, as discussed above, when the plate with the spacers fixed thereon contacts the sample on the subject surface at the open configuration, the plate surface that the spacers are fixed on and the spacers are configured to provide a capillary force that attracts at least part of the sample to be deposited on the plate. In some embodiments, the wetting properties of the plate inner surface that the spacers fixed thereon and the spacers, the inter-spacer distance, and the spacer height are among many other factors that contribute to such a configuration providing said capillary force.

In some embodiments, the periodic array of the spacers is arranged as lattices of square, rectangle, triangle, hexagon, polygon, or any combinations thereof, where a combination means that different locations of a plate has different spacer lattices.

In some embodiments, the inter-spacer distance of a spacer array is periodic (i.e. uniform inter-spacer distance) in at least one direction of the array. In some embodiments, the inter-spacer distance is configured to improve the uniformity between the plate spacing at a closed configuration.

In some embodiments, the distance between neighboring spacers (i.e. the inter-spacer distance) is 1 µm or less, 5 µm or less, 7 µm or less, 10 µm or less, 20 µm or less, 30 µm or less, 40 µm or less, 50 µm or less, 60 µm or less, 70 µm or less, 80 µm or less, 90 µm or less, 100 µm or less, 200 µm or less, 300 µm or less, 400 µm or less, or in a range between any two of the values.

In certain embodiments, the inter-spacer distance is at 400 µm or less, 500 µm or less, 1 mm or less, 2 mm or less, 3 mm or less, 5 mm or less, 7 mm or less, 10 mm or less, or in any range between the values. In certain embodiments, the inter-spacer distance is 10 mm or less, 20 mm or less, 30 mm or less, 50 mm or less, 70 mm or less, 100 mm or less, or in any range between the values.

In some embodiments, all spacers have the same predetermined height. In some embodiments, spacers have different pre-determined heights. In some embodiments, spacers can be divided into groups or regions, wherein each group or region has its own spacer height. And in certain embodiments, the predetermined height of the spacers is an average height of the spacers. In some embodiments, the spacers have approximately the same height. In some embodiments, a percentage of number of the spacers have the same height. The spacer height (the predetermined spacer height), the spacing between the plates, and/or sample thickness is 3 nm or less, 10 nm or less, 50 nm or less, 100 nm or less, 200 nm or less, 500 nm or less, 800 nm or less, 1000 nm or less, 1 µm or less, 2 µm or less, 3 µm or less, 5 µm or less, 10 µm or less, 20 µm or less, 30 µm or less, 50 µm or less, 100 µm or less, 150 µm or less, 200 µm or less, 300 µm or less, 500 µm or less, 800 µm or less, 1 mm or less, 2 mm or less, 4 mm or less, or in a range between any two of the values.

In some embodiments, a plate has an inner surface that wets (i.e. contact angle is less 90 degree) the sample. In some embodiments, both plates have an inner surface that wets the sample, either with the same or different wettability. In some embodiments, a plate has an inner surface that wets the sample, and another plate has an inner surface that does not (i.e. the contact angle equal to or larger than 90 degrees). The wetting of a plate inner surface refers to a part or the entire area of the plate.

It is to be understood that it is the combinatory effect of the inter-spacer distance, the spacer height, the wetting properties of the plate and the spacers, and many other factors that determine the "attractiveness" to the sample to be collected, so that the sample is collected by the device through a simple direct contact between the plate with spacers and the sample.

8 Device and Method for Sample Sensing

Another aspect of the present invention is to provide devices and methods for sample collection and sensing to be performed with a single device, with no need of a separate sample collection or transportation device.

As illustrated in FIG. 6 panel (D), a second plate is used to compress the deposited sample into a thin layer. In some embodiments, the thin layer can be directly subject to bio/chemical sensing by the same device without the need of transferring the sample to a different device. The device is termed a QMAX (Q: quantification; M: magnifying, A. adding reagents, X: acceleration; also known as compressed regulated open flow (CROF)) device, and the process of such is termed as a QMAX process or CORF process.

Figure 8:
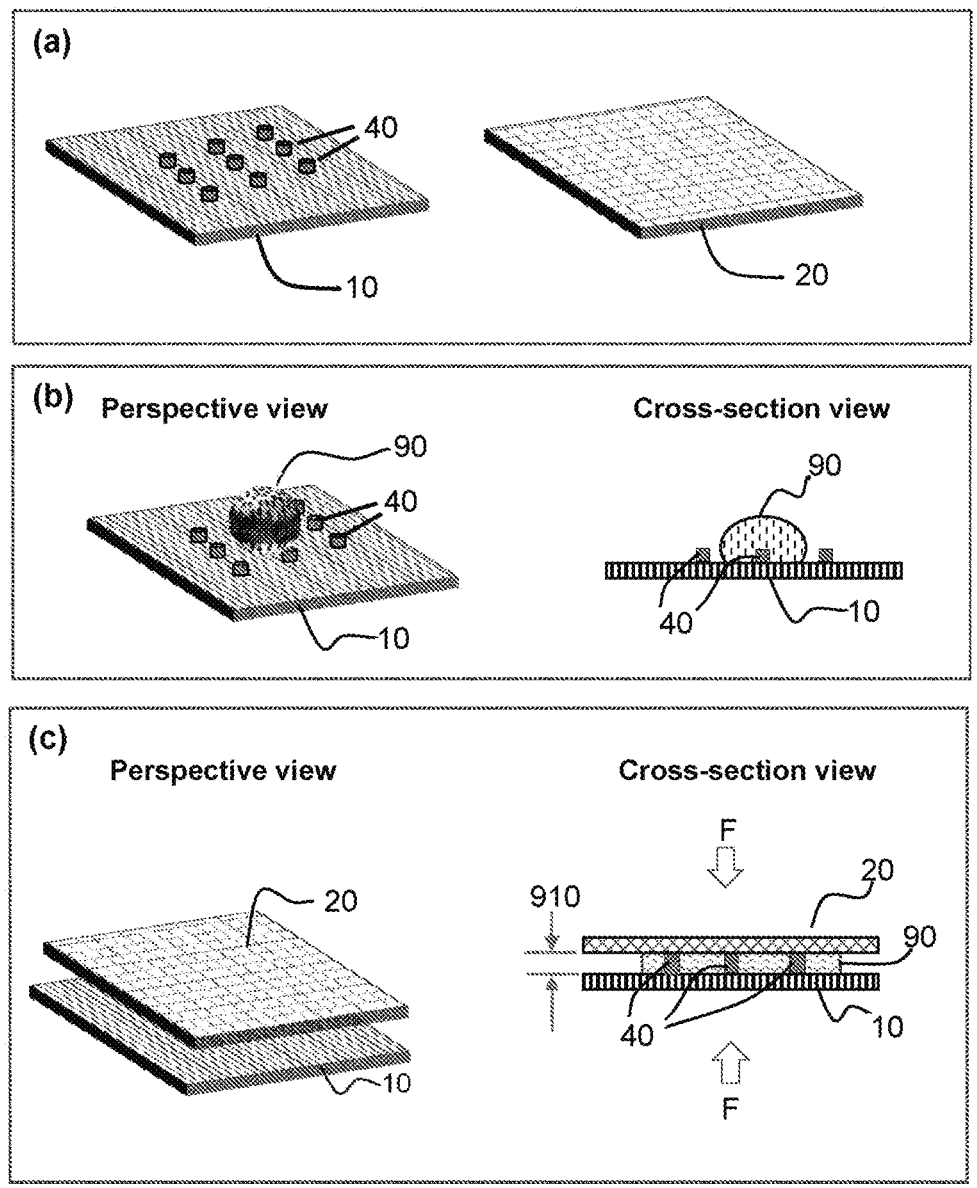
FIG. 8 shows an embodiment of a generic QMAX device for sample collection and sensing. Panel (A) shows the perspective view of a first plate and a second plate wherein the first plate has spacers. Panel (B) shows the perspective view and a sectional view of depositing a sample on the first plate at an open configuration. Panel (C) illustrates using the first plate and second plate to spread the sample and using the spacers and the plate to regulate the sample thickness at the closed configuration of the QMAX device.

FIG. 8 shows an embodiment of a generic QMAX device. The generic QMAX device comprises a first plate 10, a second plate 2 and spacers 40. In particular, panel (A) shows the perspective view of a first plate 10 and a second plate 20 wherein the first plate has spacers 40. It should be noted, however, that the spacers 40 can also be fixed on the second plate 20 (not shown) or on both first plate 10 and second plate 20 (not shown). Panel (B) shows the perspective view and a sectional view of depositing a sample 90 on the first plate 10 at an open configuration. It should be noted, however, that the sample 90 also can also be deposited on the second plate 20 (not shown), or on both the first plate 10 and the second plate 20 (not shown). Panel (C) illustrates (i) using the first plate 10 and second plate 20 to spread the sample 90 (the sample flow between the inner surfaces of the plates) and reduce the sample thickness, and (ii) using the spacers and the plate to regulate the sample thickness at the closed configuration of the QMAX device. The inner surfaces of each plate have one or a plurality of binding sites and or storage sites (not shown).

In some embodiments, the spacers 40 have a predetermined uniform height and a predetermined uniform inter-spacer distance. In the closed configuration, as shown in panel (C) of FIG. 6, the spacing between the plates and thus the thickness of the sample 90 is regulated by the spacers 40. In some embodiments, the uniform thickness of the sample 90 is substantially similar to the uniform height of the spacers 40. It should be noted that although FIG. 8 shows the spacers 40 to be fixed on one of the plates, in some embodiments the spacers are not fixed. For example, in certain embodiments the spacers are mixed with the sample so that when the sample is compressed into a thin layer, the spacers, which is rigid beads or particles that have a uniform size, regulate the thickness of the sample layer.

In some embodiments, one or both of the plates further comprise, on the respective sample contact area, reagent(s) for bio/chemical processing, preservation, reactions, and/or assay of the sample.

9 Other Descriptions of Embodiments

The present invention includes a variety of embodiments, which can be combined in multiple ways as long as the various components do not contradict one another. The embodiments should be regarded as a single invention file: each filing has other filing as the references and is also referenced in its entirety and for all purposes, rather than as a discrete independent. These embodiments include not only the disclosures in the current file, but also the documents that are herein referenced, incorporated, or to which priority is claimed.

The following methods, devices and systems are provided. These embodiments may be implemented using any of the components, materials, parameters or steps described above or below. The following embodiments use a QMAX plate.

9.1 A Device for Sample Preservation

Embodiment 1: A device for sample preservation, comprising:

a first plate, a second plate, and spacers, wherein:
  i. the plates are movable relative to each other into different configurations;
  ii. one or both plates are flexible;
  iii. each of the plates has, on its respective inner surface, a sample contact area for contacting a liquid sample to be preserved;
  iv. one or both of the plates comprise the spacers that are fixed with a respective plate;
  v. the spacers have a predetermined substantially uniform height and a predetermined inter-spacer-distance; and
  vi. at least one of the spacers is inside the sample contact area;

wherein one of the configurations is an open configuration, in which: the two plates are separated apart, the spacing between the plates is not regulated by the spacers, and the sample is deposited on one or both of the plates; and wherein another of the configurations is a closed configuration which is configured after the sample deposition in the open configuration; and in the closed configuration: at least part of the sample is compressed by the two plates into a layer of uniform thickness, wherein the uniform thickness of the layer is confined by the inner surfaces of the two plates and is regulated by the plates and the spacers.

In the device of Embodiment 1, the sample contains vaporizable components, wherein in the closed configuration, the layer of uniform thickness vaporizes and converts into a dried layer, which is attached to one or both of the plates and preserves the components of the sample that do not vaporize in the layer of uniform thickness.

In the device of Embodiment 1, the sample contains vaporizable components, wherein in the closed configuration, the layer of uniform thickness vaporizes and converts into a dried layer, which has a lateral contour deviating from a lateral contour of the layer of uniform thickness with no more than 5%.

In the device of Embodiment 1, one or both of the plates comprise one or more vents connecting the layer of uniform thickness to an outer surface of the respective plate.

In the device of Embodiment 1, one or both of the plates comprise one or more vents connecting the layer of uniform thickness to an outer surface of the respective plate, and the one or more vents are configured to facilitate the vaporization of the vaporizable components in the layer of uniform thickness.

In the device of Embodiment 1, one or both of the plates comprise one or more vents connecting the layer of uniform thickness to an outer surface of the respective plate, and the one or more vents are hydrophilic.

In the device of Embodiment 1, the device further includes preserving agent on the sample contact area of one or both of the plates, and the preserving agent is configured to prevent or slow decomposition or undesirable chemical change of at least one component of the sample in the layer of uniform thickness.

In the device of Embodiment 1, the device further includes reagents configured for a treatment of the sample, selected from the group consisting of: cell lysis, staining, dehydration, protease inhibition, RNase inhibition, phosphatase inhibition, and any combination thereof.

In the device of Embodiment 1, the device further includes preserving agent and other agents on the sample contact area of one or both of the plates, and the preserving agent and/or the reagent is coated on the sample contact area.

In the device of Embodiment 1, the device further includes one or more trenches inside the sample contact area of one or both of the plates, inside which the preserving agent is contained.

In the device of Embodiment 1, one or both of the plates are transparent.

In the device of Embodiment 1, one or both of the plates comprise visual marks over the respective sample contact area and indicative of size of a lateral area covered thereby.

In the device of Embodiment 1, one or both of the plates further comprise an enclosed spacer inside the sample contact area that is configured to laterally confine the layer of uniform thickness.

In the device of Embodiment 1, micro- or nanostructures, elements, and/or features configured for lysing, temperature manipulation, biomaterial extraction, and/or component separation.

9.2 A Method of Sample Collection and Preservation

Embodiment 2: A method of sample collection and preservation, comprising the steps of:
(a) obtaining a liquid sample;
(b) obtaining a first plate, a second plate, and spacers, wherein:
  (i) the plates are movable relative to each other into different configurations;
  (ii) one or both plates are flexible;
  (iii) each of the plates has, on its respective inner surface, a sample contact area for contacting a liquid sample to be preserved;
  (iv) one or both of the plates comprise the spacers that are fixed with a respective plate;
  (v) the spacers have a predetermined substantially uniform height and a predetermined inter-spacer-distance; and
  (vi) at least one of the spacers is inside the sample contact area;
(c) depositing the sample on one or both of the plates when the plates are in an open configuration,
wherein in the open configuration the two plates are partially or entirely separated apart and the spacing between the plates is not regulated by the spacers; and
(d) after (c), using the two plates to compress at least part of the sample into a layer of substantially uniform thickness that is confined by the sample contact surfaces of the plates, wherein the uniform thickness of the layer is regulated by the spacers and the plates, wherein the compressing comprises:
  bringing the two plates together; and
  conformable pressing, either in parallel or sequentially, an area of at least one of the plates to press the plates together to a closed configuration,
    wherein the conformable pressing generates a substantially uniform pressure on the plates over the at least part of the sample, and the pressing spreads the at least part of the sample laterally between the sample contact surfaces of the plates, and wherein the closed configuration is a configuration in which the spacing between the plates in the layer of uniform thickness region is regulated by the spacers;
  wherein a conformable pressing is a method that makes the pressure applied over an area is substantially constant regardless the shape variation of the outer surfaces of the plates; and wherein the parallel pressing applies the pressures on the intended area at the same time, and a sequential pressing applies the pressure on a part of the intended area and gradually move to other area.

In the method of Embodiment 2, the sample is blood, and the depositing step (c) is performed by directly contacting prickled finger with one or both of the plates.

In the method of Embodiment 2, during the step (b), the conformable pressing is by human hand.

In the method of Embodiment 2, the conformable pressing of step (d) is provided by a pressured liquid, a pressed gas, or a conformal material.

In the method of Embodiment 2, the method further includes: (e) after (d), measuring a lateral area of the layer of uniform thickness, and estimating the volume of the layer of uniform thickness by timing the lateral area thereof by the uniform height of the spacers.

In the method of Embodiment 2, the method further includes: (e) after (d), measuring a lateral area of the layer of uniform thickness, and the measuring is conducted by capturing and analyzing an image of the layer of uniform thickness; further, one or both of the plates are transparent.

In the method of Embodiment 2, the method further includes: (e) after (d), recovering a predetermined volume of the sample in the closed plates by: (1) cutting out a part of the closed plates having a predetermined lateral area; (2) obtaining the sample inside said part of the closed plates, wherein the predetermined lateral area times the uniform thickness of the spacers equals the predetermined volume, and wherein the predetermined volume is no more than a In the method of Embodiment 2, the method further includes: (e) after (d), recovering a predetermined volume of the sample in the closed plates by: cutting out a part of the closed plates having a predetermined lateral area, and the cutting out is conducted with aid of visual marks on one or both of the plates, wherein the visual marks are over the respective sample contact area and indicative of size of a lateral area covered thereby.

In the method of Embodiment 2, the method further includes: (e) after (d), recovering a predetermined volume of the sample in the closed plates by: cutting out a part of the closed plates having a predetermined lateral area, and the cutting out is performed by a cutting tool having a cut-out area predetermined.

In the method of Embodiment 2, the sample contains vaporizable components, wherein in the closed configuration, the layer of uniform thickness vaporizes and converts into a dried layer, which is attached to one or both of the plates and preserves the components of the sample that do not vaporize in the layer of uniform thickness.

In the method of Embodiment 2, the sample contains vaporizable components, wherein in the closed configuration, the layer of uniform thickness vaporizes and converts into a dried layer, which has a lateral contour deviating from a lateral contour of the layer of uniform thickness with no more than 5%.

In the method of Embodiment 2, the one or both of the plates comprise one or more vents connecting the layer of uniform thickness to an outer surface of the respective plate.

In the method of Embodiment 2, the one or both of the plates comprise one or more vents connecting the layer of uniform thickness to an outer surface of the respective plate, and the one or more vents are configured to facilitate the vaporization of the vaporizable components in the layer of uniform thickness.

In the method of Embodiment 2, the one or both of the plates comprise one or more vents connecting the layer of uniform thickness to an outer surface of the respective plate, and the one or more vents are hydrophilic.

In the method of Embodiment 2, one or both of the plates include preserving agent on the respective sample contact area, and wherein the preserving agent is configured to prevent or slow decomposition or undesirable chemical change of at least one component of the sample in the layer of uniform thickness.

In the method of Embodiment 2, one or both of the plates include reagents configured for a treatment of the sample, selected from the group consisting of: cell lysis, staining, dehydration, protease inhibition, RNase inhibition, phosphatase inhibition, and any combination thereof.

In the method of Embodiment 2, one or both of the plates include preserving agent on the respective sample contact area, and the preserving agent and/or reagent is coated on the sample contact area.

In the method of Embodiment 2, one or both of the plates include one or more trenches inside the sample contact area of one or both of the plates, inside which the preserving agent is contained.

In the method of Embodiment 2, one or both of the plates include one or both of the plates further comprise an enclosed spacer inside the sample contact area that is configured to laterally confine the layer of uniform thickness.

In the method of Embodiment 2, the method further includes: (e) after (d), keeping the sample in the closed plates at a predetermined temperature.

In the method of Embodiment 2, the method further includes: (e) after (d), keeping the sample in the closed plates at a predetermined temperature, at which the layer of uniform thickness vaporizes and converts into a dried layer, wherein the dried layer is attached to one or both of the plates and preserves the components of the sample that do not vaporize in the layer of uniform thickness.

In the method of Embodiment 2, the sample includes whole blood.

In the method of Embodiment 2, the sample includes blood plasma.

In the method of Embodiment 2, the sample is a biological sample selected from the group consisting of: cells, tissues, bodily fluids, stool, and any combination thereof.

In the method of Embodiment 2, the sample comprises a bodily fluid selected from the group consisting of: amniotic fluid, aqueous humour, vitreous humour, blood (e.g., whole blood, fractionated blood, plasma or serum), breast milk, cerebrospinal fluid (CSF), cerumen (earwax), chyle, chime, endolymph, perilymph, feces, breath, gastric acid, gastric juice, lymph, mucus (including nasal drainage and phlegm), pericardial fluid, peritoneal fluid, pleural fluid, pus, rheum, saliva, exhaled breath condensates, sebum, semen, sputum, sweat, synovial fluid, tears, vomit, urine, and any combination thereof.

In the method of Embodiment 2, the sample is an environmental sample from an environmental source selected from the group consisting of a river, lake, pond, ocean, glaciers, icebergs, rain, snow, sewage, reservoirs, tap water, drinking water, etc.; solid samples from soil, compost, sand, rocks, concrete, wood, brick, sewage, the air, underwater heat vents, industrial exhaust, vehicular exhaust and any combination thereof.

In the method of Embodiment 2, the sample is a foodstuff sample selected from the group consisting of: raw ingredients, cooked food, plant and animal sources of food, pre-processed food, partially or fully processed food, and any combination thereof.

In the method of Embodiment 2, one or both of the plates include micro- or nanostructures, elements, and/or features configured for lysing, temperature manipulation, biomaterial extraction, and/or component separation.

9.3 A Device for Sample Collection and Sensing

Embodiment 3: A device for sample collection and sensing, comprising:
a first plate, a second plate, and spacers, wherein:
 i. the plates are movable relative to each other into different configurations;
 ii. one or both plates are flexible;
 iii. each of the plates has, on its respective inner surface, a sample contact area for contacting a liquid sample to be collected;
 iv. one or both of the plates comprise the spacers that are fixed with a respective plate; the spacers have a predetermined substantially uniform height and a predetermined inter-spacer-distance; and
 v. at least one of the spacers is inside the sample contact area;
wherein one of the configurations is an open configuration, in which: the two plates are separated apart, the spacing between the plates is not regulated by the spacers;
wherein the spacers and the plate surface that the spacers are fixed on are configured to provide a capillary force that, when the plate with the spacers contacts the sample at the open configuration, attracts at least part of the sample to be deposited on the plate; and
wherein another of the configurations is a closed configuration which is configured after the sample deposition in the open configuration; and in the closed configuration: at least part of the deposited sample is compressed by the two plates into a layer of uniform thickness, wherein the uniform thickness of the layer is confined by the inner surfaces of the two plates and is regulated by the plates and the spacers.

Embodiment 4: A device for sample collection and sensing, comprising a first plate and a plurality of spacers that are fixed to the first plate, wherein the first plate has a sample contact area for contacting a sample to be collected, wherein the spacers have a predetermined substantially uniform height and a predetermined inter-spacer-distance, and wherein the spacers and the plate surface that the spacers are fixed on are configured to provide a capillary force that, when the plate with the spacers contacts the sample, attracts at least part of the sample to be deposited on the first plate.

9.4 A Method for Sample Collection and Sensing

Embodiment 5: A method of sample collection and sensing, comprising the steps of:
(a) obtaining a first plate, a second plate, and spacers, wherein:
 i. the plates are movable relative to each other into different configurations;
 ii. one or both plates are flexible;
 iii. each of the plates has, on its respective inner surface, a sample contact area for contacting a liquid sample to be collected;
 iv. one or both of the plates comprise the spacers that are fixed with a respective plate;
 v. the spacers have a predetermined substantially uniform height and a predetermined inter-spacer-distance; and vi. at least one of the spacers is inside the sample contact area;
(b) contacting a thin layer of liquid sample on a subject surface with the plate that has the spacers fixed thereto when the plates are in an open configuration,
wherein in the open configuration the two plates are partially or entirely separated apart and the spacing between the plates is not regulated by the spacers; and
wherein the spacers and the plate surface that the spacers are fixed on are configured to provide a capillary force that, when the plate with the spacers contact the sample at the open configuration, attracts at least part of the sample to be deposited on the plate; and
(c) after (b), using the two plates to compress at least part of the deposited sample into a layer of substantially uniform thickness that is confined by the sample contact surfaces of the plates, wherein the uniform thickness of the layer is regulated by the spacers and the plates, wherein the compressing comprises:
bringing the two plates together; and
conformable pressing, either in parallel or sequentially, an area of at least one of the plates to press the plates together to a closed configuration, wherein the conformable pressing generates a substantially uniform pressure on the plates over the at least part of the sample, and the pressing spreads the at least part of the sample laterally between the sample contact surfaces of the plates, and wherein the closed configuration is a configuration in which the spacing between the plates in the layer of uniform thickness region is regulated by the spacers;
wherein a conformable pressing is a method that makes the pressure applied over an area is substantially constant regardless the shape variation of the outer surfaces of the plates; and
wherein the parallel pressing applies the pressures on the intended area at the same time, and a sequential pressing applies the pressure on a part of the intended area and gradually move to other area.

Embodiment 6. A method of sample collection and sensing, comprising the steps of:
(a) obtaining a first plate and spacers that are fixed to the first plate, wherein the first plate has a sample contact area for contacting a sample to be collected, and wherein the spacers have a predetermined substantially uniform height and a predetermined inter-spacer-distance; and
(b) contacting a thin layer of liquid sample on a subject surface with the first plate and the spacers, wherein the spacers and the plate surface that the spacers are fixed on are configured to provide a capillary force that attracts at least part of the sample to be deposited on the first plate.

9.5 Additional Devices or Methods for Sample Collection and Sensing

In the device of Embodiment 3 or 4 or in the method of Embodiment 5 or 6, one or both of the plates further includes, on the respective sample contact area, reagent for a bio/chemical assay of the sample.

In the device of Embodiment 3 or 4 or in the method of Embodiment 5 or 6, one or both of the plates further includes, on the respective sample contact area, reagent for processing the sample.

In the device of Embodiment 3 or 4 or in the method of Embodiment 5 or 6, one or both of the plates further include, on the respective sample contact area, reagent for preserving the sample.

In the method of Embodiment 5 or 6, the sample includes sweat.

In the method of Embodiment 5 or 6, the sample includes blood.

In the method of Embodiment 5 or 6, the sample includes mucous.

In the method of Embodiment 5 or 6, the sample includes a bodily fluid selected from the group consisting of: amniotic fluid, aqueous humour, vitreous humour, blood (e.g., whole blood, fractionated blood, plasma or serum), breast milk, cerebrospinal fluid (CSF), cerumen (earwax), chyle, chime, endolymph, perilymph, feces, breath, gastric acid, gastric juice, lymph, mucus (including nasal drainage and phlegm), pericardial fluid, peritoneal fluid, pleural fluid, pus, rheum, saliva, exhaled breath condensates, sebum, semen, sputum, sweat, synovial fluid, tears, vomit, urine, and any combination thereof.

In the method of Embodiment 5 or 6, the sample is an environmental sample from an environmental source selected from the group consisting of a river, lake, pond, ocean, glaciers, icebergs, rain, Snow, Sewage, reservoirs, tap water, drinking water, etc.; Solid Samples from soil, compost, sand, rocks, concrete, wood, brick, sewage, the air, underwater heat vents, industrial exhaust, vehicular exhaust and any combination thereof.

In the method of Embodiment 5 or 6, the sample is a foodstuff sample selected from the group consisting of raw ingredients, cooked food, plant and animal sources of food, preprocessed food, partially or fully processed food, and any combination thereof.

10 Additional Features

Further examples of inventive subject matter according to the present disclosure are described in the following enumerated paragraphs.

10.1 Q-Card, Spacer and Uniform Sample Thickness

Q-Card

The devices, apparatus, systems, and methods herein disclosed can include or use a QMAX device ((CR: quantification; M: magnifying, A. adding reagents, X: acceleration; also known as Q-card in some embodiments or compressed regulated open flow (CROF) device), which include the QMAX device listed, described and/or summarized in PCT Application (designating U.S.) Nos. PCT/US2016/045437 filed on Aug. 10, 2016, and U.S. Provisional Application Nos. 62/431,639 filed on Dec. 9, 2016 and 62/456,287 filed on Feb. 8, 2017, which are all hereby incorporated by reference by their entireties.

As used here, the terms "CROF Card (or card)", "COF Card", "QMAX-Card", "Q-Card", "CROF device", "COF device", "QMAX-device", "CROF plates", "COF plates", and "QMAX-plates" are interchangeable, except that in some embodiments, the COF card does not comprise spacers, and the terms refer to a device that comprises a first plate and a second plate that are movable relative to each other into different configurations (including an open configuration and a closed configuration), and that comprises spacers (except some embodiments of the COF) that regulate the spacing between the plates. The term "X-plate" refers to one of the two plates in a CROF card, wherein the spacers are fixed to this plate. More descriptions of the COF Card, CROF Card, and X-plate are described in the provisional application Ser. Nos. 62/456,065, filed on Feb. 7, 2017, which is incorporated herein in its entirety for all purposes.

The term "compressed open flow (COF)" refers to a method that changes the shape of a flowable sample deposited on a plate by (i) placing other plate on top of at least a part of the sample and (ii) then compressing the sample between the two plates by pushing the two plates towards each other, wherein the compression reduces a thickness of at least a part of the sample and makes the sample flow into open spaces between the plates. The term "compressed regulated open flow" or "CROF" (or "self-calibrated compressed open flow" or "SCOF" or "SCCOF") (also known as QMAX) refers to a particular type of COF, wherein the final thickness of a part or entire sample after the compression is "regulated" by spacers, wherein the spacers are placed between the two plates. Here the CROF device is used interchangeably with the QMAX Card.

The term "open configuration" of the two plates in a QMAX process means a configuration in which the two plates are either partially or completely separated apart and the spacing between the plates is not regulated by the spacers.

The term "closed configuration" of the two plates in a QMAX process means a configuration in which the plates are facing each other, the spacers and a relevant volume of the sample are between the plates, the relevant spacing between the plates, and thus the thickness of the relevant volume of the sample, is regulated by the plates and the spacers, wherein the relevant volume is at least a portion of an entire volume of the sample.

The term "a sample thickness is regulated by the plate and the spacers" in a QMAX process means that for a give condition of the plates, the sample, the spacer, and the plate compressing method, the thickness of at least a port of the sample at the closed configuration of the plates can be predetermined from the properties of the spacers and the plate.

The term "inner surface" or "sample surface" of a plate in a QMAX card refers to the surface of the plate that touches the sample, while the other surface (that does not touch the sample) of the plate is termed "outer surface".

The term "height" or "thickness" of an object in a QMAX process refers to, unless specifically stated, the dimension of the object that is in the direction normal to a surface of the plate. For example, spacer height is the dimension of the spacer in the direction normal to a surface of the plate, and the spacer height and the spacer thickness means the same thing.

The term "area" of an object in a QMAX process refers to, unless specifically stated, the area of the object that is parallel to a surface of the plate. For example, spacer area is the area of the spacer that is parallel to a surface of the plate.

The term of QMAX card refers the device that perform a QMAX (e.g., CROF) process on a sample, and have or not have a hinge that connect the two plates.

The term "QMAX card with a hinge and "QMAX card" are interchangeable. The term "angle self-maintain", "angle self-maintaining", or "rotation angle self maintaining" refers to the property of the hinge, which substantially maintains an angle between the two plates, after an external force that moves the plates from an initial angle into the angle is removed from the plates.

In using QMAX card, the two plates need to be open first for sample deposition. However, in some embodiments, the QMAX card from a package has the two plates in contact with each other (e.g., a close position), and to separate them is challenging, since one or both plates are everything. To facilitate an opening of the QMAX card, opening notch or notches are created at the edges or corners of the first plate or both places, and, at the close position of the plates, a part of the second plate placed over the opening notch, hence in the notch of the first plate, the second plate can be lifted open without a blocking of the first plate.

In the QMAX assay platform, a QMAX card uses two plates to manipulate the shape of a sample into a thin layer (e.g., by compressing). In certain embodiments, the plate manipulation needs to change the relative position (termed: plate configuration) of the two plates several times by human hands or other external forces. There is a need to design the QMAX card to make the hand operation easy and fast.

In QMAX assays, one of the plate configurations is an open configuration, wherein the two plates are completely or partially separated (the spacing between the plates is not controlled by Spacers) and a sample can be deposited. Another Configuration is a closed Configuration, wherein at least part of the sample deposited in the open configuration is compressed by the two plates into a layer of highly uniform thickness, the uniform thickness of the layer is confined by the inner surfaces of the plates and is regulated by the plates and the spacers. In some embodiments, the average spacing between the two plates is more than 300 um.

In a QMAX assay operation, an operator needs to first make the two plates to be in an open configuration ready for sample deposition, then deposit a sample on one or both of the plates, and finally close the plates into a close position. In certain embodiments, the two plates of a QMAX card are initially on top of each other and need to be separated to get into an open configuration for sample deposition. When one of the plate is a thin plastic film (175 um thick PMA), such separation can be difficult to perform by hand. The present invention intends to provide the devices and methods that make the operation of certain assays, such as the QMAX Card assay, easy and fast.

In some embodiments, the QMAX device comprises a hinge that connect two or more plates together, so that the plates can open and close in a similar fashion as a book. In some embodiments, the material of the hinge is such that the hinge can self-maintain the angle between the plates after adjustment. In some embodiments, the hinge is configured to maintain the QMAX card in the closed configuration, such that the entire QMAX card can be slide in and slide out a card slot without causing accidental separation of the two plates. In some embodiments, the QMAX device comprises one or more hinges that can control the rotation of more than two plates. In some embodiments, the hinge is made from a metallic material that is selected from a group consisting of gold, silver, copper, aluminum, iron, tin, platinum, nickel, cobalt, alloys, or any combination thereof. In some embodiments, the hinge comprises a single layer, which is made from a polymer material, such as but not limited to plastics. The polymer material is selected from the group consisting of acrylate polymers, vinyl polymers, olefin polymers, Cellulosic polymers, noncellulosic polymers, polyester polymers, Nylon, cyclic olefin Copolymer (COC), poly(methyl methacrylate) (PMMB), polycarbonate (PC), cyclic olefin polymer (COP), liquid crystalline polymer (LCP), polyamide (PB), polyethylene (PE), polyimide (PI), polypropylene (PP), poly(phenylene ether) (PPE), polystyrene (PS), polyoxymethylene (POM), polyether ether ketone (PEEK), polyether sulfone (PES), poly(ethylene phthalate) (PET), polytetrafluoroethylene (PTFE), polyvinyl chloride (PVC), polyvinylidene fluoride (PVDF), polybutylene terephthalate (PBT), fluorinated ethylene propylene (FEP), perfluoroalkoxyalkane (PFB), polydimethylsiloxane (PDMS), rubbers, or any combinations of thereof. In some embodiments, the polymer material is selected from polystyrene, PMMB, PC, COC, COP, other plastic, or any combination thereof.

In some embodiments, the QMAX device comprises opening mechanisms such as but not limited to notches on plate edges or strips attached to the plates, making is easier for a user to manipulate the positioning of the plates, such as but not limited to separating the plates of by hand.

In some embodiments, the QMAX device comprises trenches on one or both of the plates. In certain embodiments, the trenches limit the flow of the sample on the plate.

The devices, systems, and methods herein disclosed can include or use Q-cards, spacers, and uniform sample thickness embodiments for sample detection, analysis, and quantification. In some embodiments, the Q-card comprises spacers, which help to render at least part of the sample into a layer of high uniformity. The structure, material, function, variation and dimension of the spacers, as well as the uniformity of the spacers and the sample layer, are herein disclosed, or listed, described, and summarized in PCT Application (designating U.S.) Nos. PCT/US2016/045437 and PCT/US0216/051775, which were respectively filed on Aug. 10, 2016 and Sep. 14, 2016, U.S. Provisional Application No. 62/456,065, which was filed on Feb. 7, 2017, U.S. Provisional Application No. 62/426,065, which was filed on Feb. 8, 2017, U.S. Provisional Application No. 62/456,504, which was filed on Feb. 8, 2017, all of which applications are incorporated herein in their entireties for all purposes.

Spacers

In essence, the term "spacers" or "stoppers" refers to, unless stated otherwise, the mechanical objects that set, when being placed between two plates, a limit on the minimum spacing between the two plates that can be reached when compressing the two plates together. Namely, in the compressing, the spacers will stop the relative movement of the two plates to prevent the plate spacing becoming less than a preset (i.e. predetermined) value.

The term "a spacer has a predetermined height" and "spacers have a predetermined inter spacer distance" means, respectively, that the value of the spacer height and the inter spacer distance is known prior to a QMAX process. It is not predetermined, if the value of the spacer height and the inter-spacer distance is not known prior to a QMAX process. For example, in the case that beads are sprayed on a plate as spacers, where beads are landed at random locations of the plate, the inter-spacer distance is not predetermined. Another example of not predetermined inter spacer distance is that the spacers move during a QMAX processes.

The term "a spacer is fixed on its respective plate" in a QMAX process means that the spacer is attached to a location of a plate and the attachment to that location is maintained during a QMAX (i.e. the location of the spacer on respective plate does not change) process. An example of "a spacer is fixed with its respective plate" is that a spacer is monolithically made of one piece of material of the plate, and the location of the spacer relative to the plate surface does not change during the QMAX process. An example of "a spacer is not fixed with its respective plate" is that a spacer is glued to a plate by an adhesive, but during a use of the plate, during the QMAX process, the adhesive cannot hold the spacer at its original location on the plate surface and the spacer moves away from its original location on the plate surface.

Plates:

para-embodiments preferred embodiments meters Shape: round, ellipse, rectangle, triangle, polygonal, ring—at least one of the two (or shaped, or any superposition of these shapes, the more) plates of the QMAX two (or more) plates of the QMAX card can have the same size and/or shape, or different size user safety concerns, and/or shape, Wherein the round corners have a diameter of 100 um or less, 200 um or less, 500 um or less, 1 mm or less, 2 mm or less, 5 mm or less, 10 mm or less, 50 mm or less, or in a range between any two of the values. Thickness the average thickness for at least one of the plates. For at least one of the is 2 nm or less, 10 nm or less, 100 nm or less, 200 plates is in the range of 0.5 nm or less, 500 nm or less, 1000 nm or less, 2 um to 1.5 mm; around 1 mm, in (micron) or less, 5 um or less, 10 um or less, 20 the range of 0.15 to 0.2 um or less, 50 um or less, 100 um or less, 150 um mm; or around 0.175 mm or less, 200 um or less, 300 um or less, 500 um or less, 800 um or less, 1 mm (millimeter) or less, 2 mm or less, 3 mm or less, 5 mm or less, 10 mm or less, 20 mm or less, 50 mm or less, 100 mm or less, 500 mm or less, or in a range between any two of these values lateral for at least one of the plate is 1 mm$^2$ (square for at least one plate of the area millimeter) or less, 10 mm$^2$ or less, 25 mm$^2$ or QMAX card is in the range of less, 50 mm$^2$ or less, 75 mm2 or less, 1 cm$^2$ (square centimeter) or less, 2 cm$^2$ or less, 3 cm$^2$ or less, 4 cm$^2$ or less, 5 cm$^2$ or less, 10 cm$^2$ or less, 100 cm$^2$ or less, 500 cm$^2$ or less, 1000 cm$^2$ or less, 5000 cm$^2$ or less, 10,000 cm$^2$ or less, 10,000 cm$^2$ or less, or in a range between any two of these values. 500 to 1000 mm$^2$ or around 750 mm$^2$. Lateral for at least one of the plates of the QMAX card is 1, for at least one plate of the Linear mm or less, 5 mm or less, 10 mm or less, 15 mm or QMAX card is in the range of dimensions less, 20 mm or less, 25 mm or less, 30 mm or less, of 20 to 30 mm; or around n (width, 35 mm or less, 40 mm or less, 45 mm or less, 50 24 mm length, or mm or less, 100 mm or less, 200 mm or less, 500 diameter, mm or less, 1000 mm or less, 5000 mm or less, or etc.) in a range between any two of these values recess 1 um or less, 10 um or less, 20 um or less, 30 um. In the range of 1 mm to 10 Width or less, 40 um or less, 50 um or less, 100 um or mm, or less, 200 um or less, 300 um or less, 400 um or about 5 mm or less, 500 um or less, 7500 um or less, 1 mm or less, 5 mm or less, 10 mm or less, 100 mm or less, or 1000 mm or less, or in a range between any two of these values.

Hand Pressing

For the devices, apparatus, systems, and methods herein disclosed, human hands can be used for manipulating or handling or the plates and/or samples. In some embodiments, human hands can be used to press the plates into a closed configuration; in some embodiments, human hands can be used to press the sample into a thin layer. The manners in which hand pressing is employed are described and/or summarized in PCT Application (designating U.S.) Nos. PCT/US2016/045437 filed on Aug. 10, 2016, and PCT/US0216/051775 filed on Sep. 14, 2016, and in US Provisional Application Nos. 62/431,639 filed on Dec. 9, 2016, 62/456,287 filed on Feb. 8, 2017, 62/456,065 filed on Feb. 7, 2017, 62/456,504 filed on Feb. 8, 2017, and 62/460,062 filed on Feb. 16, 2017, which are all hereby incorporated by reference by their entireties.

In some embodiments, human hand can be used to manipulate or handle the plates of the QMAX device. In certain embodiments, the human hand can be used to apply an imprecise force to compress the plates from an open configuration to a closed configuration. In certain embodiments, the human hand can be used to apply an imprecise force to achieve high level of uniformity in the thickness of the sample (e.g., less than 5%, 10%, 15%, or 20% variability).

10.2 Hinges. Opening, Notches, Recessed Edge and Sliders

The devices, systems, and methods herein disclosed can include or use Q-cards for sample detection, analysis, and quantification. In some embodiments, the Q-card comprises hinges, notches, recesses, and sliders, which help to facilitate the manipulation of the Q card and the measurement of the samples. The structure, material, function, variation and dimension of the hinges, notches, recesses, and sliders are herein disclosed, or listed, described, and summarized in PCT Application (designating U.S.) Nos. PCT/US2016/045437 and PCT/US0216/051775, which were respectively filed on Aug. 10, 2016 and Sep. 14, 2016, U.S. Provisional Application No. 62/456,065, which was filed on Feb. 7, 2017, U.S. Provisional Application No. 62/426,065, which was filed on Feb. 8, 2017, U.S. Provisional Application No. 62/456,504, which was filed on Feb. 8, 2017, all of which applications are incorporated herein in their entireties for all purposes.

Notch:

Parameters Embodiments Preferred Embodiments

Number 1, 2, 3, 4, 5, or more 1 Or. 2 Shape round, ellipse, rectangle, triangle, polygon, ring-Part of a Circle shaped, or any superposition or portion of these shapes.

Positioning any location along any edge except the hinge edge, or any corner joint by non-hinge edges lateral 1 mm or less, 2.5 mm or less, 5 mm or less, 10 In the range of 5 mm to 15 Linear mm or less, 15 mm or less, 20 mm or less, 25 mm. or about 10 mm Dimension mm or less, 30 mm or less, 40 mm or less, 50 (Length mm or less, or in a range between any two of along the these values edge, radius, etc.) Area 1 mm$^2$ (square millimeter) or less, 10 mm$^2$ or less. In the range of 10 to 25 mm$^2$ or less, 50 mm$^2$ or less, 75 mm$^2$ or less or mm$^2$ or about 50 mm$^2$ in a range between any two of these values.

Trench:

Parameters Embodiments Preferred Embodiments

Number 1, 2, 3, 4, 5, or more 1 or. 2 shape closed (round, ellipse, rectangle, triangle, polygon, ring-shaped, or any superposition or portion of these shapes) or open-ended (straight line, curved line, arc, branched tree, or any other shape with open endings), Length 0.001 mm or less, 0.005 mm or less, 0.01 mm or less, 0.05 mm or less, 0.1 mm or less, 0.5 mm or less, 1 mm or less, 2 mm or less, 5 mm or less, 10 mm or less, 20 mm or less, 50 mm or less, 100 mm or less, or in a range between any two of these values CrOSS-0.001 mm$^2$ or less, 0.005 mm$^2$ or less, 0.01 mm$^2$ or Sectional less, 0.05 mm$^2$ or less, 0.1 mm$^2$ or less, 0.5 mm$^2$ or area less, 1 mm$^2$ or less, 2 mm$^2$ or less, 5 mm$^2$ or less, volume 0.1 uL or more, 0.5 uL or more, 1 uL or more, 2 uL or more, 5 uL or more, 10 uL or more, 30 uL or more, 50 uL or more, 100 uL or more, 500 uL or more, 1 mL or more, or in a range between any two of these values in the range of 1 uL to 20 uL; or about 5 uL.

10.3 Q-Card, Sliders, and Smartphone Detection System

The devices, systems, and methods herein disclosed can include or use Q-cards for sample detection, analysis, and quantification. In some embodiments, the Q-cards are used together with sliders that allow the card to be read by a smartphone detection system. The structure, material, function, variation, dimension and connection of the Q-card, the sliders, and the smartphone detection system are herein disclosed, or listed, described, and summarized in PCT Application (designating U.S.) Nos. PCT/US2016/045437 and PCT/US0216/051775, which were respectively filed on Aug. 10, 2016 and Sep. 14, 2016, U.S. Provisional Application No. 62/456,065, which was filed on Feb. 7, 2017, U.S. Provisional Application No. 62/426,065, which was filed on Feb. 8, 2017, U.S. Provisional Application No. 62/456,504, which was filed on Feb. 8, 2017, all of which applications are incorporated herein in their entireties for all purposes.

In some embodiments of QMAX, the sample contact area of one or both of the plates comprises a compressed open flow monitoring surface structures (MSS) that are configured to monitoring how much flow has occurred after COF. For example, the MSS comprises, in some embodiments, shallow square array, which will cause friction to the components (e.g., blood cells in a blood) in a sample. By checking the distributions of some components of a sample, one can obtain information related to a flow, under a COF, of the sample and its components. The depth of the MSS can be $1/1000$, $1/100$, $1/100$, $1/5$, $1/2$ of the spacer height or in a range of any two values, and in either protrusion or well form.

Adaptor

The devices, apparatus, systems, and methods herein disclosed can be used with an adaptor, which is configured to accommodate the device and connect the device to a reader, such as but not limited to a smartphone. In some embodiments, the Q-cards are used together with sliders that allow the card to be inserted into the adaptor so that the card can be read by a smartphone detection system. The structure, material, function, variation, dimension and connection of the Q-card, the sliders, and the adaptor are disclosed, listed, described, and/or summarized in PCT Application (designating U.S.) Nos. PCT/US2016/045437 filed on Aug. 10, 2016 and PCT/US0216/051775 filed on Sep. 14, 2016, US Provisional Application Nos. 62/456,590 filed on Feb. 8, 2017, 62/459,554 filed on Feb. 15, 2017, and 62/460,075 filed on Feb. 8, 2017, all of which applications are incorporated herein in their entireties for all purposes.

In some embodiments, the adaptor comprises a receptacle slot, which is configured to accommodate the QMAX device when the device is in a closed configuration. In certain embodiments, the QMAX device has a sample deposited therein and the adaptor can be connected to a mobile device (e.g., a smartphone) so that the sample can be read by the mobile device. In certain embodiments, the mobile device can detect and/or analyze a signal from the sample. In certain embodiments, the mobile device can capture images of the sample when the sample is in the QMAX device and positioned in the field of view (FOV) of a camera, which in certain embodiments, is part of the mobile device.

In some embodiments, the adaptor comprises optical components, which are configured to enhance, magnify, and/or optimize the production of the signal from the sample. In some embodiments, the optical components include parts that are configured to enhance, magnify, and/or optimize illumination provided to the sample. In certain embodiments, the illumination is provided by a light source that is part of the mobile device. In some embodiments, the optical components include parts that are configured to enhance, magnify, and/or optimize a signal from the sample. The structures, functions, and configurations of the optical components in some embodiments can be found in PCT Application (designating U.S.) Nos. PCT/US2016/045437 filed on Aug. 10, 2016 and PCT/US0216/051775 filed on Sep. 14, 2016, US Provisional Application Nos. 62/456,590 filed on Feb. 8, 2017, 62/459,554 filed on Feb. 15, 2017, and 62/460,075 filed on Feb. 8, 2017, all of which applications are incorporated herein in their entireties for all purposes.

Smartphone

The devices, apparatus, systems, and methods herein disclosed can be used with a mobile device, such as but not limited to a smartphone. The smartphone detection technology is herein disclosed, or listed, described, and/or summarized in PCT Application (designating U.S.) Nos. PCT/US2016/045437 and PCT/US0216/051775, which were respectively filed on Aug. 10, 2016 and Sep. 14, 2016, U.S. Provisional Application No. 62/456,065, which was filed on Feb. 7, 2017, U.S. Provisional Application No. 62/456,287, which was filed on Feb. 8, 2017, and U.S. Provisional Application No. 62/456,504, which was filed on Feb. 8, 2017, all of which applications are incorporated herein in their entireties for all purposes.

In some embodiments, the smartphone comprises a camera, which can be used to capture images or the sample when the sample is positioned in the field of view of the camera (e.g., by an adaptor). In certain embodiments, the camera includes one set of lenses (e.g., as in iPhone™ 6). In certain embodiments, the camera includes at least two sets of lenses (e.g., as in iPhone™7). In some embodiments, the smartphone comprises a camera, but the camera is not used for image capturing.

In some embodiments, the smartphone comprises a light source such as but not limited to LED (light emitting diode). In certain embodiments, the light source is used to provide illumination to the sample when the sample is positioned in the field of view of the camera (e.g., by an adaptor). In some embodiments, the light from the light source is enhanced, magnified, altered, and/or optimized by optical components of the adaptor.

In some embodiments, the smartphone comprises a processor that is configured to process the information from the sample. The smartphone includes software instructions that, when executed by the processor, can enhance, magnify, and/or optimize the signals (e.g., images) from the sample. The processor can include one or more hardware components, such as a Central processing unit (CPU), an application-specific integrated circuit (ASIC), an application specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

In some embodiments, the smartphone comprises a communication unit, which is configured and/or used to transmit data and/or images related to the sample to another device. Merely by way of example, the communication unit can use a cable network, a wireline network, an optical fiber network, a telecommunications network, an intranet, the Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the smartphone is an iPhone™, an Android™ phone, or a Windows™ phone.

10.4 Detection Methods

The devices, systems, and methods herein disclosed can include or be used in various types of detection methods. The detection methods are herein disclosed, or listed, described, and summarized in PCT Application (designating U.S.) Nos. PCT/US2016/045437 and PCT/US0216/051775, which were respectively filed on Aug. 10, 2016 and Sep. 14, 2016, U.S. Provisional Application No. 62/456,065, which was filed on Feb. 7, 2017, U.S. Provisional Application No. 62/426,065, which was filed on Feb. 8, 2017, U.S. Provisional Application No. 62/456,504, which was filed on Feb. 8, 2017, all of which applications are incorporated herein in their entireties for all purposes.

10.5 Samples

The devices, apparatus, systems, and methods herein disclosed can be used for samples such as but not limited to diagnostic samples, clinical samples, environmental samples and foodstuff samples. The types of sample include but are not limited to the samples listed, described and/or summarized in PCT Application (designating U.S.) Nos. PCT/US2016/045437 and PCT/US0216/051775, which were respectively filed on Aug. 10, 2016 and Sep. 14, 2016, and are hereby incorporated by reference by their entireties.

In certain embodiments, the environmental sample is fresh from the source. In certain embodiments, the environmental sample is processed. For example, samples that are not in liquid form are converted to liquid form before the subject devices, apparatus, systems, and methods are applied.

In certain embodiments, samples that are not in liquid form are converted to liquid form before the subject devices, apparatus, systems, and methods are applied. The Subject devices, apparatus, systems, and methods can be used to analyze any volume of the sample. Examples of the volumes include, but are not limited to, about 10 mL or less, 5 mL or less, 3 mL or less, 1 microliter (uL, also "u" herein) or less, 500 puL or less, 300 ul or less, 250 uL or less, 200 uL or less, 170 uL or less, 150 uL or less, 125 uL or less, 100 uL or less, 75 uL or less, 50 uL or less, 25 uL or less, 20 uL or less, 15 uL or less, 10 uL or less, 5 uL or less, 3 uL or less, 1 uL or less, 0.5 uL or less, 0.1 uL or less, 0.05 uL or less, 0.001 uL or less, 0.0005 uL or less, 0.0001 uL or less, 10 pL or less, 1 poL or less, or a range between any two of the values.

In some embodiments, the volume of the sample includes, but is not limited to, about 100 uL or less, 75 uL or less, 50 uL or less, 25 uL or less, 20 uL or less, 15 uL or less, 10 uL or less, 5 uL or less, 3 uL or less, 1 uL or less, 0.5 uL or less, 0.1 uL or less, 0.05 uL or less, 0.001 uL or less, 0.0005 uL or less, 0.0001 uL or less, 10 p or less, 1 pL or less, or a range between any two of the values. In some embodiments, the volume of the sample includes, but is not limited to, about 10 ul or less, 5 u or less, 3 ul. Or less, 1 pull or less, 0.5 pull or less, 0.1 u or less, 0.05 uL or less, 0.001 uL or less, 0.0005 uL or less, 0.0001 uL or less, 10 pL or less, 1 pL or less, or a range between any two of the values.

In some embodiments, the amount of the sample is about a drop of liquid. In certain embodiments, the amount of sample is the amount collected from a pricked finger or fingerstick. In certain embodiments, the amount of sample is the amount collected from a microneedle, micropipette or a venous draw.

In certain embodiments, the sample holder is configured to hold a fluidic sample. In certain embodiments, the sample holder is configured to compress at least part of the fluidic sample into a thin layer. In certain embodiments, the sample holder comprises structures that are configured to heat and/or cool the sample. In certain embodiments, the heating source provides electromagnetic waves that can be absorbed by certain structures in the sample holder to change the temperature of the sample. In certain embodiments, the signal sensor is configured to detect and/or measure a signal from the sample. In certain embodiments, the signal sensor is configured to detect and/or measure an analyte in the sample. In certain embodiments, the heat sink is configured to absorb heat from the sample holder and/or the heating source. In certain embodiments, the heat sink comprises a chamber that at least partly enclose the sample holder.

10.6 Labels

The devices, systems, and methods herein disclosed can employ various types of labels that are used for analytes detection. The labels are herein disclosed, or listed, described, and summarized in PCT Application (designating U.S.) Nos. PCT/US2016/045437 and PCT/US0216/051775, which were respectively filed on Aug. 10, 2016 and Sep. 14, 2016, U.S. Provisional Application No. 62/456,065, which was filed on Feb. 7, 2017, U.S. Provisional Application No. 62/426,065, which was filed on Feb. 8, 2017, U.S. Provisional Application No. 62/456,504, which was filed on Feb. 8, 2017, all of which applications are incorporated herein in their entireties for all purposes.

In some embodiments, the label is optically detectable, such as but not limited to a fluorescence label. In some embodiments, the labels include, but are not limited to, IRDye300CW, Alexa 790, Dylight 800, fluorescein, fluorescein isothiocyanate, succinimidyl esters of carboxyfluorescein, succinimidyl esters of fluorescein, 5-isomer of fluorescein dichlorotriazine, caged carboxyfluorescein-alanine-carboxamide, Oregon Green 488, Oregon Green 514; Lucifer Yellow, acridine Orange, rhodamine, tetramethylrhodamine, Texas Red, propidium iodide, JC-1 (5,5,6,6'-tetrachloro-1,1,3,3-tetraethylbenzimidazoylcarbocyanine iodide), tetrabromorhodamine 123, rhodamine 6G, TMRM (tetramethylrhodamine methyl ester), TMRE (tetramethylrhodamine ethyl ester), tetramethylrosamine, rhodamine B and 4 dimethylaminotetramethylrosamine, green fluorescent protein, blue-shifted green fluorescent protein, cyan-shifted green fluorescent protein, red-shifted green fluorescent protein, yellow shifted green fluorescent protein, 4-acetamido-4-isothiocyanatostilbene-2,2'disulfonic acid; acridine and derivatives, such as acridine, acridine isothiocyanate, 5-(2-aminoethyl)aminonaphthalene-1-sulfonic acid (EDANS); 4-amino-N-[3-vinyl sulfonyl)phenyl)naphth-alimide-3,5 disulfonate, N-(4-anilino-1-naphthyl) maleimide, anthranilamide, 4,4-difluoro-5-(2-thienyl)-4-bora-3a,4a diaza-5-indacene-3-propioni-c acid BODIPY, cascade blue, Brilliant Yellow, Coumarin and derivatives: Coumarin, 7-amino-4-cyanine dyes; cyanosine, 4',6-diaminidino-2-phenylindole (DAP); 5',5"-dibromopyrogallol sulfonaphthalein (Bromopyrogallol Red); 7-diethylamino-3-(4'-isothiocyanatophenyl)-4-methylcoumarin; diethylenetriaamine pentaacetate; 4,4'-diisothiocyanatodihydro-stilbene-2-2'-disulfonic acid; 4,4'-disothiocyanatostilbene-2,2'-disulfonic acid; 5-(dimethylamino]naphthalene 1-sulfonyl chloride (DNS, dansylchloride), 4-dimethylaminophenylazophenyl-4-isothiocyanate (DABITC), edsin and derivatives: ecosin, eosin isothiocyanate, erythrosin and derivatives: erythrosin B, erythrosin, isothiocyanate, ethidium; fluorescein and derivatives: 5 carboxyfluorescein (FAM), 5-(4,6-dichlorotriazin-2-yl)amino-fluorescein (DTAF), 2',7'dimethoxy 45'-dichloro-6-carboxyfluorescein (JOE), fluorescein, fluorescein isothiocyanate, QFITC, (XRITC); fluorescamine; IR 144; IR 1446; Malachite Green isothiocyanate; 4-methylumbelli feroneortho cresolphthalein, nitrotyrosine, pararosaniline, Phenol Red, B-phycoerythrin, o phthaldialdehyde, pyrene and derivatives: pyrene, pyrene butyrate, Succinimidyl 1-pyrene, butyrate quantum dots, Reactive Red 4 (Cibacron™ Brilliant Red 3B-A) rhodamine and derivatives: 6-carboxy-X-rhodamine (ROX), 6-carboxyrhodamine (R6G), lissamine rhodamine B sulfonyl chloride rhodamine (Rhod), rhodamine B, rhodamine 123, rhodamine X isothiocyanate, sulforhodamine B, sulforhodamine 101, sulfonyl chloride derivative of sulforhodamine 101 (Texas Red); N,N,N',N'-tetramethyl-6-carboxyrhodamine (TAMRA); tetramethylrhodamine; tetramethyl hodamine isothiocyanate (TRTC); riboflavin; 5-(2-aminoethyl) aminonaphthalene-1-sulfonic acid (EDANS), 4-(4"-dimethylaminophenylazo) benzoic acid (DABCYL), rosolic acid; CAL Fluor Orange 560; terbium chelate derivatives; Cy 3; Cy 5; Cy 5.5; Cy 7; IIRD 700; ||RD 800; La Jolla Blue, phthalo cyanine, and naphthalo cyanine, coumarins and related dyes, xanthene dyes such as rhodols, resorufins, bimanes, acridines, isoindoles, dansyl dyes, aminophthalic hydrazides such as luminol, and isoluminol derivatives, aminophthalimides, aminonaphthalimides, aminobenzofurans, aminoquinolines, dicyanohydroquinones, fluorescent europium and terbium complexes, combinations thereof, and the like. Suitable fluorescent proteins and chromogenic proteins include, but are not limited to, a green fluorescent protein (GFP), including, but not limited to, a GFP derived from Aequoria victoria or a derivative thereof, e.g., a "humanized" derivative such as enhanced GFP, a GFP from another species such as *Renilla reniformis, Renilla mulleri*, or *Ptilosarcus guernyi*; "humanized" recombinant GFP (hrGFP), any of a variety of fluorescent and colored proteins from Anthozoan species, combinations thereof, and the like.

10.6 Analytes, Biomarkers, and Diseases

The devices, systems, and methods herein disclosed can be applied to manipulation and detection of various types of analytes (including biomarkers). The analytes and are herein disclosed, or listed, described, and summarized in PCT Application (designating U.S.) Nos. PCT/US2016/045437 and PCT/US0216/051775, which were respectively filed on Aug. 10, 2016 and Sep. 14, 2016, U.S. Provisional Application No. 62/456,065, which was filed on Feb. 7, 2017, U.S. Provisional Application No. 62/426,065, which was filed on Feb. 8, 2017, U.S. Provisional Application No. 62/456,504, which was filed on Feb. 8, 2017, all of which applications are incorporated herein in their entireties for all purposes.

Further, in some embodiments, the analytes are biomarkers that associated with various diseases. In some embodiments, the analytes and/or biomarkers are indicative of the presence, severity, and/or stage of the diseases. The analytes, biomarkers, and/or diseases that can be detected and/or measured with the devices, apparatus, systems, and/or method of the present invention include the analytes, biomarkers, and/or diseases listed, described and/or summarized in PCT Application (designating U.S.) Nos. PCT/US2016/045437 filed on Aug. 10, 2016 and PCT Application No. PCT/US2016/054025 filed on Sep. 27, 2016, and U.S. Provisional Application Nos. 62/234,538 filed on Sep. 29, 2015, 62/233,885 filed on Sep. 28, 2015, 62/293,188 filed on Feb. 9, 2016, and 62/305,123 filed on Mar. 8, 2016, which are all hereby incorporated by reference by their entireties. For example, the devices, apparatus, systems, and methods herein disclosed can be used in (a) the detection, purification and quantification of chemical compounds or biomolecules that correlates with the stage of certain diseases, e.g., infectious and parasitic disease, injuries, Cardiovascular disease, Cancer, mental disorders, neuropsychiatric disorders and organic diseases, e.g., pulmonary diseases, renal diseases, (b) the detection, purification and quantification of microorganism, e.g., virus, fungus and bacteria from environment, e.g., Water, Soil, or biological samples, e.g., tissues, bodily fluids, (c) the detection, quantification of chemical compounds or biological samples that pose hazard to food safety or national security, e.g. toxic waste, anthrax, (d) quantification of vital parameters in medical or physiological monitor, e.g., glucose, blood oxygen level, total blood Count, (e) the detection and quantification of specific DNA or RNA from biosamples, e.g., cells, viruses, bodily fluids, (f) the sequencing and comparing of genetic sequences in DNA in the chromosomes and mitochondria for genome analysis or (g) to detect reaction products, e.g., during synthesis or purification of pharmaceuticals.

In some embodiments, the analyte can be a biomarker, an environmental marker, or a foodstuff marker. The sample in some instances is a liquid sample, and can be a diagnostic sample (such as saliva, serum, blood, sputum, urine, sweat, lacrima, semen, or mucus), an environmental sample obtained from a river, ocean, lake, rain, snow, sewage, sewage processing runoff, agricultural runoff, industrial runoff, tap water or drinking water, or a foodstuff sample obtained from tap water, drinking water, prepared food, processed food or raw food.

In any embodiment, the sample can be a diagnostic sample obtained from a subject, the analyte can be a biomarker, and the measured amount of the analyte in the sample can be diagnostic of a disease or a condition.

In any embodiment, the devices, apparatus, systems, and methods in the present invention can further include diagnosing the subject based on information including the measured amount of the biomarker in the sample. In some cases, the diagnosing step includes sending data containing the measured amount of the biomarker to a remote location and receiving a diagnosis based on information including the measurement from the remote location. In any embodiment, the biomarker can be selected from Tables B1, 2, 3 or 7 as disclosed in U.S. Provisional Application Nos. 62/234,538, 62/293,188, and/or 62/305,123, and/or PCT Application No. PCT/US2016/054,025, which are all incorporated in their entireties for all purposes. In some instances, the biomarker is a protein selected from Tables B1, 2, or 3. In some instances, the biomarker is a nucleic acid selected from Tables B2, 3 or 7. In Some instances, the biomarker is an infectious agent-derived biomarker selected from Table B2. In some instances, the biomarker is a microRNA (miRNA) selected from Table B7.

In any embodiment, the applying step b) can include isolating miRNA from the sample to generate an isolated miRNA sample, and applying the isolated miRNA sample to the disk-coupled dots-on-pillar antenna (QMAX device) array.

In any embodiment, the QMAX device can contain a plurality of capture agents that each bind to a biomarker selected from Tables B1, B2, B3 and/or B7, wherein the reading step d) includes obtaining a measure of the amount of the plurality of biomarkers in the sample, and wherein the amount of the plurality of biomarkers in the sample is diagnostic of a disease or condition.

In any embodiment, the capture agent can be an antibody epitope and the biomarker can be an antibody that binds to the antibody epitope. In some embodiments, the antibody epitope includes a biomolecule, or a fragment thereof, selected from Tables B4, B5 or B6. In some embodiments, the antibody epitope includes an allergen, or a fragment thereof, selected from Table B5. In some embodiments, the antibody epitope includes an infectious agent-derived biomolecule, or a fragment thereof, selected from Table B6.

In any embodiment, the QMAX device can contain a plurality of antibody epitopes selected from Tables B4, B5 and/or B6, wherein the reading step d) includes obtaining a measure of the amount of a plurality of epitope-binding antibodies in the sample, and wherein the amount of the plurality of epitope-binding antibodies in the sample is diagnostic of a disease or condition.

In any embodiment, the sample can be an environmental sample, and wherein the analyte can be an environmental marker. In some embodiments, the environmental marker is selected from Table B8 in U.S. Provisional Application No. 62/234,538 and/or PCT Application No. PCT/US2016/054025.

In any embodiment, the method can include receiving or providing a report that indicates the safety or harmfulness for a subject to be exposed to the environment from which the sample was obtained.

In any embodiment, the method can include sending data containing the measured amount of the environmental marker to a remote location and receiving a report that indicates the safety or harmfulness for a subject to be exposed to the environment from which the sample was obtained.

In any embodiment, the QMAX device array can include a plurality of capture agents that each binds to an environmental marker selected from Table B8, and wherein the reading step d) can include obtaining a measure of the amount of the plurality of environmental markers in the sample.

In any embodiment, the sample can be a foodstuff sample, wherein the analyte can be a foodstuff marker, and wherein the amount of the foodstuff marker in the sample can correlate with safety of the foodstuff for consumption. In some embodiments, the foodstuff marker is selected from Table B9.

In any embodiment, the method can include receiving or providing a report that indicates the safety or harmfulness for a subject to consume the foodstuff from which the sample is obtained.

In any embodiment, the method can include sending data containing the measured amount of the foodstuff marker to a remote location and receiving a report that indicates the safety or harmfulness for a subject to consume the foodstuff from which the sample is obtained.

In any embodiment, the devices, apparatus, systems, and methods herein disclosed can include a plurality of capture agents that each binds to a foodstuff marker selected from Table B9 from in U.S. Provisional Application No. 62/234,538 and PCT Application No. PCT/US2016/054025, wherein the obtaining can include obtaining a measure of the amount of the plurality of foodstuff markers in the sample, and wherein the amount of the plurality of foodstuff marker in the sample can correlate with safety of the foodstuff for consumption.

Also provided herein are kits that find use in practicing the devices, systems and methods in the present invention.

The amount of sample can be about a drop of a sample. The amount of sample can be the amount collected from a pricked finger or fingerstick. The amount of sample can be the amount collected from a microneedle or a venous draw.

A sample can be used without further processing after obtaining it from the source, or can be processed, e.g., to enrich for an analyte of interest, remove large particulate matter, dissolve or resuspend a solid sample, etc. Any suitable method of applying a sample to the QMAX device can be employed. Suitable methods can include using a pipette, dropper, syringe, etc. In certain embodiments, when the QMAX device is located on a support in a dipstick format, as described below, the sample can be applied to the QMAX device by dipping a sample-receiving area of the dipstick into the sample.

A sample can be collected at one time, or at a plurality of times. Samples collected over time can be aggregated and/or processed (by applying to a QMAX device and obtaining a measurement of the amount of analyte in the sample, as described herein) individually. In some instances, measurements obtained over time can be aggregated and can be useful for longitudinal analysis over time to facilitate Screening, diagnosis, treatment, and/or disease prevention.

Washing the QMAX device to remove unbound sample components can be done in any convenient manner, as described above. In certain embodiments, the surface of the QMAX device is washed using binding buffer to remove unbound sample components.

Detectable labeling of the analyte can be done by any convenient method. The analyte can be labeled directly or indirectly. In direct labeling, the analyte in the sample is labeled before the sample is applied to the QMAX device. In indirect labeling, an unlabeled analyte in a sample is labeled after the sample is applied to the QMAX device to capture the unlabeled analyte, as described below.

10.7 Applications (Field and Samples)

The devices, systems, and methods herein disclosed can be used for various applications (fields and samples). The applications are herein disclosed, or listed, described, and summarized in PCT Application (designating U.S.) Nos. PCT/US2016/045437 and PCT/US0216/051775, which were respectively filed on Aug. 10, 2016 and Sep. 14, 2016, U.S. Provisional Application No. 62/456,065, which was filed on Feb. 7, 2017, U.S. Provisional Application No. 62/426,065, which was filed on Feb. 8, 2017, U.S. Provisional Application No. 62/456,504, which was filed on Feb. 8, 2017, all of which applications are incorporated herein in their entireties for all purposes.

In some embodiments, the devices, apparatus, systems, and methods herein disclosed are used in a variety of different application in various field, wherein determination of the presence or absence, quantification, and/or amplification of one or more analytes in a sample are desired.

For example, in certain embodiments the subject devices, apparatus, systems, and methods are used in the detection of proteins, peptides, nucleic acids, synthetic compounds, inorganic compounds, organic compounds, bacteria, virus, cells, tissues, nanoparticles, and other molecules, compounds, mixtures and substances thereof. The various fields in which the subject devices, apparatus, systems, and methods can be used include, but are not limited to: diagnostics, management, and/or prevention of human diseases and conditions, diagnostics, management, and/or prevention of veterinary diseases and conditions, diagnostics, management, and/or prevention of plant diseases and conditions, agricultural uses, veterinary uses, food testing, environments testing and decontamination, drug testing and prevention, and others. purification, quantification, and/or amplification of chemical compounds or biomolecules that correlates with certain diseases, or certain stages of the diseases, e.g., infectious and parasitic disease, injuries, cardiovascular disease, cancer, mental disorders, neuropsychiatric disorders and organic diseases, e.g., pulmonary diseases, renal diseases, (b) the detection, purification, quantification, and/or amplification of cells and/or microorganism, e.g., virus, fungus and bacteria from the environment, e.g., water, soil, or biological samples, e.g., tissues, bodily fluids, (c) the detection, quantification of chemical compounds or biological samples that pose hazard to food safety, human health, or national security, e.g. toxic waste, anthrax, (d) the detection and quantification of vital parameters in medical or physiological monitor, e.g., glucose, blood oxygen level, total blood count, (e) the detection and quantification of specific DNA or RNA from biological samples, e.g., cells, viruses, bodily fluids, (f) the sequencing and comparing of genetic sequences in DNA in the chromosomes and mitochondria for genome analysis or (g) the detection and quantification of reaction products, e.g., during synthesis or purification of pharmaceuticals.

In some embodiments, the subject devices, apparatus, systems, and methods are used in the detection of nucleic acids, proteins, or other molecules or compounds in a sample. In certain embodiments, the devices, apparatus, systems, and methods are used in the rapid, clinical detection and/or quantification of one or more, two or more, or three or more disease biomarkers in a biological sample, e.g., as being employed in the diagnosis, prevention, and/or management of a disease condition in a subject. In certain embodiments, the devices, apparatus, systems, and methods are used in the detection and/or quantification of one or more, two or more, or three or more environmental markers in an environmental sample, e.g., sample obtained from a river, ocean, lake, rain, snow, sewage, sewage processing runoff, agricultural runoff, industrial runoff, tap water or drinking water. In certain embodiments, the devices, apparatus, systems, and methods are used in the detection and/or quantification of one or more, two or more, or three or more foodstuff marks from a food sample obtained from tap water, drinking water, prepared food, processed food or raw food.

In some embodiments, the subject device is part of a microfluidic device. In some embodiments, the Subject devices, apparatus, Systems, and methods are used to detect a fluorescence or luminescence signal. In some embodiments, the subject devices, apparatus, systems, and methods include, or are used together with, a communication device, such as but not limited to mobile phones, tablet computers and laptop computers. In some embodiments, the subject devices, apparatus, systems, and methods include, or are used together with, an identifier, such as but not limited to an optical barcode, a radio frequency ID tag, or combinations thereof.

In some embodiments, the sample is a diagnostic sample obtained from a subject, the analyte is a biomarker, and the measured amount of the analyte in the sample is diagnostic of a disease or a condition. In some embodiments, the subject devices, systems and methods further include receiving or providing to the subject a report that indicates the measured amount of the biomarker and a range of measured values for the biomarker in an individual free of or at low risk of having the disease or condition, wherein the measured amount of the biomarker relative to the range of measured values is diagnostic of a disease or condition.

In some embodiments, the sample is an environmental sample, and wherein the analyte is an environmental marker. In some embodiments, the subject devices, systems and methods include receiving or providing a report that indicates the safety or harmfulness for a subject to be exposed to the environment from which the sample was obtained. In some embodiments, the subject devices, systems and methods include sending data containing the measured amount of the environmental marker to a remote location and receiving a report that indicates the safety or harmfulness for a subject to be exposed to the environment from which the sample was obtained. marker, and wherein the amount of the foodstuff marker in the sample correlate with safety of the foodstuff for consumption.

In some embodiments, the subject devices, systems and methods include receiving or providing a report that indicates the safety or harmfulness for a subject to consume the foodstuff from which the sample is obtained. In some embodiments, the subject devices, systems and methods include sending data containing the measured amount of the foodstuff marker to a remote location and receiving a report that indicates the safety or harmfulness for a subject to consume the foodstuff from which the sample is obtained.

Spacer Filling Factor.

The term "spacer filling factor" or "filling factor" refers to the ratio of the spacer contact area to the total plate area", wherein the spacer contact area refers, at a closed configuration, the contact area that the spacer's top surface contacts to the inner surface of a plate, and the total plate area refers the total area of the inner surface of the plate that the flat top of the spacers contact. Since there are two plates and each spacer has two contact surfaces each contacting one plate, the filling fact is the filling factor of the smallest.

For example, if the spacers are pillars with a flat top of a square shape (10 um×10 um), a nearly uniform cross-section and 2 um tall, and the spacers are periodic with a period of 100 um, then the filing factor of the spacer is 1%. If in the above example, the foot of the pillar spacer is a square shape of 15 um×15 um, then the filling factor is still 1% by the definition.

The method or device of any prior embodiment, wherein the spacers have pillar shape and nearly uniform cross-section.

The method or device of any prior embodiment, wherein the inter spacer distance (SD) is equal or less than about 120 um (micrometer).

The method or device of any prior embodiment, wherein the inter spacer distance (SD) is equal or less than about 100 um (micrometer).

The method or device of any prior embodiment, wherein the fourth power of the inter-spacer-distance (ISD) divided by the thickness (h) and the Young's modulus (E) of the flexible plate ($ISD^4/(hE)$) is $5\times10^6$ $um^3/GPa$ or less.

The method or device of any prior embodiment, wherein the fourth power of the inter-spacer-distance (ISD) divided by the thickness (h) and the Young's modulus (E) of the flexible plate ($ISD^4/(hE)$) is $5\times10^5$ $um^3/GPa$ or less.

The method or device of any prior embodiment, wherein the spacers have pillar shape, a substantially flat top surface, a predetermined substantially uniform height, and a predetermined constant inter-spacer distance that is at least about 2 times larger than the size of the analyte, wherein the Young's modulus of the spacers times the filling factor of the spacers is equal or larger than 2 MPa, wherein the filling factor is the ratio of the spacer contact area to the total plate area, and wherein, for each spacer, the ratio of the lateral dimension of the spacer to its height is at least 1 (one).

The method or device of any prior embodiment, wherein the spacers have pillar shape, a substantially flat top surface, a predetermined substantially uniform height, and a predetermined constant inter-spacer distance that is at least about 2 times larger than the size of the analyte, wherein the Young's modulus of the spacers times the filling factor of the spacers is equal or larger than 2 MPa, wherein the filling factor is the ratio of the spacer contact area to the total plate area, and wherein, for each spacer, the ratio of the lateral dimension of the spacer to its height is at least 1 (one), wherein the fourth power of the inter-spacer-distance (ISD) divided by the thickness (h) and the Young's modulus (E) of the flexible plate ($ISD^4/(hE)$) is $5\times10^6$ $um^3/GPa$ or less.

The device of any prior device embodiment, wherein the ratio of the inter-spacing distance of the spacers to the average width of the spacer is 2 or larger, and the filling factor of the spacers multiplied by the Young's modulus of the spacers is 2 MPa or larger.

The method or device of any prior embodiment, wherein the analytes is proteins, peptides, nucleic acids, synthetic compounds, or inorganic compounds.

The method or device of any prior embodiment, wherein the sample is a biological sample selected from amniotic fluid, aqueous humour, vitreous humour, blood (e.g., whole blood, fractionated blood, plasma or serum), breast milk, cerebrospinal fluid (CSF), cerumen (earwax), chyle, chime, endolymph, perilymph, feces, breath, gastric acid, gastric juice, lymph, mucus (including nasal drainage and phlegm), pericardial fluid, peritoneal fluid, pleural fluid, pus, rheum, saliva, exhaled breath condensates, sebum, semen, sputum, sweat, synovial fluid, tears, vomit, and urine.

The method or device of any prior embodiment, wherein the spacers have a shape of pillars and a ratio of the width to the height of the pillar is equal or larger than one.

The method of any prior embodiment, wherein the sample that is deposited on one or both of the plates has an unknown volume.

The method or device of any prior embodiment, wherein the spacers have a shape of pillar, and the pillar has substantially uniform cross-section.

The method or device of any prior embodiment, wherein the samples is for the detection, purification and quantification of chemical compounds or biomolecules that correlates with the stage of certain diseases.

The method or device of any prior embodiment, wherein the samples is related to infectious and parasitic disease, injuries, cardiovascular disease, cancer, mental disorders, neuropsychiatric disorders, pulmonary diseases, renal diseases, and other and organic diseases.

The method or device of any prior embodiment, wherein the samples is related to the detection, purification and quantification of microorganism.

The method or device of any prior embodiment, wherein the samples is related to virus, fungus and bacteria from environment, e.g., water, soil, or biological samples.

The method or device of any prior embodiment, wherein the samples is related to the detection, quantification of chemical compounds or biological samples that pose hazard to food safety or national security, e.g. toxic waste, anthrax.

The method or device of any prior embodiment, wherein the samples is related to quantification of vital parameters in medical or physiological monitor.

The method or device of any prior embodiment, wherein the samples is related to glucose, blood, oxygen level, total blood count.

The method or device of any prior embodiment, wherein the samples is related to the detection and quantification of specific DNA or RNA from biosamples.

The method or device of any prior embodiment, wherein the samples is related to the sequencing and comparing of genetic sequences in DNA in the chromosomes and mitochondria for genome analysis.

The method or device of any prior embodiment, wherein the samples is related to detect reaction products, e.g., during synthesis or purification of pharmaceuticals.

The method or device of any prior embodiment, wherein the samples is cells, tissues, bodily fluids, and stool.

The method or device of any prior embodiment, wherein the sample is the sample in the fields of human, veterinary, agriculture, foods, environments, and drug testing.

The method or device of any prior embodiment, wherein the sample is a biological sample is selected from hair, finger nail, ear wax, breath, connective tissue, muscle tissue, nervous tissue, epithelial tissue, cartilage, cancerous sample, or bone.

The devices or methods of any prior embodiment, wherein the inter-spacer distance is in the range of 5 □m to 120 □m.

The devices or methods of any prior embodiment, wherein the inter-spacer distance is in the range of 120 □m to 200 □m.

The device of any prior device embodiment, wherein the flexible plates have a thickness in the range of 20 um to 250 um and Young's modulus in the range 0.1 to 5 GPa.

The device of any prior device embodiment, wherein for a flexible plate, the thickness of the flexible plate times the Young's modulus of the flexible plate is in the range 60 to 750 GPa-um.

The device of any prior device embodiment, wherein the layer of uniform thickness sample is uniform over a lateral area that is at least 1 mm$^2$.

The device of any prior device embodiment, wherein the layer of uniform thickness sample is uniform over a lateral area that is at least 3 mm$^2$.

The device of any prior device embodiment, wherein the layer of uniform thickness sample is uniform over a lateral area that is at least 5 mm$^2$.

The device of any prior device embodiment, wherein the layer of uniform thickness sample is uniform over a lateral area that is at least 10 mm$^2$.

The device of any prior device embodiment, wherein the layer of uniform thickness sample is uniform over a lateral area that is at least 20 mm$^2$.

The device of any prior device embodiment, wherein the layer of uniform thickness sample is uniform over a lateral area that is in a range of 20 mm$^2$ to 100 mm$^2$.

The device of any prior device embodiment, wherein the layer of uniform thickness sample has a thickness uniformity of up to +/−5% or better.

The device of any prior device embodiment, wherein the layer of uniform thickness sample has a thickness uniformity of up to +/−10% or better.

The device of any prior device embodiment, wherein the layer of uniform thickness sample has a thickness uniformity of up to +/−20% or better.

The device of any prior device embodiment, wherein the layer of uniform thickness sample has a thickness uniformity of up to +/−30% or better.

The present invention find use in a variety of different applications in various fields, where determination of the presence or absence, and/or quantification of one or more analytes in a sample are desired. For example, the present inventions finds use in the detection of atoms, molecules, proteins, peptides, nucleic acids, synthetic compounds, inorganic compounds, organic compounds, bacteria, virus, cells, tissues, nanoparticles, and the like. The sample can be a sample in various fields, that include, but not limited to, human, veterinary, agriculture, foods, environments, health, wellness, beauty, and others.

(1) Dimensions

The devices, apparatus, systems, and methods herein disclosed can include or use a QMAX device, which can comprise plates and spacers. In some embodiments, the dimension of the individual components of the QMAX device and its adaptor are listed, described and/or summarized in PCT Application (designating U.S.) No. PCT/US2016/045437 filed on Aug. 10, 2016, and U.S. Provisional Application Nos. 62/431,639 filed on Dec. 9, 2016 and 62/456,287 filed on Feb. 8, 2017, which are all hereby incorporated by reference by their entireties.

In some embodiments, the dimensions are listed in the Tables below:

Plates:

| Parameters | Embodiments | Preferred Embodiments |
| --- | --- | --- |
| Shape | round, ellipse, rectangle, triangle, polygonal, ring-shaped, or any superposition of these shapes; the two (or more) plates of the QMAX card can have the same size and/or shape, or different size and/or shape; | at least one of the two (or more) plates of the QMAX card has round corners for user safety concerns, wherein the round corners have a diameter of 100 um or less, 200 um or less, 500 um or less, 1 mm or less, 2 mm or less, 5mm or less, 10 mm or less, 50 mm or less, or in a range between any two of the values. |
| Thickness | the average thickness for at least one of the plates is 2 nm or less, 10 nm or less, 100 nm or less, 200 nm or less, 500 nm or less, 1000 nm or less, 2 μm (micron) or less, 5 μm or less, 10 μm or less, 20 μm or less, 50 μm or less, 100 μm or less, 150 μm or less, 200 μm or less, 300 μm or less, 500 μm or less, 800 μm or less, 1 mm (millimeter) or less, 2 mm or less, 3 mm or less, 5 mm or less, 10 mm or less, 20 mm or less, 50 mm or less, 100 mm or less, 500 mm or less, or in a range between any two of these values | For at least one of the plates is in the range of 0.5 to 1.5 mm; around 1 mm; in the range of 0.15 to 0.2 mm; or around 0.175 mm |
| Lateral Area | For at least one of the plate is 1 mm2 (square millimeter) or less, 10 mm2 or less, 25 mm2 or less, 50 mm2 or less, 75 mm2 or less, 1 cm2 (square centimeter) or less, 2 cm2 or less, 3 cm2 or less, 4 cm2 or less, 5 cm2 or less, 10 cm2 or less, 100 cm2 or less, 500 cm2 or less, 1000 cm2 or less, 5000 cm2 or less, 10,000 cm2 or less, 10,000 cm2 or less, or in a range between any two of these values | For at least one plate of the QMAX card is in the range of 500 to 1000 mm$^2$; or around 750 mm$^2$. |
| Lateral Linear Dimension (width, length, or diameter, etc.) | For at least one of the plates of the QMAX card is 1 mm or less, 5 mm or less, 10 mm or less, 15 mm or less, 20 mm or less, 25 mm or less, 30 mm or less, 35 mm or less, 40 mm or less, 45 mm or less, 50 mm or less, 100 mm or less, 200 mm or less, 500 mm or less, 1000 mm or less, 5000 mm or less, or in a range between any two of these values | For at least one plate of the QMAX card is in the range of 20 to 30 mm; or around 24 mm |
| Recess width | 1 um or less, 10 um or less, 20 um or less, 30 um or less, 40 um or less, 50 um or less, 100 um or less, 200 um or less, 300 um or less, 400 um or less, 500 um or less, 7500 um or less, 1 mm or less, 5 mm or less, 10 mm or less, 100 mm or less, or 1000 mm or less, or in a range between any two of these values. | In the range of 1 mm to 10 mm; Or About 5 mm |

| Parameters | Embodiments | Preferred Embodiments |
|---|---|---|
| Number | 1, 2, 3, 4, 5, or more | 1 or 2 |
| Length of Hinge Joint | 1 mm or less, 2 mm or less, 3 mm or less, 4 mm or less, 5 mm or less, 10 mm or less, 15 mm or less, 20 mm or less, 25 mm or less, 30 mm or less, 40 mm or less, 50 mm or less, 100 mm or less, 200 mm or less, or 500 mm or less, or in a range between any two of these values | In the range of 5 mm to 30 mm. |
| Ratio (hinge joint length vs. aligning plate edge length) | 1.5 or less, 1 or less, 0.9 or less, 0.8 or less, 0.7 or less, 0.6 or less, 0.5 or less, 0.4 or less, 0.3 or less, 0.2 or less, 0.1 or less, 0.05 or less or in a range between any two of these values. | In the range of 0.2 to 1; or about 1 |
| Area | 1 $mm^2$ or less, 5 $mm^2$ or less, 10 $mm^2$ or less, 20 $mm^2$ or less, 30 $mm^2$ or less, 40 $mm^2$ or less, 50 $mm^2$ or less, 100 $mm^2$ or less, 200 $mm^2$ or less, 500 $mm^2$ or less, or in a range between any of the two values | In the range of 20 to 200 $mm^2$; or about 120 $mm^2$ |
| Ratio (hinge area vs. plate area) | 1 or less, 0.9 or less, 0.8 or less, 0.7 or less, 0.6 or less, 0.5 or less, 0.4 or less, 0.3 or less, 0.2 or less, 0.1 or less, 0.05 or less, 0.01 or less or in a range between any two of these values | In the range of 0.05 to 0.2, around 0.15 |
| Max. Open Degree | 15 or less, 30 or less, 45 or less, 60 or less, 75 or less, 90 or less, 105 or less, 120 or less, 135 or less, 150 or less, 165 or less, 180 or less, 195 or less, 210 or less, 225 or less, 240 or less, 255 or less, 270 or less, 285 or less, 300 or less, 315 or less, 330 or less, 345 or less or 360 or less degrees, or in a range between any two of these values | In the range of 90 to 180 degrees |
| No. of Layers | 1, 2, 3, 4, 5, or more | 1 or 2 |
| Layer thickness | 0.1 um or less, 1 um or less, 2 um or less, 3 um or less, 5 um or less, 10 um or less, 20 um or less, 30 um or less, 50 um or less, 100 um or less, 200 um or less, 300 um or less, 500 um or less, 1 mm or less, 2 mm or less, and a range between any two of these values | In the range of 20 um to 1 mm; or Around 50 um |
| Angle-maintaining | Limiting the angle adjustment with no more than ±90, ±45, ±30, ±25, ±20, ±15, ±10, ±8, ±6, ±5, ±4, ±3, ±2, or ±1, or in a range between any two of these values | No more than ±2 |

| Parameters | Embodiments | Preferred Embodiments |
|---|---|---|
| Number | 1, 2, 3, 4, 5, or more | 1 or 2 |
| Shape | round, ellipse, rectangle, triangle, polygon, ring-shaped, or any superposition or portion of these shapes. | Part of a circle |
| Positioning | Any location along any edge except the hinge edge, or any corner joint by non-hinge edges | |
| Lateral Linear Dimension | 1 mm or less, 2.5 mm or less, 5 mm or less, 10 mm or less, 15 mm or less, 20 mm or less, 25 mm or less, | In the range of 5 mm to 15 mm; or about |
| (Length along the edge, radius, etc.) | 30 mm or less, 40 mm or less, 50 mm or less, or in a range between any two of these values | 10 mm |
| Area | 1 $mm^2$ (square millimeter) or less, 10 $mm^2$ or less, 25 $mm^2$ or less, 50 $mm^2$ or less, 75 $mm^2$ or less or in a range between any two of these values. | In the range of 10 to 150 $mm^2$; or about 50 $mm^2$ |

| Parameters | Embodiments | Preferred Embodiments |
|---|---|---|
| Number | 1, 2, 3, 4, 5, or more | 1 or 2 |
| Shape | Closed (round, ellipse, rectangle, triangle, polygon, ring-shaped, or any superposition or portion of these shapes) or open-ended (straight line, curved line, arc, branched tree, or any other shape with open endings); | |
| Length | 0.001 mm or less, 0.005 mm or less, 0.01 mm or less, 0.05 mm or less, 0.1 mm or less, 0.5 mm or less, 1 mm or less, 2 mm or less, 5 mm or less, 10 mm or less, 20 mm or less, 50 mm or less, 100 mm or less, or in a range between any two of these values | |
| Cross-sectional Area | 0.001 $mm^2$ or less, 0.005 $mm^2$ or less, 0.01 $mm^2$ or less, 0.05 $mm^2$ or less, 0.1 $mm^2$ or less, 0.5 $mm^2$ or less, 1 $mm^2$ or less, 2 $mm^2$ or less, 5 $mm^2$ or less, 10 $mm^2$ or less, 20 $mm^2$ or less, or in a range between any two of these values. | |
| Volume | 0.1 uL or more, 0.5 uL or more, 1 uL or more, 2 uL or more, 5 uL or more, 10 uL or more, 30 uL or more, 50 uL or more, 100 uL or more, 500 uL or more, 1 mL or more, or in a range between any two of these values | In the range of 1 uL to 20 uL; or About 5 uL |

| Parameters | Embodiments | Preferred Embodiments |
|---|---|---|
| Shape of receiving area | round, ellipse, rectangle, triangle, polygon, ring-shaped, or any superposition of these shapes; | |
| Difference between sliding track gap size and card thickness | 100 nm, 500 nm, 1 um, 2 um, 5 um, 10 um, 50 um, 100 um, 300 um, 500 um, 1 mm, 2 mm, 5 mm, 1 cm, or in a range between any two of the values. | In the range of 50 to 300 um; or about 75 um |

(2) Applications

The devices/apparatus, systems, and methods herein disclosed can be used for various applications (fields and samples). The applications are herein disclosed, listed, described, and/or summarized in PCT Application (designating U.S.) Nos. PCT/US2016/045437 and PCT/US0216/051775, which were respectively filed on Aug. 10, 2016 and Sep. 14, 2016, U.S. Provisional Application No. 62/456,065, which was filed on Feb. 7, 2017, U.S. Provisional Application No. 62/456,287, which was filed on Feb. 8, 2017, and U.S. Provisional Application No. 62/456,504, which was filed on Feb. 8, 2017, all of which applications are incorporated herein in their entireties for all purposes.

In some embodiments, the devices, apparatus, systems, and methods herein disclosed are used in a variety of different application in various field, wherein determination of the presence or absence, quantification, and/or amplification of one or more analytes in a sample are desired. For example, in certain embodiments the subject devices, apparatus, systems, and methods are used in the detection of proteins, peptides, nucleic acids, synthetic compounds, inorganic compounds, organic compounds, bacteria, virus, cells, tissues, nanoparticles, and other molecules, compounds, mixtures and substances thereof. The various fields in which the subject devices, apparatus, systems, and methods can be used include, but are not limited to: diagnostics, management, and/or prevention of human diseases and conditions, diagnostics, management, and/or prevention of veterinary diseases and conditions, diagnostics, management, and/or prevention of plant diseases and conditions, agricultural uses, veterinary uses, food testing, environments testing and decontamination, drug testing and prevention, and others.

The applications of the present invention include, but are not limited to: (a) the detection, purification, quantification, and/or amplification of chemical compounds or biomolecules that correlates with certain diseases, or certain stages of the diseases, e.g., infectious and parasitic disease, injuries, cardiovascular disease, cancer, mental disorders, neuropsychiatric disorders and organic diseases, e.g., pulmonary diseases, renal diseases, (b) the detection, purification, quantification, and/or amplification of cells and/or microorganism, e.g., virus, fungus and bacteria from the environment, e.g., water, soil, or biological samples, e.g., tissues, bodily fluids, (c) the detection, quantification of chemical compounds or biological samples that pose hazard to food safety, human health, or national security, e.g. toxic waste, anthrax, (d) the detection and quantification of vital parameters in medical or physiological monitor, e.g., glucose, blood oxygen level, total blood count, (e) the detection and quantification of specific DNA or RNA from biological samples, e.g., cells, viruses, bodily fluids, (f) the sequencing and comparing of genetic sequences in DNA in the chromosomes and mitochondria for genome analysis or (g) the detection and quantification of reaction products, e.g., during synthesis or purification of pharmaceuticals.

In some embodiments, the subject devices, apparatus, systems, and methods are used in the detection of nucleic acids, proteins, or other molecules or compounds in a sample. In certain embodiments, the devices, apparatus, systems, and methods are used in the rapid, clinical detection and/or quantification of one or more, two or more, or three or more disease biomarkers in a biological sample, e.g., as being employed in the diagnosis, prevention, and/or management of a disease condition in a subject. In certain embodiments, the devices, apparatus, systems, and methods are used in the detection and/or quantification of one or more, two or more, or three or more environmental markers in an environmental sample, e.g., sample obtained from a river, ocean, lake, rain, snow, sewage, sewage processing runoff, agricultural runoff, industrial runoff, tap water or drinking water. In certain embodiments, the devices, apparatus, systems, and methods are used in the detection and/or quantification of one or more, two or more, or three or more foodstuff marks from a food sample obtained from tap water, drinking water, prepared food, processed food or raw food.

In some embodiments, the subject device is part of a microfluidic device. In some embodiments, the subject devices, apparatus, systems, and methods are used to detect a fluorescence or luminescence signal. In some embodiments, the subject devices, apparatus, systems, and methods include, or are used together with, a communication device, such as but not limited to: mobile phones, tablet computers and laptop computers. In some embodiments, the subject devices, apparatus, systems, and methods include, or are used together with, an identifier, such as but not limited to an optical barcode, a radio frequency ID tag, or combinations thereof.

In some embodiments, the sample is a diagnostic sample obtained from a subject, the analyte is a biomarker, and the measured amount of the analyte in the sample is diagnostic of a disease or a condition. In some embodiments, the subject devices, systems and methods further include receiving or providing to the subject a report that indicates the measured amount of the biomarker and a range of measured values for the biomarker in an individual free of or at low risk of having the disease or condition, wherein the measured amount of the biomarker relative to the range of measured values is diagnostic of a disease or condition.

In some embodiments, the sample is an environmental sample, and wherein the analyte is an environmental marker. In some embodiments, the subject devices, systems and methods include receiving or providing a report that indicates the safety or harmfulness for a subject to be exposed to the environment from which the sample was obtained. In some embodiments, the subject devices, systems and methods include sending data containing the measured amount of the environmental marker to a remote location and receiving a report that indicates the safety or harmfulness for a subject to be exposed to the environment from which the sample was obtained.

In some embodiments, the sample is a foodstuff sample, wherein the analyte is a foodstuff marker, and wherein the amount of the foodstuff marker in the sample correlates with safety of the foodstuff for consumption. In some embodiments, the subject devices, systems and methods include receiving or providing a report that indicates the safety or harmfulness for a subject to consume the foodstuff from which the sample is obtained. In some embodiments, the subject devices, systems and methods include sending data containing the measured amount of the foodstuff marker to a remote location and receiving a report that indicates the safety or harmfulness for a subject to consume the foodstuff from which the sample is obtained.

10.8 Cloud

The devices, systems, and methods herein disclosed can employ cloud technology for data transfer, storage, and/or analysis. The related cloud technologies are herein disclosed, or listed, described, and summarized in PCT Application (designating U.S.) Nos. PCT/US2016/045437 and PCT/US0216/051775, which were respectively filed on Aug. 10, 2016 and Sep. 14, 2016, U.S. Provisional Application No. 62/456,065, which was filed on Feb. 7, 2017, U.S. Provisional Application No. 62/426,065, which was filed on Feb. 8, 2017, U.S. Provisional Application No. 62/456,504, which was filed on Feb. 8, 2017, all of which applications are incorporated herein in their entireties for all purposes.

In some embodiments, the cloud storage and computing technologies can involve a cloud database. Merely by Way of example, the cloud platform can include a private cloud, a public cloud, a hybrid cloud, a community cloud, a distributed cloud, an inter-cloud, a multi-cloud, or the like, or any combination thereof. In some embodiments, the mobile device (e.g., smartphone) can be connected to the cloud through any type of network, including a local area network (LAN) or a wide area network (WAN).

In some embodiments, the data (e.g., images of the sample) related to the sample is sent to the cloud without processing by the mobile device and further analysis can be conducted remotely. In some embodiments, the data related to the sample is processed by the mobile device and the results are sent to the cloud. In some embodiments, both the raw data and the results are transmitted to the cloud.

It must be noted that as used herein and in the appended claims, the singular forms "a", "an", and "the" include plural referents unless the context clearly dictates otherwise, e.g., when the word "single" is used. For example, reference to "an analyte" includes a single analyte and multiple analytes, reference to "a capture agent" includes a single capture agent and multiple capture agents, reference to "a detection agent" includes a single detection agent and multiple detection agents, and reference to "an agent" includes a single agent and multiple agents.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function. Similarly, subject matter that is recited as being configured to perform a particular function may additionally or alternatively be described as being operative to perform that function.

As used herein, the phrase, "for example," the phrase, "as an example," and/or simply the terms "example" and "exemplary" when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, the phrases "at least one of" and "one or more of," in reference to a list of more than one entity, means any one or more of the entities in the list of entity, and is not limited to at least one of each and every entity specifically listed within the list of entity. For example, "at least one of A and B" (or, equivalently, "at least one of A or B," or, equivalently, "at least one of A and/or B") may refer to A alone, B alone, or the combination of A and B.

As used herein, the term "and/or" placed between a first entity and a second entity means one of (1) the first entity, (2) the second entity, and (3) the first entity and the second entity.

Multiple entity listed with "and/or" should be construed in the same manner, i.e., "one or more" of the entities so conjoined. Other entity may optionally be present other than the entity specifically identified by the "and/or" clause, whether related or unrelated to those entities specifically identified.

Where numerical ranges are mentioned herein, the invention includes embodiments in which the endpoints are included, embodiments in which both endpoints are excluded, and embodiments in which one endpoint is included and the other is excluded. It should be assumed that both endpoints are included unless indicated otherwise. Furthermore, unless otherwise indicated or otherwise evident from the context and understanding of one of ordinary skill in the art.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

It is believed that the following claims particularly point out certain combinations and sub combinations that are directed to one of the disclosed inventions and are novel and nonobvious. Inventions embodied in other combinations and sub combinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A method for sample collection and remote analysis, comprising:
   (a) providing a sample holder comprising a first plate, a second plate, and spacers, wherein:
      (i) the first and second plates are movable relative to each other into different configurations, including an open configuration and a closed configuration;
      (ii) each of the plates comprises a surface that includes a sample contact area for contacting a sample that contains or is suspected of containing an analyte;
      (iii) the spacers are fixed to one of the sample contact areas, wherein the spacers have a predetermined inter-spacer distance and a predetermined height, wherein at least one of the spacers are inside the sample contact area;
      (iv) at least one of the two plates is transparent; and
      (v) one or both of the two plates comprise a reagent on a surface thereof,
   (b) collecting the sample to the sample contact area of one or both of the two plates at the open configuration;
   (c) compressing the two plates into the closed configuration;
   (d) imaging, after step (c), at least one image of the sample in the sample holder, wherein the imaging is through the transparent plate;
   (e) sending the sample holder and the at least one image to a remote location; and
   (f) analyzing, at the remote location, the sample and the at least one image to measure the analyte, wherein the analyzing uses the predetermined inter-spacer distance and the predetermined height to quantify the volume of the sample at the closed configuration, and uses the at least one image;
   wherein the open configuration is a configuration in which the two plates are partially or entirely separated apart and a spacing between the two plates is not regulated by the spacers,
   wherein in the closed configuration, which is formed after the sample is deposited when the two plates are in the open configuration, at least part of the sample is compressed by the two plates into a layer of highly uniform thickness of 200 μm or less, the layer is confined by the plates, and the thickness of the layer is regulated by the plates and the spacers.

2. The method of claim 1, wherein one or both of the two plates comprise a visual mark for cutting the sample.

3. The method of claim 1, wherein the imaging is performed with a camera on a smartphone with or without using an adaptor, wherein the adaptor comprises optical elements and/or lighting to facilitate the imaging, and the optical element comprises a lens or filter.

4. The method of claim 1 further comprising a step of cutting out a part of the sample holder, wherein the cut-out part of the sample is analyzed.

5. The method of claim 1 further comprising a step of measuring a lateral area of the sample holder and cutting out the lateral area from the sample holder, wherein the cut-out part of the sample is analyzed.

6. The method of claim 1, wherein one or both of the plates further comprise a binding site, or a storage site, or both.

7. The method of claim 1, further comprising a step of calculating a volume of a portion of the sample from a thickness of the portion of the sample regulated by the spacers and a lateral area of the portion of the sample.

8. The method of claim 1, further comprising:
calculating the volume of a portion of the sample from a thickness of the portion of the sample regulated by the spacers and a lateral area of the portion of the sample, and
correcting an effect of a non-sample material, wherein the non-sample material is a material that is inside the sample but not from the sample.

9. The method of claim 1, wherein the reagent comprises a preservative that preserves the sample on the sample holder.

10. The method of claim 1, wherein the sample is preserved by one or more preservatives.

11. The method of claim 1, wherein the spacers have different pre-determined heights.

12. The method of claim 1, wherein the one or both of the plates comprise one or more vent holes that connect the inner surface to the outer surface of the respective plate, and the one or more vents are configured to facilitate the vaporization of the vaporizable components in the layer of the sample.

13. The method of claim 1, wherein the one or both of the plates further comprises one or more structural features comprising micro- or nanostructures, or elements, wherein the one or more structural features are configured for lysing, temperature manipulation, biomaterial extraction, component separation, or a combination thereof.

14. The method of claim 1, wherein the one or both of the plates further comprise one or more processing reagents at an inner surface thereof;
wherein the one or more processing reagents are configured for a sample treatment; and
wherein the sample treatment comprises cell lysis, staining, dehydration, phosphatase inhibition, or a combination thereof.

15. The method of claim 14, wherein the one or both of the plates further comprise one or more trenches inside the sample contact area; and the one or more processing reagents are contained in the one or more trenches.

16. The method of claim 1, wherein the one or both of the two plates further comprise one or more testing reagents at an inner surface thereof, and wherein the one or more testing reagents are configured for performing an assay on the sample.

17. The method of claim 16, wherein the assay comprises an immunoassay or an enzyme activity assay.

18. The method of claim 1, wherein the sample contains an analyte and the analyte is a nucleic acid.

19. The method of claim 1, further comprising measuring an area or volume comprising a portion of the sample,
wherein the measuring comprises:
(i) having visual markers on the first plate, the second plate, between them, or any combination of thereof, wherein the visual marks aids the volume quantification of the sample collected in the device,
(ii) taking a 2D (two-dimensional)/3D (three-dimensional) image of the sample, wherein the image is taken multiple times at different viewing angles, different wavelengths, different phases, and/or different polarization; and
(iii) image processing based on the visual maker and the image.

20. The method of claim 1, wherein the imaging comprises light interference, or optical imaging a 2D (two-dimensional) or 3D (three-dimensional) imaging, optical imaging of multiple times, image processing, or any combination of thereof; wherein the optical imaging of multiple times uses different viewing angles, different wavelength, different phase, and/or different polarization.

21. The method of claim 1, wherein the sample comprises blood, saliva, exhaled breath condensate, or urine.

22. The method of claim 1, wherein the one or more processing reagents are configured for sample treatment, and the sample treatment comprises cell lysis, staining, dehydration, phosphatase inhibition, or a combination thereof.

23. The method of claim 1, further comprising:
(1) cutting out a part of the layer, wherein the layer has a predetermined lateral area and a predetermined volume to obtain a cut-out part; and
(2) obtaining the sample inside the cut-out part,
wherein the predetermined volume is determined by multiplying the predetermined lateral area and the thickness of the spacers.

24. The method of claim 1 further comprising: measuring a lateral area of the layer, and estimating the volume of the layer by multiplying the lateral area thereof and the height of the spacers.

25. The method of claim 1, wherein one of the plates is flexible, and the thickness of the flexible plate times the Young's modulus of the flexible plate is in the range of 60 to 750 GPa-μm.

26. The method of claim 1, wherein one of the two plates is flexible,
the thickness of the flexible plate times the Young's modulus of the flexible plate is in the range 60 to 750 GPa-μm, and
the fourth power of an inter-spacer-distance (ISD) of the spacers divided by the thickness (h) and the Young's modulus (E) of the flexible plate (ISD$^4$/(hE)) is $5\times10^5$ μm$^3$/GPa or less.

27. The method of claim 26, wherein the inter-spacer distance is in the range of 1 μm to 120 μm.

28. The method of claim 26, wherein the inter-spacer distance is in the range of 1 μm to 200 μm.

29. The method of claim 26, wherein the inter-spacer distance is in the range of 400 μm or less.

30. The method of claim 1, wherein the analyte comprises one or more selected from the group consisting of proteins, peptides, nucleic acids, synthetic compounds, inorganic compounds, organic compounds, bacteria, virus, cells, tissues, or nanoparticles.

31. The method of claim 1 further comprising a step of quantification of a sample volume, wherein the quantification removes a none-sample-volume that is caused by spacers, air bubbles, dusts, or any combinations thereof.

32. The method of claim 1, wherein the spacers have a periodic arrangement.

33. The method of claim 1, wherein the reagent comprises a preservative that stabilizes nucleic acids.

34. The method of claim 1, wherein one or both of the plates have location markers that are periodic spacers.

35. The method of claim 1, wherein the sample comprises a diagnostic sample, an environmental sample, or a foodstuff sample.

36. The method of claim 1, wherein the height of the spacers is 3 μm or less.

37. The method of claim 1, wherein the height of the spacers is 10 μm or less.

38. The method of claim 1, wherein the height of the spacers is in the range of 10 μm to 50 μm.

* * * * *